(12) United States Patent
Seyama

(10) Patent No.: US 9,178,579 B2
(45) Date of Patent: Nov. 3, 2015

(54) WIRELESS DEVICE AND WIRELESS COMMUNICATION METHOD

(71) Applicant: FUJITSU LIMITED, Kawasaki, Kanagawa (JP)

(72) Inventor: Takashi Seyama, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 13/801,434

(22) Filed: Mar. 13, 2013

(65) Prior Publication Data

US 2013/0243112 A1  Sep. 19, 2013

(30) Foreign Application Priority Data

Mar. 16, 2012 (JP) .................. 2012-061205

(51) Int. Cl.
  *H04L 25/06* (2006.01)
  *H04B 7/04* (2006.01)
  *H04L 25/03* (2006.01)

(52) U.S. Cl.
  CPC ............ *H04B 7/0413* (2013.01); *H04L 25/067* (2013.01); *H04L 25/03891* (2013.01)

(58) Field of Classification Search
  CPC ............ H04L 25/03891; H04L 27/219; H04B 7/0413
  USPC ....................................... 375/267
  See application file for complete search history.

(56) References Cited

U.S. PATENT DOCUMENTS 5,825,315 A * 10/1998 Murashita et al. ............. 341/106
6,389,574 B1 * 5/2002 Belveze et al. ................ 714/795
2005/0259771 A1 * 11/2005 Higuchi et al. ................ 375/347
2009/0116590 A1 * 5/2009 Lee et al. ....................... 375/341
2009/0213965 A1 * 8/2009 Maeda et al. .................. 375/341
2010/0232549 A1 * 9/2010 Oizumi ......................... 375/341
2012/0121045 A1 * 5/2012 Kuwahara et al. ............. 375/341
2012/0170623 A1 * 7/2012 Kuwahara ..................... 375/219

FOREIGN PATENT DOCUMENTS

JP    2006-222872 A    8/2006
JP    2006-270430 A    10/2006
(Continued)

OTHER PUBLICATIONS

Kuei-Chiang Lai et al. "Low-Complexity Adaptive Tree Search Algorithm for MIMO Detection," Wireless Communications, IEEE Transactions on , vol. 8, No. 7, pp. 3716,3726, Jul. 2009.*

(Continued)

*Primary Examiner* — Daniel Washburn
*Assistant Examiner* — Berhanu Tadese
(74) *Attorney, Agent, or Firm* — Arent Fox LLP

(57) ABSTRACT

A wireless device, including: an antenna configured to receive a reception signal, a processor configured to convert the reception signal into a first signal that includes a product of an upper triangular matrix and a transmission signal, to detect a first region, to which the first signal belongs, on an IQ plane, a memory configured to store a symbol ranking table that stores symbol candidates in an order of shorter distance from a region center, up to an order that is equal to a rank upper limit value that is set to be lower than a modulation multi-level number of the transmission signal, wherein the processor is further configured to select a first symbol candidate based on the first region and the symbol ranking table.

6 Claims, 53 Drawing Sheets

(56) References Cited

FOREIGN PATENT DOCUMENTS

| | | |
|---|---|---|
| JP | 2008-182332 A | 8/2008 |
| JP | 2008-199167 A | 8/2008 |
| JP | 2009-016886 A | 1/2009 |
| WO | WO 2005/055483 A1 | 6/2005 |

OTHER PUBLICATIONS

Kenichi Higuchi, et al., "Adaptive Selection Algorithm of Surviving Symbol Replica Candidates in QRM-MLD for MIMO Multiplexing Using OFCDM Wireless Access," RCS2004-69, pp. 79-84, May 2004.

Kenichi Higuchi, et al., "Adaptive Selection of Surviving Symbol Replica Candidates Based on Maximum Reliability in QRM-MLD for OFCDM MIMO Multiplexing," Proc. of IEEE Globecom 2004, pp. 2480-2486, Nov. 2004.

Kyeong Jin Kim, et al., "Joint Channel Estimation and Data Detection Algorithms for MIMO-OFDM Systems," in Proc. Thirty-Sixth Asilomar Conference on Signals, Systems and Computers, pp. 1857-1861, Nov. 2002.

Japanese Office Action for Japanese Application No. 2012-061205 dated Jun. 9, 2015 (partial translation of relevant portion).

\* cited by examiner

FIG. 6

|  | RANKING | | |
|---|---|---|---|
| REGION NUMBER | 1 | 2 | 3 |
| 0 | 0 | 1 | 2 |
| 1 | 1 | 0 | 3 |
| 2 | 2 | 0 | 3 |
| 3 | 3 | 2 | 1 |

FIG. 8

| REGION NUMBER | RANKING | | |
|---|---|---|---|
| | 1 | 2 | 3 |
| 0 | 0 | 1 | 2 |
| 1 | 0 | 1 | 2 |
| 2 | 0 | 2 | 1 |
| 3 | 0 | 1 | 2 |
| 4 | 1 | 0 | 3 |
| 5 | 1 | 0 | 3 |
| 6 | 1 | 0 | 3 |
| 7 | 1 | 3 | 0 |
| 8 | 2 | 0 | 3 |
| 9 | 2 | 0 | 3 |
| 10 | 2 | 0 | 3 |
| 11 | 2 | 3 | 0 |
| 12 | 3 | 2 | 1 |
| 13 | 3 | 1 | 2 |
| 14 | 3 | 2 | 1 |
| 15 | 3 | 2 | 1 |

FIG. 10

| REGION NUMBER | RANKING | | | | | | | |
|---|---|---|---|---|---|---|---|---|
| | 1 | 2 | 3 | 4 | 5 | 6 | 7 | 8 |
| 0 | 3 | 2 | 1 | 0 | 6 | 6 | 7 | 8 |
| 1 | 2 | 0 | 3 | 6 | 4 | 9 | 8 | 4 |
| 2 | 1 | 0 | 3 | 9 | 8 | 1 | 7 | 8 |
| 3 | 0 | 1 | 2 | 4 | 8 | 2 | 4 | 11 |
| 4 | 6 | 4 | 7 | 2 | 0 | 6 | 3 | 9 |
| 5 | 7 | 6 | 5 | 4 | 2 | 5 | 3 | 12 |
| 6 | 4 | 5 | 6 | 0 | 12 | 13 | 12 | 0 |
| 7 | 5 | 4 | 7 | 13 | 12 | 7 | 2 | 13 |
| 8 | 9 | 8 | 11 | 1 | 10 | 6 | 0 | 15 |
| 9 | 8 | 9 | 10 | 0 | 12 | 0 | 3 | 12 |
| 10 | 11 | 10 | 9 | 8 | 1 | 11 | 1 | 14 |
| 11 | 10 | 8 | 11 | 14 | 12 | 14 | 12 | 0 |
| 12 | 12 | 13 | 14 | 8 | 4 | 9 | 0 | 15 |
| 13 | 13 | 12 | 15 | 5 | 14 | 10 | 5 | 15 |
| 14 | 14 | 12 | 15 | 10 | 8 | 4 | 7 | 8 |
| 15 | 15 | 14 | 13 | 12 | 5 | 13 | 4 | 11 |
| | | | | | | 10 | 8 | 4 |

FIG. 12

| REGION NUMBER | RANKING | | | | | | | |
|---|---|---|---|---|---|---|---|---|
| | 1 | 2 | 3 | 4 | 5 | 6 | 7 | 8 |
| 0 | 3 | 2 | 1 | 0 | 6 | 9 | 8 | 4 |
| 1 | 3 | 2 | 1 | 0 | 6 | 4 | 9 | 8 |
| 2 | 3 | 1 | 2 | 0 | 9 | 8 | 6 | 4 |
| 3 | 3 | 2 | 1 | 0 | 6 | 9 | 8 | 4 |
| 4 | 2 | 3 | 0 | 6 | 1 | 4 | 7 | 8 |
| 5 | 2 | 6 | 3 | 0 | 4 | 1 | 7 | 5 |
| 6 | 2 | 0 | 3 | 1 | 6 | 4 | 8 | 9 |
| 7 | 2 | 0 | 6 | 4 | 3 | 1 | 8 | 7 |
| 8 | 1 | 3 | 0 | 9 | 2 | 8 | 4 | 11 |
| 9 | 1 | 0 | 3 | 2 | 9 | 8 | 4 | 6 |
| 10 | 1 | 9 | 3 | 0 | 8 | 2 | 11 | 10 |
| 11 | 1 | 0 | 9 | 8 | 3 | 2 | 4 | 11 |
| 12 | 0 | 1 | 2 | 3 | 4 | 8 | 6 | 9 |
| 13 | 0 | 2 | 4 | 6 | 1 | 8 | 3 | 12 |
| 14 | 0 | 1 | 8 | 9 | 2 | 4 | 3 | 12 |
| 15 | 0 | 4 | 8 | 12 | 2 | 1 | 9 | 6 |
| 16 | 6 | 2 | 7 | 4 | 0 | 3 | 5 | 1 |
| 17 | 6 | 7 | 2 | 4 | 5 | 0 | 3 | 12 |
| 18 | 6 | 4 | 2 | 0 | 7 | 5 | 12 | 3 |
| 19 | 6 | 4 | 7 | 5 | 2 | 0 | 12 | 13 |
| 20 | 7 | 6 | 5 | 4 | 2 | 0 | 13 | 12 |
| ⋮ | ⋮ | ⋮ | ⋮ | ⋮ | ⋮ | ⋮ | ⋮ | ⋮ |
| 59 | 14 | 15 | 10 | 12 | 13 | 8 | 4 | 11 |
| 60 | 15 | 14 | 13 | 12 | 5 | 10 | 8 | 4 |
| 61 | 15 | 13 | 14 | 12 | 5 | 4 | 10 | 8 |
| 62 | 15 | 14 | 13 | 12 | 10 | 8 | 5 | 4 |
| 63 | 15 | 14 | 13 | 12 | 5 | 10 | 8 | 4 |

| REGION NUMBER | RANKING | | | | | | | | | | | | | | | | |
|---|---|---|---|---|---|---|---|---|---|---|---|---|---|---|---|---|---|
| | 1 | 2 | 3 | 4 | 5 | 6 | 7 | 8 | 9 | 10 | ... | 26 | 27 | 28 | 29 | 30 | 31 | 32 |
| 0 | 15 | 14 | 13 | 12 | 5 | 10 | 8 | 4 | 0 | 7 | ... | 26 | 36 | 24 | 16 | 32 | 51 | 33 |
| 1 | 14 | 12 | 10 | 15 | 8 | 13 | 4 | 11 | 9 | 0 | ... | 16 | 35 | 18 | 36 | 51 | 30 | 32 |
| 2 | 13 | 12 | 5 | 15 | 4 | 14 | 8 | 7 | 6 | 0 | ... | 19 | 32 | 24 | 33 | 51 | 45 | 44 |
| 3 | 12 | 8 | 4 | 13 | 14 | 0 | 10 | 5 | 15 | 9 | ... | 36 | 32 | 37 | 26 | 16 | 51 | 33 |
| 4 | 10 | 8 | 11 | 14 | 9 | 12 | 0 | 27 | 15 | 25 | ... | 35 | 38 | 28 | 18 | 51 | 39 | 20 |
| 5 | 11 | 9 | 10 | 27 | 8 | 25 | 1 | 26 | 14 | 0 | ... | 20 | 35 | 31 | 34 | 51 | 29 | 22 |
| 6 | 8 | 0 | 9 | 12 | 10 | 1 | 4 | 11 | 14 | 2 | ... | 26 | 18 | 51 | 39 | 32 | 28 | 36 |
| 7 | 9 | 1 | 8 | 25 | 11 | 17 | 0 | 10 | 27 | 3 | ... | 20 | 30 | 5 | 15 | 50 | 38 | 22 |
| 8 | 5 | 4 | 7 | 13 | 6 | 12 | 0 | 39 | 15 | 38 | ... | 19 | 25 | 44 | 33 | 51 | 40 | 27 |
| 9 | 4 | 0 | 6 | 12 | 5 | 2 | 8 | 7 | 13 | 1 | ... | 37 | 33 | 51 | 27 | 16 | 44 | 18 |
| 10 | 7 | 6 | 5 | 39 | 4 | 38 | 2 | 37 | 13 | 0 | ... | 40 | 19 | 47 | 17 | 51 | 46 | 41 |
| 11 | 6 | 2 | 4 | 38 | 7 | 34 | 0 | 5 | 39 | 3 | ... | 40 | 45 | 10 | 15 | 49 | 25 | 11 |
| 12 | 0 | 1 | 2 | 4 | 8 | 3 | 6 | 9 | 12 | 17 | ... | 32 | 16 | 36 | 33 | 24 | 18 | 50 |
| 13 | 1 | 0 | 3 | 17 | 9 | 2 | 19 | 8 | 25 | 16 | ... | 33 | 20 | 5 | 32 | 49 | 22 | 28 |
| 14 | 2 | 0 | 3 | 34 | 6 | 1 | 35 | 4 | 38 | 32 | ... | 18 | 40 | 10 | 50 | 16 | 44 | 41 |
| 15 | 3 | 2 | 1 | 19 | 35 | 0 | 34 | 17 | 51 | 33 | ... | 22 | 41 | 11 | 7 | 40 | 20 | 54 |
| 16 | 27 | 25 | 26 | 11 | 24 | 9 | 17 | 10 | 30 | 8 | ... | 4 | 51 | 15 | 50 | 35 | 13 | 23 |
| 17 | 26 | 24 | 27 | 30 | 25 | 28 | 16 | 11 | 31 | 17 | ... | 51 | 54 | 12 | 2 | 35 | 4 | 55 |
| 18 | 25 | 17 | 24 | 9 | 27 | 1 | 16 | 26 | 11 | 19 | ... | 4 | 21 | 14 | 31 | 34 | 54 | 23 |
| 19 | 24 | 16 | 25 | 28 | 26 | 17 | 20 | 27 | 30 | 18 | ... | 10 | 35 | 2 | 55 | 48 | 12 | 49 |
| 20 | 30 | 28 | 26 | 31 | 24 | 29 | 20 | 27 | 25 | 16 | ... | 0 | 51 | 52 | 2 | 35 | 14 | 53 |
| ⋮ | ⋮ | ⋮ | ⋮ | ⋮ | ⋮ | ⋮ | ⋮ | ⋮ | ⋮ | ⋮ | ... | ⋮ | ⋮ | ⋮ | ⋮ | ⋮ | ⋮ | ⋮ |
| 59 | 58 | 56 | 59 | 62 | 57 | 60 | 48 | 43 | 63 | 49 | ... | 19 | 22 | 44 | 34 | 3 | 23 | 36 |
| 60 | 60 | 56 | 52 | 61 | 62 | 48 | 58 | 53 | 63 | 57 | ... | 40 | 32 | 16 | 42 | 21 | 3 | 34 |
| 61 | 61 | 60 | 53 | 63 | 52 | 62 | 56 | 55 | 54 | 48 | ... | 16 | 35 | 3 | 17 | 40 | 29 | 42 |
| 62 | 62 | 60 | 58 | 63 | 56 | 61 | 52 | 59 | 57 | 48 | ... | 19 | 32 | 3 | 20 | 34 | 46 | 44 |
| 63 | 63 | 62 | 61 | 60 | 53 | 58 | 56 | 52 | 48 | 55 | ... | 19 | 40 | 20 | 16 | 32 | 3 | 34 |

FIRST-TIME QUADRANT DETERMINATION

SECOND-TIME QUADRANT DETERMINATION

SECOND-TIME QUADRANT DETERMINATION

FIG. 23A

| REGION NUMBER | RANKING | | |
|---|---|---|---|
| | 1 | 2 | 3 |
| 0 | 0 | 1 | 2 |
| 1 | 0 | 1 | 2 |
| 2 | 0 | 2 | 1 |
| 3 | 0 | 1 | 2 |
| 4 | 1 | 0 | 3 |
| 5 | 1 | 0 | 3 |
| 6 | 1 | 0 | 3 |
| 7 | 1 | 3 | 0 |
| 8 | 2 | 0 | 3 |
| 9 | 2 | 0 | 3 |
| 10 | 2 | 0 | 3 |
| 11 | 2 | 3 | 0 |
| 12 | 3 | 2 | 1 |
| 13 | 3 | 1 | 2 |
| 14 | 3 | 2 | 1 |
| 15 | 3 | 2 | 1 |

FIG. 23B

| FLOOR (REGION NUMBER/$N_{adj}$) | RANKING-$p_{th}$ |
|---|---|
| | 1 |
| 0 | 3 |
| 1 | 2 |
| 2 | 1 |
| 3 | 0 |

FIG. 24A

| REGION NUMBER | RANKING | | | | | | | |
|---|---|---|---|---|---|---|---|---|
| | 1 | 2 | 3 | 4 | 5 | 6 | 7 | 8 |
| 0 | 3 | 2 | 1 | 0 | 6 | 9 | 8 | 4 |
| 1 | 3 | 2 | 1 | 0 | 6 | 4 | 9 | 8 |
| 2 | 3 | 1 | 2 | 0 | 9 | 8 | 6 | 4 |
| 3 | 3 | 2 | 1 | 0 | 6 | 9 | 8 | 4 |
| 4 | 2 | 3 | 0 | 6 | 1 | 4 | 7 | 8 |
| 5 | 2 | 6 | 3 | 0 | 4 | 1 | 7 | 8 |
| 6 | 2 | 0 | 3 | 1 | 6 | 4 | 8 | 7 |
| 7 | 2 | 0 | 6 | 4 | 3 | 1 | 8 | 7 |
| 8 | 1 | 3 | 0 | 9 | 2 | 8 | 4 | 11 |
| 9 | 1 | 0 | 3 | 2 | 9 | 8 | 4 | 11 |
| 10 | 1 | 9 | 3 | 0 | 8 | 2 | 11 | 4 |
| 11 | 1 | 0 | 9 | 8 | 3 | 2 | 4 | 11 |
| 12 | 0 | 1 | 2 | 3 | 4 | 8 | 6 | 9 |
| 13 | 0 | 2 | 4 | 6 | 1 | 8 | 3 | 9 |
| 14 | 0 | 1 | 8 | 9 | 2 | 4 | 3 | 6 |
| 15 | 0 | 4 | 8 | 1 | 2 | 1 | 9 | 3 |
| 16 | 6 | 2 | 7 | 4 | 0 | 3 | 5 | 12 |
| 17 | 6 | 7 | 2 | 4 | 5 | 0 | 3 | 12 |
| 18 | 6 | 4 | 2 | 0 | 7 | 5 | 12 | 3 |
| 19 | 6 | 4 | 7 | 5 | 2 | 0 | 12 | 3 |
| 20 | 7 | 6 | 5 | 4 | 2 | 0 | 13 | 12 |
| ⋮ | ⋮ | ⋮ | ⋮ | ⋮ | ⋮ | ⋮ | ⋮ | ⋮ |
| 59 | 14 | 15 | 10 | 12 | 13 | 8 | 4 | 11 |
| 60 | 15 | 14 | 13 | 12 | 5 | 10 | 8 | 4 |
| 61 | 15 | 13 | 14 | 12 | 5 | 4 | 10 | 8 |
| 62 | 15 | 14 | 13 | 12 | 10 | 8 | 5 | 4 |
| 63 | 15 | 14 | 13 | 12 | 5 | 10 | 8 | 4 |

FIG. 24B

| FLOOR (REGION NUMBER/$N_{adj}$) | RANKING-pth | | | | | | | |
|---|---|---|---|---|---|---|---|---|
| | 1 | 2 | 3 | 4 | 5 | 6 | 7 | 8 |
| 0 | 12 | 11 | 7 | 5 | 10 | 13 | 14 | 15 |
| 1 | 5 | 9 | 12 | 13 | 10 | 11 | 14 | 15 |
| 2 | 10 | 6 | 12 | 14 | 5 | 7 | 13 | 15 |
| 3 | 12 | 10 | 5 | 11 | 7 | 13 | 14 | 15 |
| 4 | 8 | 1 | 13 | 9 | 14 | 15 | 10 | 11 |
| 5 | 8 | 3 | 15 | 14 | 1 | 9 | 10 | 11 |
| 6 | 13 | 1 | 14 | 3 | 9 | 10 | 15 | 11 |
| 7 | 8 | 14 | 2 | 10 | 1 | 3 | 9 | 11 |
| 8 | 4 | 2 | 14 | 6 | 13 | 15 | 5 | 7 |
| 9 | 14 | 13 | 2 | 5 | 6 | 3 | 15 | 7 |
| 10 | 4 | 3 | 15 | 2 | 13 | 5 | 6 | 7 |
| 11 | 13 | 4 | 1 | 5 | 2 | 3 | 6 | 7 |
| 12 | 15 | 9 | 6 | 2 | 1 | 7 | 11 | 3 |
| 13 | 6 | 10 | 0 | 2 | 9 | 11 | 1 | 3 |
| 14 | 5 | 0 | 9 | 1 | 6 | 7 | 2 | 3 |
| 15 | 0 | 7 | 11 | 6 | 9 | 1 | 2 | 3 |

FIG. 25

| REGION NUMBER | RANKING | | | | | | | | | | | | | | | | |
|---|---|---|---|---|---|---|---|---|---|---|---|---|---|---|---|---|---|
| | 1 | 2 | 3 | 4 | 5 | 6 | 7 | 8 | 9 | 10 | ... | 26 | 27 | 28 | 29 | 30 | 31 | 32 |
| 0 | 15 | 14 | 13 | 12 | 5 | 10 | 8 | 4 | 0 | 7 | ... | 26 | 36 | 24 | 16 | 32 | 51 | 33 |
| 1 | 14 | 12 | 10 | 15 | 8 | 13 | 4 | 11 | 9 | 0 | ... | 16 | 35 | 18 | 36 | 51 | 30 | 32 |
| 2 | 13 | 12 | 5 | 15 | 4 | 14 | 8 | 7 | 6 | 0 | ... | 19 | 32 | 24 | 33 | 51 | 45 | 44 |
| 3 | 12 | 8 | 4 | 13 | 14 | 0 | 10 | 5 | 15 | 9 | ... | 36 | 32 | 37 | 26 | 16 | 51 | 33 |
| 4 | 10 | 8 | 11 | 14 | 9 | 12 | 0 | 27 | 15 | 25 | ... | 35 | 38 | 28 | 18 | 51 | 39 | 20 |
| 5 | 11 | 9 | 10 | 27 | 8 | 25 | 1 | 26 | 14 | 0 | ... | 20 | 35 | 31 | 34 | 51 | 29 | 22 |
| 6 | 8 | 0 | 9 | 12 | 10 | 1 | 4 | 11 | 14 | 2 | ... | 26 | 18 | 51 | 39 | 32 | 28 | 36 |
| 7 | 9 | 1 | 8 | 25 | 11 | 17 | 0 | 10 | 27 | 3 | ... | 20 | 30 | 5 | 15 | 50 | 38 | 22 |
| 8 | 5 | 4 | 7 | 13 | 6 | 12 | 0 | 39 | 15 | 38 | ... | 19 | 25 | 44 | 33 | 51 | 40 | 27 |
| 9 | 4 | 0 | 6 | 12 | 5 | 2 | 8 | 7 | 13 | 1 | ... | 37 | 33 | 51 | 27 | 16 | 44 | 18 |
| 10 | 7 | 6 | 5 | 39 | 4 | 38 | 2 | 37 | 13 | 0 | ... | 40 | 19 | 47 | 17 | 51 | 46 | 41 |
| 11 | 6 | 2 | 4 | 38 | 7 | 34 | 0 | 5 | 39 | 3 | ... | 40 | 45 | 10 | 15 | 49 | 25 | 11 |
| 12 | 0 | 1 | 2 | 4 | 8 | 3 | 6 | 9 | 12 | 17 | ... | 32 | 16 | 36 | 33 | 24 | 18 | 50 |
| 13 | 1 | 0 | 3 | 17 | 9 | 2 | 19 | 8 | 25 | 16 | ... | 33 | 20 | 5 | 32 | 49 | 22 | 28 |
| 14 | 2 | 0 | 3 | 34 | 6 | 1 | 35 | 4 | 38 | 32 | ... | 18 | 40 | 10 | 50 | 16 | 44 | 41 |
| 15 | 3 | 2 | 1 | 19 | 35 | 0 | 34 | 17 | 51 | 33 | ... | 22 | 41 | 11 | 7 | 40 | 20 | 54 |
| 16 | 27 | 25 | 26 | 11 | 24 | 9 | 17 | 10 | 30 | 8 | ... | 4 | 51 | 15 | 50 | 35 | 13 | 23 |
| 17 | 26 | 24 | 27 | 30 | 25 | 28 | 16 | 11 | 31 | 17 | ... | 51 | 54 | 12 | 2 | 35 | 4 | 55 |
| 18 | 25 | 17 | 24 | 9 | 27 | 1 | 16 | 26 | 11 | 19 | ... | 4 | 21 | 14 | 31 | 34 | 54 | 23 |
| 19 | 24 | 16 | 25 | 28 | 26 | 17 | 20 | 27 | 30 | 18 | ... | 10 | 35 | 2 | 55 | 48 | 12 | 49 |
| 20 | 30 | 28 | 26 | 31 | 24 | 29 | 20 | 27 | 25 | 16 | ... | 0 | 51 | 52 | 2 | 35 | 14 | 53 |
| ⋮ | ⋮ | ⋮ | ⋮ | ⋮ | ⋮ | ⋮ | ⋮ | ⋮ | ⋮ | ⋮ | ... | ⋮ | ⋮ | ⋮ | ⋮ | ⋮ | ⋮ | ⋮ |
| 59 | 58 | 56 | 59 | 62 | 57 | 60 | 48 | 43 | 63 | 49 | ... | 19 | 22 | 44 | 34 | 3 | 23 | 36 |
| 60 | 60 | 56 | 52 | 61 | 62 | 48 | 58 | 53 | 63 | 57 | ... | 40 | 32 | 16 | 42 | 21 | 3 | 34 |
| 61 | 61 | 60 | 53 | 63 | 52 | 62 | 56 | 55 | 54 | 48 | ... | 16 | 35 | 3 | 17 | 40 | 29 | 42 |
| 62 | 62 | 60 | 58 | 63 | 56 | 61 | 52 | 59 | 57 | 48 | ... | 19 | 32 | 3 | 20 | 34 | 46 | 44 |
| 63 | 63 | 62 | 61 | 60 | 53 | 58 | 56 | 52 | 48 | 55 | ... | 19 | 40 | 20 | 16 | 32 | 3 | 34 |

FIG. 26

| FLOOR(REGION NUMBER)/N_adj | RANKING-pth | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 |
| 0 | 33 | 30 | 44 | 45 | 28 | 50 | 49 | 40 | 20 | 41 | 22 | 48 | 29 | 31 | 46 | 47 | 54 | 57 | 21 | 42 | 23 | 43 | 56 | 52 | 55 | 59 | 60 | 53 | 58 | 61 | 62 | 63 |
| 1 | 39 | 50 | 22 | 32 | 33 | 29 | 36 | 49 | 21 | 54 | 37 | 48 | 23 | 41 | 40 | 52 | 44 | 55 | 57 | 56 | 45 | 53 | 42 | 43 | 60 | 59 | 46 | 47 | 58 | 61 | 62 | 63 |
| 2 | 27 | 49 | 41 | 16 | 18 | 46 | 50 | 24 | 42 | 57 | 26 | 48 | 43 | 22 | 20 | 54 | 56 | 28 | 59 | 30 | 52 | 58 | 21 | 23 | 60 | 55 | 29 | 53 | 31 | 62 | 61 | 63 |
| 3 | 41 | 48 | 20 | 22 | 40 | 37 | 15 | 26 | 28 | 44 | 54 | 57 | 56 | 52 | 30 | 45 | 21 | 42 | 23 | 43 | 55 | 29 | 46 | 59 | 60 | 47 | 58 | 31 | 53 | 61 | 62 | 63 |
| 4 | 6 | 34 | 55 | 48 | 49 | 13 | 33 | 52 | 5 | 38 | 32 | 53 | 7 | 56 | 57 | 39 | 41 | 36 | 60 | 40 | 61 | 37 | 59 | 44 | 58 | 43 | 62 | 42 | 63 | 45 | 46 | 47 |
| 5 | 49 | 14 | 12 | 60 | 61 | 34 | 33 | 4 | 56 | 6 | 57 | 32 | 13 | 15 | 38 | 41 | 62 | 63 | 5 | 58 | 7 | 59 | 40 | 36 | 39 | 43 | 44 | 37 | 42 | 45 | 46 | 47 |
| 6 | 6 | 32 | 4 | 56 | 57 | 10 | 53 | 31 | 38 | 41 | 12 | 60 | 36 | 40 | 14 | 61 | 5 | 58 | 7 | 59 | 43 | 13 | 39 | 62 | 44 | 42 | 15 | 37 | 63 | 46 | 45 | 47 |
| 7 | 11 | 33 | 57 | 0 | 2 | 62 | 34 | 8 | 58 | 41 | 32 | 10 | 59 | 6 | 4 | 38 | 40 | 12 | 43 | 14 | 36 | 42 | 7 | 44 | 5 | 39 | 13 | 37 | 21 | 63 | 29 | 31 |
| 8 | 9 | 17 | 59 | 50 | 48 | 14 | 18 | 56 | 10 | 25 | 58 | 16 | 11 | 52 | 54 | 27 | 24 | 22 | 60 | 20 | 62 | 26 | 53 | 28 | 55 | 61 | 23 | 21 | 26 | 30 | 29 | 31 |
| 9 | 52 | 54 | 9 | 16 | 8 | 47 | 58 | 5 | 25 | 12 | 22 | 60 | 20 | 24 | 13 | 62 | 53 | 10 | 11 | 55 | 14 | 23 | 61 | 27 | 28 | 15 | 21 | 26 | 63 | 29 | 30 | 31 |
| 10 | 1 | 13 | 12 | 60 | 62 | 18 | 17 | 8 | 52 | 9 | 54 | 16 | 14 | 15 | 22 | 61 | 25 | 63 | 53 | 10 | 11 | 55 | 24 | 20 | 23 | 27 | 28 | 21 | 26 | 29 | 30 | 31 |
| 11 | 18 | 54 | 7 | 1 | 0 | 61 | 4 | 17 | 53 | 22 | 16 | 5 | 55 | 9 | 8 | 20 | 12 | 23 | 25 | 24 | 13 | 21 | 28 | 10 | 11 | 27 | 14 | 15 | 26 | 13 | 14 | 15 |
| 12 | 36 | 38 | 24 | 25 | 0 | 21 | 42 | 63 | 9 | 28 | 6 | 44 | 8 | 4 | 29 | 46 | 37 | 26 | 27 | 39 | 30 | 7 | 45 | 11 | 12 | 10 | 5 | 31 | 47 | 13 | 45 | 15 |
| 13 | 25 | 43 | 1 | 34 | 32 | 30 | 2 | 40 | 26 | 9 | 42 | 0 | 27 | 36 | 38 | 11 | 8 | 6 | 44 | 4 | 46 | 10 | 12 | 39 | 37 | 45 | 7 | 5 | 47 | 14 | 29 | 15 |
| 14 | 38 | 23 | 2 | 17 | 16 | 45 | 1 | 20 | 37 | 6 | 21 | 0 | 39 | 24 | 25 | 7 | 9 | 4 | 28 | 8 | 29 | 5 | 26 | 27 | 12 | 11 | 30 | 10 | 31 | 13 | 14 | 15 |
| 15 | 34 | 28 | 29 | 44 | 46 | 2 | 1 | 24 | 36 | 25 | 38 | 0 | 31 | 47 | 6 | 9 | 30 | 45 | 37 | 26 | 27 | 39 | 8 | 4 | 7 | 11 | 12 | 5 | 10 | 13 | 14 | 15 |

FIG. 31A

| REGION NUMBER | RANKING | | | |
|---|---|---|---|---|
| | 1 | 2 | 3 | 4 |
| 0 | 3 | 2 | 1 | 0 |
| 1 | 3 | 2 | 1 | 0 |
| 2 | 3 | 1 | 2 | 0 |
| 3 | 3 | 2 | 1 | 0 |
| 4 | 2 | 3 | 0 | 6 |
| 5 | 2 | 6 | 3 | 0 |
| 6 | 2 | 0 | 3 | 6 |
| 7 | 2 | 0 | 6 | 3 |
| 8 | 1 | 3 | 0 | 9 |
| 9 | 1 | 0 | 3 | 9 |
| 10 | 1 | 9 | 3 | 0 |
| 11 | 1 | 0 | 9 | 8 |
| 12 | 0 | 1 | 2 | 4 |
| 13 | 0 | 2 | 4 | 1 |
| 14 | 0 | 1 | 2 | 4 |
| 15 | 0 | 4 | 2 | 1 |
| 16 | 6 | 2 | 7 | 4 |
| 17 | 6 | 7 | 2 | 4 |
| 18 | 6 | 4 | 2 | 7 |
| 19 | 6 | 4 | 7 | 2 |
| 20 | 7 | 6 | 5 | 4 |
| ⋮ | ⋮ | ⋮ | ⋮ | ⋮ |
| 59 | 14 | 15 | 10 | 12 |
| 60 | 15 | 14 | 13 | 12 |
| 61 | 15 | 13 | 14 | 12 |
| 62 | 15 | 14 | 13 | 12 |
| 63 | 15 | 14 | 13 | 12 |

FIG. 31B

| FLOOR (REGION NUMBER/$N_{adj,1}$) | RANKING-pth,1 | | | | | | | |
|---|---|---|---|---|---|---|---|---|
| | 1 | 2 | 3 | 4 | 5 | 6 | 7 | 8 |
| 0 | 6 | 9 | 8 | 4 | 12 | 11 | 7 | 10 |
| 1 | 4 | 7 | 8 | 5 | 12 | 13 | 14 | 15 |
| 2 | 8 | 4 | 11 | 10 | 12 | 14 | 13 | 15 |
| 3 | 12 | 10 | 5 | 11 | 7 | 13 | 14 | 15 |
| 4 | 0 | 5 | 3 | 12 | 8 | 1 | 13 | 9 |
| 5 | 1 | 9 | 10 | 11 | 4 | 5 | 6 | 7 |
| 6 | 2 | 7 | 3 | 1 | 8 | 9 | 10 | 11 |
| 7 | 4 | 5 | 6 | 7 | 8 | 9 | 10 | 11 |
| 8 | 10 | 0 | 3 | 12 | 4 | 2 | 14 | 6 |
| 9 | 12 | 11 | 1 | 14 | 4 | 2 | 3 | 15 |
| 10 | 4 | 5 | 0 | 7 | 8 | 9 | 10 | 11 |
| 11 | 4 | 5 | 6 | 7 | 8 | 9 | 10 | 11 |
| 12 | 14 | 10 | 5 | 15 | 0 | 9 | 6 | 2 |
| 13 | 4 | 5 | 6 | 7 | 8 | 2 | 10 | 11 |
| 14 | 4 | 0 | 5 | 1 | 6 | 7 | 2 | 3 |
| 15 | 4 | 5 | 6 | 7 | 8 | 9 | 10 | 11 |

FIG. 31C

| FLOOR (REGION NUMBER/$N_{adj,2}$) | RANKING-pth,2 | | | |
|---|---|---|---|---|
| | 1 | 2 | 3 | 4 |
| 0 | 5 | 13 | 14 | 15 |
| 1 | 1 | 9 | 10 | 11 |
| 2 | 2 | 6 | 5 | 7 |
| 3 | 3 | 1 | 2 | 6 |

FIG. 34A

| REGION NUMBER | RANKING | | | |
|---|---|---|---|---|
| | 1 | 2 | 3 | 4 |
| 0 | 3 | 2 | 1 | 0 |
| 1 | 3 | 2 | 1 | 0 |
| 2 | 3 | 1 | 2 | 0 |
| 3 | 3 | 2 | 1 | 0 |
| 4 | 2 | 3 | 0 | 6 |
| 5 | 2 | 6 | 3 | 0 |
| 6 | 2 | 0 | 3 | 6 |
| 7 | 2 | 0 | 6 | 3 |
| 8 | 1 | 3 | 0 | 9 |
| 9 | 1 | 0 | 3 | 9 |
| 10 | 1 | 9 | 3 | 0 |
| 11 | 1 | 0 | 9 | 3 |
| 12 | 0 | 1 | 2 | 4 |
| 13 | 0 | 2 | 4 | 1 |
| 14 | 0 | 1 | 2 | 4 |
| 15 | 0 | 4 | 2 | 1 |
| 16 | 6 | 2 | 7 | 4 |
| 17 | 6 | 7 | 2 | 7 |
| 18 | 6 | 4 | 2 | 0 |
| 19 | 6 | 4 | 7 | 2 |
| 20 | 7 | 6 | 5 | 4 |
| ⋮ | ⋮ | ⋮ | ⋮ | ⋮ |
| 59 | 14 | 15 | 10 | 12 |
| 60 | 15 | 14 | 13 | 12 |
| 61 | 15 | 13 | 14 | 12 |
| 62 | 15 | 14 | 13 | 12 |
| 63 | 15 | 14 | 13 | 12 |

FIG. 34B

| FLOOR (REGION NUMBER/Nadj) | RANKING-pth | | | |
|---|---|---|---|---|
| | 1 | 2 | 3 | 4 |
| 0 | 6 | 9 | 8 | 4 |
| 1 | 4 | 1 | 7 | 8 |
| 2 | 8 | 2 | 4 | 11 |
| 3 | 8 | 6 | 3 | 9 |
| 4 | 0 | 5 | 3 | 12 |
| 5 | 2 | 13 | 12 | 0 |
| 6 | 12 | 7 | 2 | 8 |
| 7 | 12 | 6 | 0 | 15 |
| 8 | 10 | 0 | 3 | 12 |
| 9 | 12 | 11 | 1 | 4 |
| 10 | 1 | 14 | 12 | 0 |
| 11 | 12 | 9 | 0 | 15 |
| 12 | 14 | 10 | 5 | 0 |
| 13 | 14 | 4 | 7 | 8 |
| 14 | 8 | 13 | 4 | 11 |
| 15 | 5 | 10 | 8 | 4 |

FIG. 36A

| FLOOR (REGION NUMBER/$N_{adj}$) | RANKING | | | | | | | |
|---|---|---|---|---|---|---|---|---|
| | 1 | 2 | 3 | 4 | 5 | 6 | 7 | 8 |
| 0 | 3 | 2 | 1 | 0 | 6 | 9 | 8 | 4 |
| 1 | 2 | 0 | 3 | 6 | 4 | 1 | 7 | 8 |
| 2 | 1 | 0 | 3 | 9 | 8 | 2 | 4 | 11 |
| 3 | 0 | 1 | 2 | 4 | 8 | 6 | 3 | 9 |
| 4 | 6 | 4 | 7 | 2 | 0 | 5 | 3 | 12 |
| 5 | 7 | 6 | 5 | 4 | 2 | 13 | 12 | 0 |
| 6 | 4 | 5 | 6 | 0 | 12 | 7 | 2 | 8 |
| 7 | 5 | 4 | 7 | 13 | 12 | 6 | 0 | 15 |
| 8 | 9 | 8 | 11 | 1 | 10 | 0 | 3 | 12 |
| 9 | 8 | 9 | 10 | 0 | 12 | 11 | 1 | 4 |
| 10 | 11 | 10 | 9 | 8 | 1 | 14 | 12 | 0 |
| 11 | 10 | 8 | 11 | 14 | 12 | 9 | 0 | 15 |
| 12 | 12 | 13 | 14 | 8 | 4 | 10 | 5 | 0 |
| 13 | 13 | 12 | 15 | 5 | 14 | 4 | 7 | 8 |
| 14 | 14 | 12 | 15 | 10 | 8 | 13 | 4 | 11 |
| 15 | 15 | 14 | 13 | 12 | 5 | 10 | 8 | 4 |

FIG. 36B

| REGION NUMBER | RANKING-pth | | | | | | | |
|---|---|---|---|---|---|---|---|---|
| | 1 | 2 | 3 | 4 | 5 | 6 | 7 | 8 |
| 0 | 12 | 11 | 7 | 5 | 10 | 13 | 14 | 15 |
| 1 | 7 | 12 | 5 | 11 | 10 | 13 | 14 | 15 |
| 2 | 11 | 12 | 10 | 7 | 5 | 14 | 13 | 15 |
| 3 | 12 | 11 | 7 | 5 | 10 | 13 | 14 | 15 |
| 4 | 9 | 5 | 12 | 13 | 10 | 11 | 14 | 15 |
| 5 | 5 | 12 | 9 | 13 | 10 | 14 | 11 | 15 |
| 6 | 9 | 12 | 5 | 10 | 11 | 13 | 14 | 15 |
| 7 | 5 | 12 | 9 | 13 | 10 | 14 | 11 | 15 |
| 8 | 6 | 10 | 12 | 14 | 5 | 7 | 13 | 15 |
| 9 | 6 | 12 | 10 | 5 | 7 | 14 | 13 | 15 |
| 10 | 10 | 12 | 6 | 14 | 5 | 13 | 7 | 15 |
| 11 | 10 | 12 | 6 | 14 | 5 | 13 | 7 | 15 |
| 12 | 12 | 10 | 5 | 11 | 7 | 13 | 14 | 15 |
| 13 | 12 | 5 | 7 | 13 | 10 | 14 | 11 | 15 |
| 14 | 12 | 10 | 11 | 14 | 5 | 13 | 7 | 15 |
| 15 | 12 | 10 | 5 | 13 | 14 | 11 | 7 | 15 |
| 16 | 1 | 8 | 13 | 9 | 14 | 10 | 15 | 11 |
| 17 | 13 | 1 | 8 | 9 | 14 | 15 | 10 | 11 |
| 18 | 8 | 1 | 13 | 9 | 14 | 10 | 15 | 11 |
| 19 | 13 | 8 | 1 | 14 | 9 | 15 | 10 | 11 |
| 20 | 3 | 8 | 1 | 15 | 14 | 9 | 10 | 11 |
| ⋮ | ⋮ | ⋮ | ⋮ | ⋮ | ⋮ | ⋮ | ⋮ | ⋮ |
| 59 | 5 | 0 | 9 | 1 | 6 | 7 | 2 | 3 |
| 60 | 0 | 7 | 11 | 6 | 9 | 1 | 2 | 3 |
| 61 | 7 | 0 | 6 | 11 | 9 | 2 | 1 | 3 |
| 62 | 11 | 0 | 9 | 7 | 6 | 1 | 2 | 3 |
| 63 | 0 | 7 | 11 | 6 | 9 | 1 | 2 | 3 |

FIG. 41 (RELATED ART)

|  | RANKING | | | |
|---|---|---|---|---|
| REGION NUMBER | 1 | 2 | 3 | 4 |
| 0 | 0 | 1 | 2 | 3 |
| 1 | 1 | 0 | 3 | 2 |
| 2 | 2 | 0 | 3 | 1 |
| 3 | 3 | 1 | 2 | 0 |

FIG. 42 (RELATED ART)

| REGION NUMBER | RANKING | | | |
|---|---|---|---|---|
| | 1 | 2 | 3 | 4 |
| 0 | 0 | 1 | 2 | 3 |
| 1 | 0 | 1 | 2 | 3 |
| 2 | 0 | 2 | 1 | 3 |
| 3 | 0 | 1 | 2 | 3 |
| 4 | 1 | 0 | 3 | 2 |
| 5 | 1 | 0 | 3 | 2 |
| 6 | 1 | 0 | 3 | 2 |
| 7 | 1 | 3 | 0 | 2 |
| 8 | 2 | 0 | 3 | 1 |
| 9 | 2 | 0 | 3 | 1 |
| 10 | 2 | 0 | 3 | 1 |
| 11 | 2 | 3 | 0 | 1 |
| 12 | 3 | 2 | 1 | 0 |
| 13 | 3 | 1 | 2 | 0 |
| 14 | 3 | 2 | 1 | 0 |
| 15 | 3 | 2 | 1 | 0 |

FIG. 43 (RELATED ART)

| REGION NUMBER | RANKING | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| 0 | 3 | 2 | 1 | 0 | 6 | 9 | 8 | 4 | 12 | 11 | 7 | 5 | 10 | 13 | 14 | 15 |
| 1 | 2 | 0 | 3 | 6 | 4 | 1 | 7 | 8 | 5 | 9 | 12 | 13 | 10 | 11 | 14 | 15 |
| 2 | 1 | 0 | 3 | 9 | 8 | 2 | 4 | 11 | 10 | 6 | 12 | 14 | 5 | 7 | 13 | 15 |
| 3 | 0 | 1 | 2 | 4 | 8 | 6 | 3 | 9 | 12 | 10 | 5 | 11 | 7 | 13 | 14 | 15 |
| 4 | 6 | 4 | 7 | 2 | 0 | 5 | 3 | 12 | 8 | 1 | 13 | 9 | 14 | 15 | 10 | 11 |
| 5 | 7 | 6 | 5 | 4 | 2 | 13 | 12 | 0 | 8 | 3 | 15 | 14 | 1 | 9 | 10 | 11 |
| 6 | 4 | 5 | 6 | 0 | 12 | 7 | 2 | 13 | 8 | 1 | 14 | 3 | 9 | 10 | 15 | 11 |
| 7 | 5 | 4 | 7 | 13 | 12 | 6 | 0 | 15 | 8 | 14 | 2 | 10 | 1 | 3 | 9 | 11 |
| 8 | 9 | 8 | 11 | 1 | 10 | 0 | 3 | 12 | 4 | 2 | 14 | 6 | 13 | 15 | 5 | 7 |
| 9 | 8 | 9 | 10 | 0 | 12 | 11 | 1 | 14 | 4 | 13 | 2 | 5 | 6 | 3 | 15 | 7 |
| 10 | 11 | 10 | 9 | 8 | 1 | 14 | 12 | 0 | 4 | 3 | 15 | 2 | 13 | 5 | 6 | 7 |
| 11 | 10 | 8 | 11 | 14 | 12 | 9 | 0 | 15 | 13 | 4 | 1 | 5 | 2 | 3 | 6 | 7 |
| 12 | 12 | 13 | 14 | 8 | 4 | 10 | 5 | 15 | 0 | 9 | 6 | 2 | 1 | 7 | 11 | 3 |
| 13 | 13 | 12 | 15 | 5 | 14 | 4 | 7 | 8 | 6 | 10 | 0 | 2 | 9 | 11 | 1 | 3 |
| 14 | 14 | 12 | 15 | 10 | 8 | 13 | 4 | 11 | 5 | 0 | 9 | 1 | 6 | 7 | 2 | 3 |
| 15 | 15 | 14 | 13 | 12 | 5 | 10 | 8 | 4 | 0 | 7 | 11 | 6 | 9 | 1 | 2 | 3 |

FIG. 44 (RELATED ART)

| REGION NUMBER | RANKING | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| 0 | 3 | 2 | 1 | 0 | 6 | 9 | 8 | 4 | 12 | 11 | 7 | 5 | 10 | 13 | 14 | 15 |
| 1 | 3 | 2 | 1 | 0 | 6 | 4 | 9 | 8 | 7 | 12 | 5 | 11 | 10 | 13 | 14 | 15 |
| 2 | 3 | 1 | 2 | 0 | 9 | 8 | 6 | 4 | 11 | 12 | 10 | 7 | 5 | 14 | 13 | 15 |
| 3 | 3 | 2 | 1 | 0 | 6 | 9 | 8 | 4 | 12 | 11 | 7 | 5 | 10 | 13 | 14 | 15 |
| 4 | 2 | 3 | 0 | 6 | 1 | 4 | 7 | 8 | 9 | 5 | 12 | 13 | 10 | 11 | 14 | 15 |
| 5 | 2 | 6 | 3 | 0 | 4 | 1 | 7 | 5 | 8 | 12 | 9 | 13 | 10 | 14 | 11 | 15 |
| 6 | 2 | 0 | 3 | 1 | 6 | 4 | 8 | 9 | 12 | 7 | 5 | 10 | 11 | 13 | 14 | 15 |
| 7 | 2 | 0 | 6 | 4 | 3 | 1 | 8 | 7 | 5 | 12 | 9 | 13 | 10 | 14 | 11 | 15 |
| 8 | 1 | 3 | 0 | 9 | 2 | 8 | 4 | 11 | 6 | 10 | 12 | 14 | 5 | 7 | 13 | 15 |
| 9 | 1 | 0 | 3 | 2 | 9 | 8 | 4 | 6 | 12 | 11 | 10 | 5 | 7 | 14 | 13 | 15 |
| 10 | 1 | 9 | 3 | 0 | 8 | 2 | 11 | 10 | 4 | 12 | 6 | 14 | 5 | 13 | 7 | 15 |
| 11 | 1 | 0 | 9 | 8 | 3 | 2 | 4 | 11 | 10 | 12 | 6 | 14 | 5 | 13 | 7 | 15 |
| 12 | 0 | 1 | 2 | 3 | 4 | 8 | 6 | 9 | 12 | 10 | 5 | 11 | 7 | 13 | 14 | 15 |
| 13 | 0 | 2 | 4 | 6 | 1 | 8 | 3 | 12 | 9 | 5 | 7 | 13 | 10 | 14 | 11 | 15 |
| 14 | 0 | 1 | 8 | 9 | 2 | 4 | 3 | 12 | 10 | 6 | 11 | 14 | 5 | 13 | 7 | 15 |
| 15 | 0 | 4 | 8 | 12 | 2 | 1 | 9 | 6 | 3 | 10 | 5 | 13 | 14 | 11 | 7 | 15 |
| 16 | 6 | 2 | 7 | 4 | 0 | 3 | 5 | 1 | 12 | 8 | 13 | 9 | 14 | 10 | 15 | 11 |
| 17 | 6 | 7 | 2 | 4 | 5 | 0 | 3 | 12 | 13 | 1 | 8 | 9 | 14 | 15 | 10 | 11 |
| 18 | 6 | 4 | 2 | 0 | 7 | 5 | 12 | 3 | 8 | 1 | 13 | 9 | 14 | 10 | 15 | 11 |
| 19 | 6 | 4 | 7 | 5 | 2 | 0 | 12 | 13 | 8 | 3 | 1 | 14 | 9 | 15 | 10 | 11 |
| 20 | 7 | 6 | 5 | 4 | 2 | 0 | 13 | 12 | 3 | 8 | 1 | 15 | 14 | 9 | 10 | 11 |
| ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ |
| 59 | 14 | 15 | 10 | 12 | 13 | 8 | 4 | 11 | 5 | 0 | 9 | 1 | 6 | 7 | 2 | 3 |
| 60 | 15 | 14 | 13 | 12 | 5 | 10 | 8 | 4 | 0 | 7 | 11 | 6 | 9 | 1 | 2 | 3 |
| 61 | 15 | 13 | 14 | 12 | 5 | 4 | 10 | 8 | 7 | 0 | 6 | 11 | 9 | 2 | 1 | 3 |
| 62 | 15 | 14 | 13 | 12 | 10 | 8 | 5 | 4 | 11 | 0 | 9 | 7 | 6 | 1 | 2 | 3 |
| 63 | 15 | 14 | 13 | 12 | 5 | 10 | 8 | 4 | 0 | 7 | 11 | 6 | 9 | 1 | 2 | 3 |

FIG. 45 (RELATED ART)

| REGION NUMBER | RANKING | | | | | | | | | | | | | | | | | | | | | ... | | | | | |
|---|---|---|---|---|---|---|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 | 20 | 21 | ... | 59 | 60 | 61 | 62 | 63 | 64 |
| 0 | 15 | 14 | 13 | 12 | 5 | 10 | 8 | 4 | 0 | 7 | 11 | 6 | 9 | 1 | 2 | 27 | 39 | 38 | 25 | 3 | 17 | ... | 59 | 60 | 61 | 62 | 63 | 64 |
| 1 | 14 | 12 | 10 | 15 | 8 | 13 | 4 | 11 | 9 | 0 | 5 | 1 | 6 | 27 | 25 | 2 | 7 | 3 | 26 | 3 | 17 | ... | 60 | 53 | 58 | 61 | 62 | 63 |
| 2 | 13 | 12 | 5 | 15 | 4 | 14 | 8 | 7 | 6 | 0 | 10 | 2 | 9 | 39 | 38 | 1 | 11 | 3 | 17 | 26 | 38 | ... | 53 | 60 | 58 | 61 | 62 | 63 |
| 3 | 12 | 8 | 4 | 13 | 14 | 0 | 10 | 5 | 15 | 9 | 6 | 1 | 2 | 7 | 11 | 3 | 25 | 38 | 34 | 25 | 37 | ... | 58 | 53 | 53 | 62 | 61 | 63 |
| 4 | 10 | 8 | 11 | 14 | 9 | 12 | 0 | 27 | 15 | 25 | 1 | 4 | 13 | 17 | 5 | 2 | 26 | 3 | 34 | 17 | 27 | ... | 60 | 47 | 58 | 61 | 62 | 63 |
| 5 | 11 | 9 | 10 | 27 | 8 | 25 | 1 | 26 | 14 | 0 | 17 | 24 | 12 | 16 | 4 | 3 | 30 | 15 | 24 | 6 | 7 | ... | 59 | 58 | 46 | 47 | 62 | 63 |
| 6 | 8 | 0 | 9 | 12 | 10 | 12 | 4 | 11 | 27 | 2 | 25 | 13 | 3 | 17 | 6 | 27 | 5 | 15 | 19 | 2 | 28 | ... | 61 | 60 | 58 | 61 | 62 | 63 |
| 7 | 9 | 1 | 8 | 25 | 11 | 17 | 0 | 10 | 15 | 3 | 24 | 12 | 16 | 2 | 19 | 4 | 26 | 14 | 18 | 7 | 34 | ... | 53 | 46 | 61 | 47 | 62 | 63 |
| 8 | 5 | 4 | 7 | 13 | 6 | 12 | 8 | 39 | 15 | 38 | 2 | 8 | 14 | 34 | 10 | 1 | 37 | 3 | 36 | 6 | 35 | ... | 55 | 58 | 53 | 62 | 61 | 63 |
| 9 | 4 | 0 | 6 | 12 | 5 | 2 | 0 | 7 | 13 | 1 | 38 | 14 | 3 | 34 | 9 | 39 | 10 | 15 | 35 | 9 | 11 | ... | 58 | 60 | 53 | 62 | 61 | 63 |
| 10 | 7 | 6 | 5 | 39 | 4 | 38 | 2 | 37 | 13 | 0 | 34 | 36 | 12 | 32 | 8 | 3 | 45 | 15 | 35 | 1 | 44 | ... | 62 | 29 | 53 | 61 | 31 | 63 |
| ... | ... | ... | ... | ... | ... | ... | ... | ... | ... | ... | ... | ... | ... | ... | ... | ... | ... | ... | ... | ... | ... | ... | ... | ... | ... | ... | ... | ... |
| 59 | 58 | 56 | 59 | 62 | 57 | 60 | 48 | 43 | 63 | 49 | 41 | 52 | 61 | 33 | 53 | 50 | 42 | 51 | 40 | 54 | 55 | ... | 11 | 31 | 10 | 13 | 14 | 15 |
| 60 | 60 | 56 | 52 | 61 | 62 | 48 | 58 | 53 | 63 | 57 | 54 | 49 | 50 | 55 | 59 | 51 | 22 | 41 | 33 | 18 | 23 | ... | 12 | 5 | 10 | 13 | 14 | 15 |
| 61 | 61 | 60 | 53 | 63 | 52 | 62 | 56 | 55 | 54 | 48 | 58 | 50 | 57 | 23 | 22 | 49 | 59 | 51 | 18 | 21 | 41 | ... | 10 | 12 | 5 | 14 | 13 | 15 |
| 62 | 62 | 60 | 58 | 63 | 56 | 61 | 52 | 59 | 57 | 48 | 53 | 49 | 54 | 43 | 50 | 41 | 55 | 51 | 33 | 42 | 22 | ... | 5 | 12 | 10 | 13 | 14 | 15 |
| 63 | 63 | 62 | 61 | 60 | 53 | 58 | 56 | 52 | 48 | 55 | 59 | 54 | 57 | 49 | 50 | 43 | 23 | 22 | 41 | 51 | 18 | ... | 12 | 5 | 10 | 13 | 14 | 15 |

FIG. 46 (RELATED ART)

| MODULATION METHOD | $N_{div}$ | NUMBER OF REGIONS $N_{area}$ | NUMBER OF WORDS | BIT WIDTH PER WORD | SIZE [BYTE] |
|---|---|---|---|---|---|
| QPSK | 1 | 4 | 16 | 2 | 4 |
| QPSK | 2 | 16 | 64 | 2 | 16 |
| 16QAM | 2 | 16 | 256 | 4 | 128 |
| 16QAM | 3 | 64 | 1024 | 4 | 512 |
| 64QAM | 3 | 64 | 4096 | 6 | 3072 |

WIRELESS DEVICE AND WIRELESS COMMUNICATION METHOD

CROSS-REFERENCE TO RELATED APPLICATION

This application is based upon and claims the benefit of priority of the prior Japanese Patent Application No. 2012-061205, filed on Mar. 16, 2012, the entire contents of which are incorporated herein by reference.

FIELD

The embodiments discussed herein are related to a wireless device and a wireless communication method.

BACKGROUND

In recent years, multiple input multiple output (MIMO) technique has been studied as a next-generation communication technique. In the MIMO system, a transmitter which is provided with a plurality of transmission antennas (for example, M antennas) transmits a plurality of data streams and a receiver which is provided with a plurality of reception antennas (for example, N antennas) receives the plurality of data streams in a separate manner. Here, M≤N holds.

For the sake of expediency in description, a case where a transmitter transmits M data streams which are equal to the number of transmission antennas is described as an example, here. A receiver receives N reception signals. Here, when a data stream is denoted as a vector x in the M-th row and the first column, a channel matrix in the N-th row and M-th column which has a propagation path gain hij between the j-th transmission antenna and the i-th reception antenna as an element is denoted as H, a reception signal is denoted as a vector y in the N-th row and first column, and a noise is denoted as a vector n in the N-th row and first column, expression (1) is obtained.

$$y = Hx + n \quad (1)$$

$$\begin{pmatrix} y_1 \\ y_2 \\ \vdots \\ y_N \end{pmatrix} = \begin{pmatrix} h_{11} & h_{12} & \cdots & h_{1,M} \\ h_{21} & h_{22} & \cdots & h_{2,M} \\ \vdots & \vdots & \ddots & \vdots \\ h_{N,1} & h_{N,2} & \cdots & h_{N,M} \end{pmatrix} \begin{pmatrix} x_1 \\ x_2 \\ \vdots \\ x_M \end{pmatrix} + \begin{pmatrix} n_1 \\ n_2 \\ \vdots \\ n_N \end{pmatrix}$$

Examples of a stream separation method on the reception side include minimum mean square error (MMSE) and maximum likelihood detection (MLD). In MLD, metrics such as a squared Euclidean distance are calculated with respect to all symbol replica candidate combinations of a plurality of stream signals so as to set a combination, which has the minimum sum metric, as a signal after stream separation. In MLD, a superior reception performance is obtained compared to a linear separation method such as MMSE. However, when a modulation multi-level number of the l-th transmission signal is denoted as $m_l$ (for example, m=4 in a case of QPSK, m=16 in a case of 16QAM, and m=64 in a case of 64QAM), a combination number is expressed as expression (2).

$$\prod_{k=1}^{M} m_k \quad (2)$$

As expressed in expression (2), as a modulation multi-level number and the number of transmission streams are increased, the number of times of metric calculation is increased in an exponential fashion, causing an enormous amount of processing disadvantageously. Therefore, various types of arithmetic amount reduction type MLD have been proposed.

In related art, QRM-MLD in which QR decomposition and M algorithm are combined with each other has been proposed. In QRM-MLD, metrics such as a squared Euclidean distance from all symbol replica candidates are calculated with respect to surviving symbol replica candidates on the previous stage. When k=1, . . . , and the number of surviving candidates on the M-th stage is denoted as $S_k$, the number of times of metric calculation becomes as expression (3).

$$S_1 + \sum_{k=2}^{M} m_k S_{k-1} \quad (3)$$

In related art, a method of adaptive selection of surviving symbol replica candidates based on the maximum reliability (ASESS) in which a method for reducing the number of times of metric calculation is further applied to QRM-MLD has been proposed. Symbol replica candidates on respective stages are ranked through region detection and metric calculation is performed as many times as the number of surviving symbol replica candidates, with respect to symbol replicas in an ascending order of cumulative values of metrics. When k=1, . . . , and the number of surviving candidates on the M-th stage is denoted as $S_k$, the number of times of metric calculation is expressed as expression (4).

$$\sum_{k=1}^{M} S_k \quad (4)$$

In ASESS method, the number of times of metric calculation is linearly increased with respect to the number of transmission streams. Further, Japanese Laid-open Patent Publication No. 2006-270430 has disclosed a method in which ranking of symbol candidates is applied to the list sphere decoding (LSD) method.

The ASESS method is described in detail. In order to simplify the description, a case of M=N is taken as an example. In the ASESS method, a channel matrix H is QR-decomposed into a unitary matrix Q and an upper triangular matrix R as expression (5).

$$H = QR = \begin{pmatrix} q_{11} & q_{12} & \cdots & q_{1,N} \\ q_{21} & q_{22} & \cdots & q_{2,N} \\ \vdots & \vdots & \ddots & \vdots \\ q_{N,1} & q_{N,2} & \cdots & q_{N,N} \end{pmatrix} \begin{pmatrix} r_{11} & r_{12} & \cdots & r_{1,N} \\ & r_{22} & \cdots & r_{2,N} \\ & & \ddots & \vdots \\ O & & & r_{N,N} \end{pmatrix} \quad (5)$$

O denotes a zero matrix. In the ASESS method, multiplication of a reception signal y by Hermitian conjugates of the unitary matrix Q from the left enables orthogonalization as expression (6).

$$z = Q^H y \quad (6)$$
$$= Q^H Q R x + Q^H n$$
$$= Rx + n' \begin{pmatrix} z_1 \\ z_2 \\ \vdots \\ z_N \end{pmatrix}$$
$$= \begin{pmatrix} r_{11} & r_{12} & \cdots & r_{1,N} \\ & r_{22} & \cdots & r_{2,N} \\ & & \ddots & \vdots \\ O & & & r_{N,N} \end{pmatrix} \begin{pmatrix} x_1 \\ x_2 \\ \vdots \\ x_N \end{pmatrix} + \begin{pmatrix} n'_1 \\ n'_2 \\ \vdots \\ n'_N \end{pmatrix}$$

In the ASESS method, region detection on the lowest stage is performed by expression (7) so as to determine a region number $\epsilon^{(1)}$ of a region to which $u_N$ belongs, on the first stage.

$$u_N = z_N / r_{N,N} \quad (7)$$

In the ASESS method, region detection includes the $N_{div}$ times of quadrant detection and the $N_{div}-1$ times of origin movement, and a region to which $u_N$ belongs among $2^{2N_{div}}$ regions is detected. In the ASESS method, a symbol ranking table $\Omega$ is referred to and as many candidate replicas as $S_1$, the number of surviving candidates from the higher ranking, are set as surviving paths of the first stage so as to calculate a metric such as a squared Euclidean distance. When a surviving path is expressed as expression (8) and a metric is a squared Euclidean distance, the metric is expressed as expression (9).

$$\Pi_1^{(1)}(i) = \Omega^{(m_N)}(\epsilon, i) \quad (8)$$

$$d_1(\Pi_1^{(1)}(i)) = |z_N - r_{N,N} c_{N,\Pi_1^{(1)}(i)}|^2, \ i=1, 2, \ldots, S_1 \quad (9)$$

Here, $\Omega^{(4)}$, $\Omega^{(16)}$, and $\Omega^{(64)}$ respectively represent symbol ranking tables with respect to QPSK, 16QAM, and 64QAM. Expression (10) expresses the symbol number of the i-th order in ranking with respect to a region number $\epsilon^{(1)}$ which is stored in the symbol ranking table.

$$\Omega^{(m_N)}(\epsilon^{(1)}, i) \quad (10)$$

In the ASESS method, region detection by expression (11) in which candidate replicas of $S_1$ surviving paths, which are survived on the first stage, are respectively cancelled from a reception signal $z_{N-1}$ which is the second lowest signal is performed so as to determine a region number $\epsilon^{(1)}(i)$ of a region to which u expressed as expression (12) belongs, on the second stage.

$$u_{N-1}(\Pi_1^{(1)}(i)) = (z_{N-1} - r_{N-1,N} c_{N,\Pi_1^{(1)}(i)}) / r_{N-1,N-1}, \ i=1, 2, \ldots, S_1 \quad (11)$$

$$u_{N-1}(\Pi_1^{(1)}(i)) \quad (12)$$

In the ASESS method, a surviving path on the second stage is adaptively selected as following. In the ASESS method, a representative cumulative metric value E(i) and a current rank $\rho(i)$ of each surviving path which is survived on the first stage are first initialized so as to obtain expression (13), expression (14), and expression (15).

$$E(i) := d_1(\Pi_1^{(1)}(i)) \quad (13)$$

$$\rho(i) := 1 \quad (14)$$

$$q := 1 \quad (15)$$

In the ASESS method, a candidate replica on the $\rho(i_{min})$-th order in the ranking of $i_{min}$ at which $\rho(i) \leq m_N$ is satisfied and E(i) has the minimum value is selected from the symbol ranking table and the q-th surviving path on the second stage is expressed as expression (16) and expression (17).

$$\Pi_1^{(2)}(q) = \Pi_1^{(1)}(i_{min}) \quad (16)$$

$$\Pi_2^{(2)}(q) = \Omega^{(m_{N-1})}(\epsilon^{(2)}(i_{min}), \rho(i_{min}))$$

$$i_{min} = \underset{\rho(i) \leq m_{N-1}}{\arg} (\min[e(i)]) \quad (17)$$

A cumulative metric is calculated as expression (18).

$$d_2(\Pi^{(2)}(q)) = d_1(\Pi_1^{(1)}(i_{min})) + |z_{N-1} - r_{N-1,N} c_{N,\Pi_1^{(1)}(i_{min})} - r_{N-1,N-1} c_{N-1,\Pi_2^{(2)}(q)}|^2 \quad (18)$$

Then, in the ASESS method, the cumulative metric is updated as expression (19), expression (20), and expression (21).

$$E(i_{min}) := d_2(\Pi^{(2)}(q)) \quad (19)$$

$$\rho(i_{min}) := \rho(i_{min}) + 1 \quad (20)$$

$$q := q + 1 \quad (21)$$

In the ASESS method, the above-mentioned processing is performed until q reaches the number $S_2$ of surviving paths of the second stage. In the ASESS method, region detection by expression (22) in which candidate replicas of $S_{k-1}$ surviving paths, which are survived on the k−1-th stage, are respectively cancelled from a reception signal $z_{N-k+1}$ which is the k-th lowest signal is performed so as to determine a region number $\epsilon^{(k)}$ of a region to which u expressed as expression (23) belongs, on the following k-th stage.

$$u_{N-k+1,i}(\Pi^{(k-1)}(i)) = \quad (22)$$
$$\left( z_{N-k+1} - \sum_{p=1}^{k-1} r_{N-k+1,N-p+1} c_{N-p+1,\Pi_p^{(k-1)}(i)} \right) / r_{N-k+1,N-k+1},$$
$$i = 1, 2, \ldots, S_{k-1}$$

$$u_{N-k+1,i}(\Pi^{(k-1)}(i)) \quad (23)$$

In the ASESS method, a surviving path on the k-th stage is adaptively selected as following. In the ASESS method, a representative cumulative metric value E(i) and a current rank $\rho(i)$ of each surviving path which is survived on the k−1-th stage are first initialized so as to obtain expression (24), expression (25), and expression (26).

$$E(i) := d_{k-1}(\Pi^{(k-1)}(i)) \quad (24)$$

$$\rho(i) := 1 \quad (25)$$

$$q := 1 \quad (26)$$

In the ASESS method, a candidate replica on the $\rho(i_{min})$-th order in the ranking of $i_{min}$ at which $\rho(i) \leq m_{N-k+1}$ is satisfied and E(i) has the minimum value is selected from the symbol ranking table and the q-th surviving path on the k-th stage is expressed as expression (27) and expression (28).

$$\Pi_{1 \sim k-1}^{(k)}(q) = \Pi^{(k-1)}(i_{min}) \quad (27)$$
$$\Pi_k^{(k)}(q) = \Omega^{(m_{N-k+1})}(\epsilon^{(k)}(i_{min}), \rho(i_{min}))$$

$$i_{min} = \underset{\rho(i) \leq m_{N-k+1}}{\arg} (\min[E(i)]) \quad (28)$$

A cumulative metric is calculated as expression (29).

$$d_k(\Pi^{(k)}(q)) = d_{k-1}(\Pi^{(k-1)}(i_{min})) + \left| z_{N-k+1} - \sum_{p=1}^{k-1} r_{N-k+1,N-p+1} c_{N-p+1,\Pi_p^{(k)}(q)} - r_{N-k+1,N-k+1} c_{N-k+1,\Pi_k^{(k)}(q)} \right|^2 \quad (29)$$

Then, in the ASESS method, the cumulative metric is updated as expression (30), expression (31), and expression (32), and the above-mentioned processing is performed until q reaches the number $S_k$ of surviving paths of the k-th stage.

$$E(i_{min}) := d_k(\Pi^{(k)}(q)) \quad (30)$$

$$\rho(i_{min}) := \rho(i_{min}) + 1 \quad (31)$$

$$q := q+1 \quad (32)$$

The followings are examples of related art.

K. J. Kim and J. Yue, "Joint channel estimation and data detection algorithms for MIMO-OFDM systems," in Proc. Thirty-Sixth Asilomar Conference on Signals, Systems and Computers, pp. 1857-1861, November 2002

K. Higuchi, H. Kawai, N. Maeda and M. Sawahashi, "Adaptive Selection of Surviving Symbol Replica Candidates Based on Maximum Reliability in QRM-MLD for OFCDM MIMO Multiplexing," Proc. of IEEE Globecom 2004, pp. 2480-2486, November 2004

K. Higuchi, H. Kawai, N. Maeda and M. Sawahashi, "Adaptive Selection Algorithm of Surviving Symbol Replica Candidates in QRM-MLD for MIMO Multiplexing Using OFCDM Wireless Access", RCS2004-69, May 2004

SUMMARY

According to an aspect of the invention, a wireless device, including: an antenna configured to receive a reception signal, a processor configured to convert the reception signal into a first signal that includes a product of an upper triangular matrix and a transmission signal, to detect a first region, to which the first signal belongs, on an IQ plane, a memory configured to store a symbol ranking table that stores symbol candidates in an order of shorter distance from a region center, up to an order that is equal to a rank upper limit value that is set to be lower than a modulation multi-level number of the transmission signal, wherein the processor is further configured to select a first symbol candidate based on the first region and the symbol ranking table.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 illustrates an example of a size reduction type symbol ranking table in QPSK and $N_{div}=1$.

FIG. 8 illustrates an example of a size reduction type symbol ranking table in QPSK and $N_{div}=2$.

FIG. 10 illustrates an example of a size reduction type symbol ranking table in 16QAM ($N_{div}=2$).

FIG. 12 illustrates an example of a size reduction type symbol ranking table in 16QAM ($N_{div}=3$).

FIG. 13 illustrates an example in 64QAM ($N_{div}=3$).

FIG. 14 illustrates an example of a size reduction type symbol ranking table in 64QAM and $N_{div}=3$.

FIGS. 23A and 23B respectively illustrate examples of a symbol higher order ranking table and a symbol lower order ranking table in QPSK and $N_{div}=2$.

FIGS. 24A and 24B respectively illustrate examples of a symbol higher order ranking table and a symbol lower order ranking table in 16QAM and $N_{div}=3$.

FIG. 25 illustrates an example of a symbol higher order ranking table in 64QAM and $N_{div}=3$.

FIG. 26 illustrates an example of a symbol lower order ranking table in 64QAM and $N_{div}=3$.

FIGS. 31A to 31C respectively illustrate examples of a symbol higher order ranking table, a symbol intermediate order ranking table, and a symbol lower order ranking table.

FIGS. 34A and 34B respectively illustrate examples of a symbol higher order ranking table and a symbol lower order ranking table.

FIGS. 36A and 36B respectively illustrate examples of a symbol higher order ranking table and a symbol lower order ranking table for the first stage processing of Embodiment 5.

FIG. 41 illustrates an example of a symbol ranking table in QPSK and $N_{div}=1$.

FIG. 42 illustrates an example of a symbol ranking table in QPSK and $N_{div}=2$.

FIG. 43 illustrates an example of a symbol ranking table in 16QAM and $N_{div}=2$.

FIG. 44 illustrates an example of a symbol ranking table in 16QAM and $N_{div}=3$.

FIG. 45 illustrates an example of a symbol ranking table in 64QAM and $N_{div}=3$.

FIG. 46 illustrates sizes of symbol ranking tables.

DESCRIPTION OF EMBODIMENTS

As described above, in the ASESS method, region detection of a signal which is obtained by cancelling a symbol candidate of each surviving path up to a previous stage, from a reception signal is performed. Then, in the ASESS method, a symbol candidate on a current rank of a surviving path having the minimum representative cumulative metric is set as a surviving candidate by using a symbol ranking table, so as to reduce the processing amount. The symbol ranking table is a table which stores a result obtained by ranking symbol candidates in the order of shorter distance from a region center to a symbol candidate, for each prepared region.

In the ASESS method, a symbol ranking table on the k-th stage become to be a table of which the number of words is equal to expression (33) and the bit width per word is equal to expression (34), in each modulation method. However, m denotes a modulation multi-level number of a modulation method.

$$2^{2N_{div}} \times \min(S_k, m) \quad (33)$$

$$\log_2 m \quad (34)$$

Here, examples of symbol ranking tables in related art are illustrated in FIGS. 41 to 45. Further, sizes of symbol ranking tables are illustrated in FIG. 46. Here, examples of symbol ranking tables having different $N_{div}$ in the same modulation method are illustrated, but it is sufficient to obtain a symbol ranking table of at least one type of $N_{div}$ in the same modulation method.

As illustrated in FIGS. 41 to 46, the size of a symbol ranking table is increased as the modulation multi-level number and the number of regions are increased. When the size of a symbol ranking table is increased, memory capacity of a device is increased.

The technique disclosed herein has made in view of the above description, and it is desirable to provide a wireless device, a wireless device control method, and a wireless device control program that realize reduction of the size of a symbol ranking table.

Embodiments of a wireless device, a wireless device control method, and a wireless device control program according to the present disclosure will be described in detail below with reference to the accompanying drawings. However, the present disclosure is not limited by these embodiments.

(Solving Aspect 1)

Figure 1A:
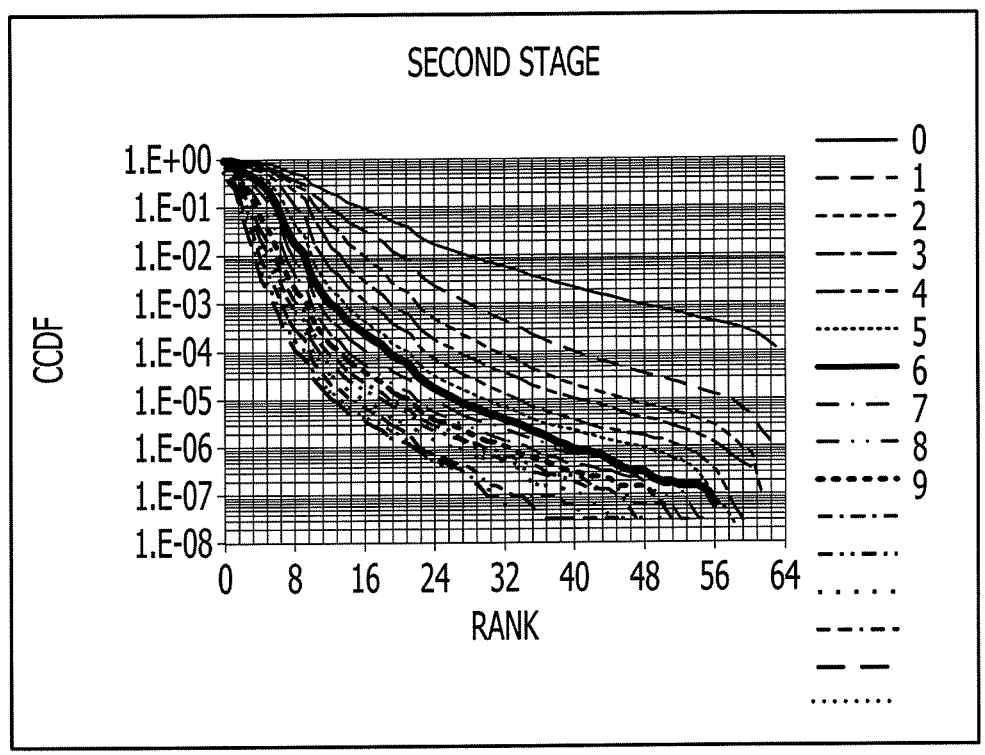
FIGS. 1A to 1C illustrate a CCDF of a current rank of each surviving path in a stage end.
Figure 1B:
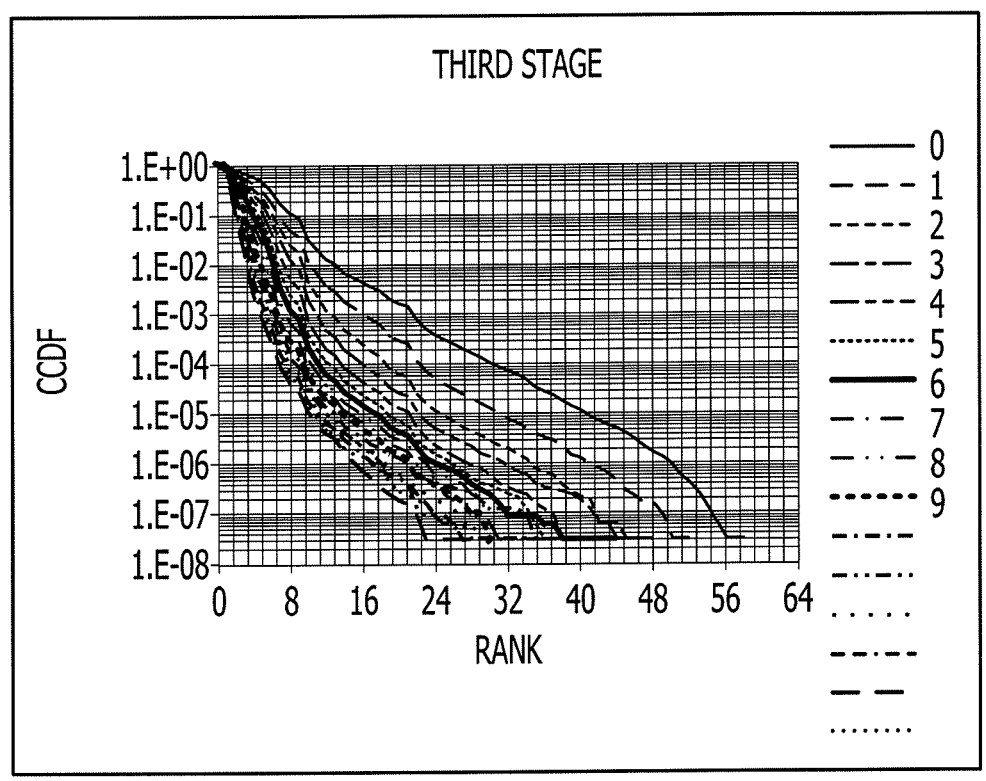
Figure 1C:
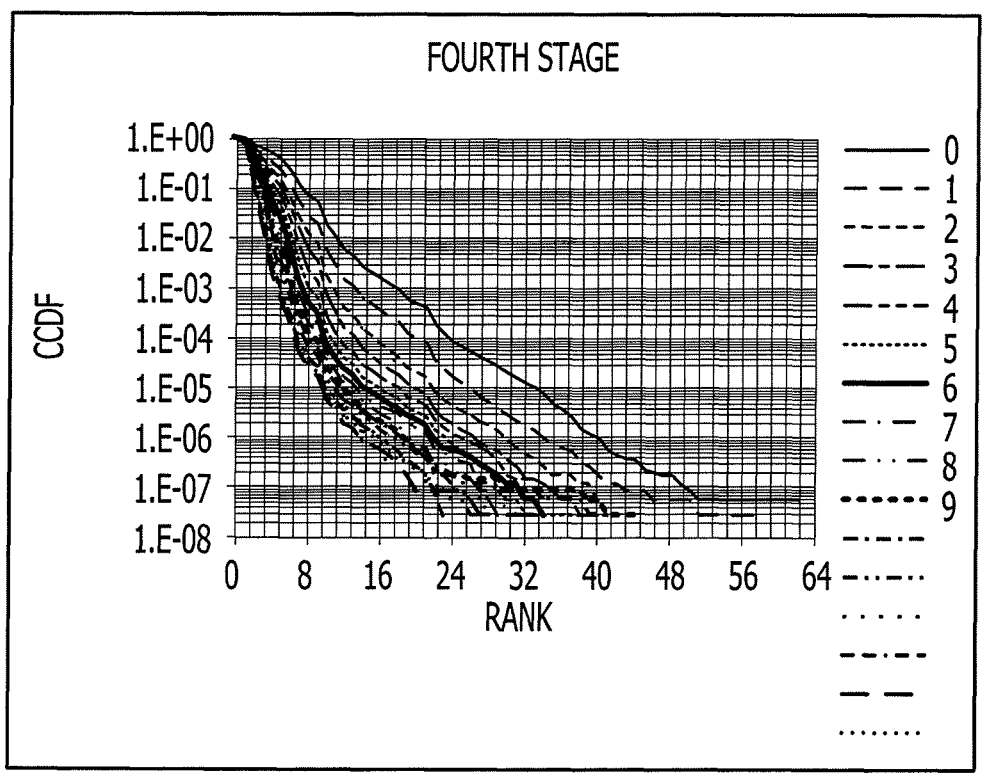

A basic idea of a first solving aspect of the present disclosure is first described. A current rank of each surviving path according to a related art example is first considered. FIGS. 1A to 1C illustrate a complementary cumulative distribution function (CCDF) of current ranks of respective surviving paths at stage end. More specifically, FIGS. 1A to 1C illustrate a CCDF of current ranks for every surviving path at the stage end when the number of transmission antennas is 4, the number of reception antennas is 4, a modulation method of transmission data of each of the transmission antennas is 64QAM, and the number of surviving candidates is S1=S2=S3=S4=64. However, only 10 surviving paths are illustrated in an ascending order of cumulative metrics up to a previous stage because a current rank of a surviving path of which a cumulative metric up to the previous stage is smaller tends to be larger. From FIGS. 1A to 1C, it is understood that there is a small probability that a current rank has a large value.

Accordingly, in the first aspect, a surviving path of which a current rank is equal to or lower than a predetermined rank upper limit value MAX_RANK (<m) and a representative cumulative metric has the minimum value is selected. Accordingly, the current rank of the surviving path is less than or equal to the MAX_RANK thereby satisfying the expression (35) for the number of words of a symbol ranking table. Therefore, according to the first aspect, it is possible to reduce the size of a symbol ranking table.

$$2^{2N_{div}} \times MAX\_RANK \quad (35)$$

(Embodiment 1)

Figure 2:
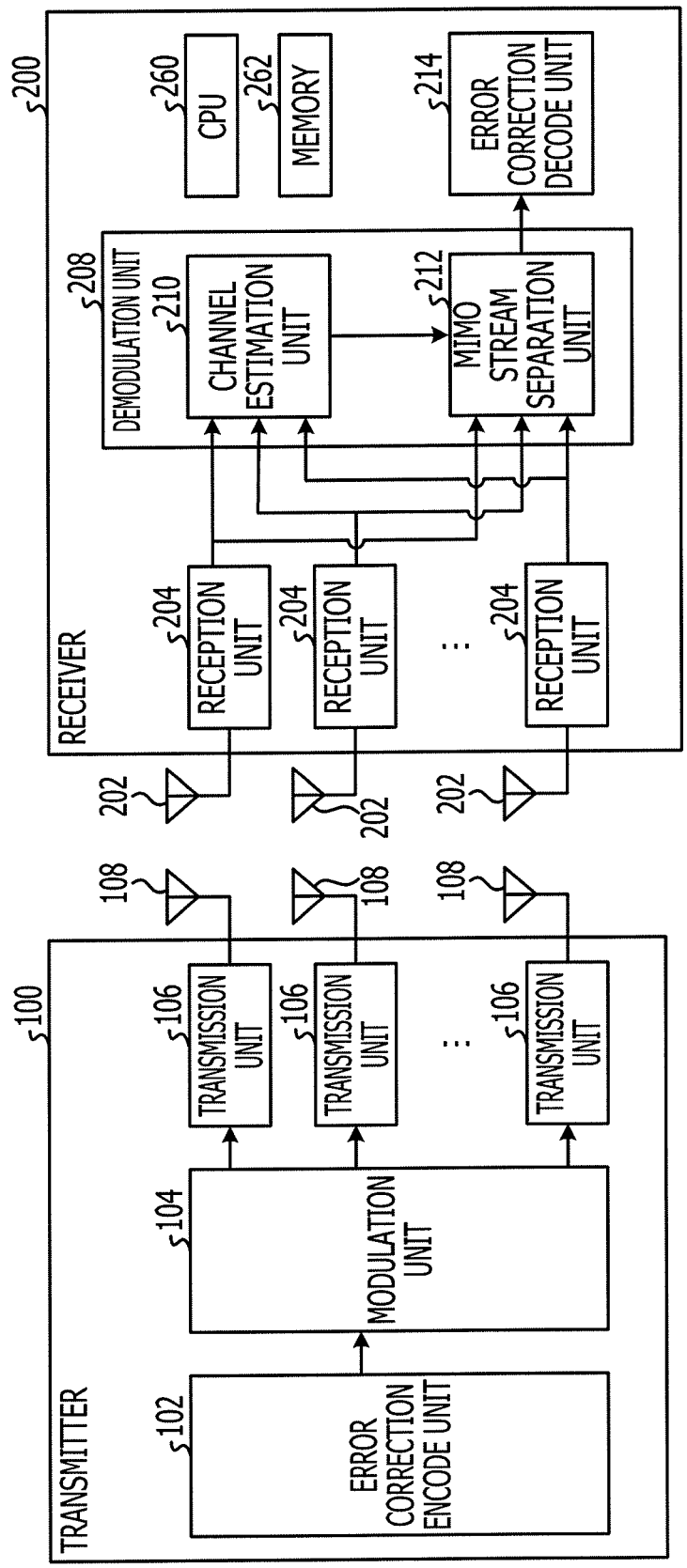
FIG. 2 illustrates the configuration of a MIMO system.

Embodiment 1 is an embodiment to which the first aspect is applied. FIG. 2 illustrates the configuration of a MIMO system. As depicted in FIG. 2, the MIMO system includes a transmitter 100 and a receiver 200. The transmitter 100 includes an error correction encode unit 102, a modulation unit 104, a plurality of transmission units 106, and a plurality of transmission antennas 108.

The error correction encode unit 102 performs error-correction-encode of transmission data. The modulation unit 104 performs modulation such as QPSK, 16QAM, and 64QAM so as to separate transmission data into streams. The transmission unit 106 up-converts a signal obtained by the modulation of the modulation unit 104 into a signal of a wireless frequency and simultaneously transmits the signal from the transmission antenna 108.

The receiver 200 includes a plurality of reception antennas 202, reception units 204, a demodulation unit 208, an error correction decode unit 214, a central processing unit (CPU) 260, and a memory 262. The demodulation unit 208 includes a channel estimation unit 210 and a MIMO stream separation unit 212.

The reception unit 204 converts a signal which is received at the reception antenna 202 into a baseband signal. The channel estimation unit 210 receives a pilot signal or the like which is transmitted from the transmitter 100, so as to estimate a propagation path. The MIMO stream separation unit 212 performs stream separation processing by using a reception signal and a channel estimation value. The error correction decode unit 214 performs error-correction-decode of a separated stream.

The memory 262 includes a read only memory (ROM) which stores data for executing various functions of the receiver 200 and various types of programs for executing various functions of the receiver 200. The memory 262 further includes a random access memory (RAM) which stores a program which is to be executed among the various types of programs which are stored in the ROM.

The CPU 260 is an arithmetic processing unit which executes various types of programs which are stored in the memory 262. The CPU 260 executes the various types of programs which are stored in the memory 262, so as to control the receiver 200. Here, programs which are executed in the CPU 260 are not only stored in the memory 262 but also may be recorded in a distributable storage medium such as a compact disc (CD)-ROM and a memory medium so as to be read out of the storage medium and executed. Further, programs may be stored in a server which is connected via a network and the program may be set to be operated on the server, so as to provide a service to the receiver 200 which is connected via the network, depending on a request from the receiver 200 which is a request source.

Figure 3:
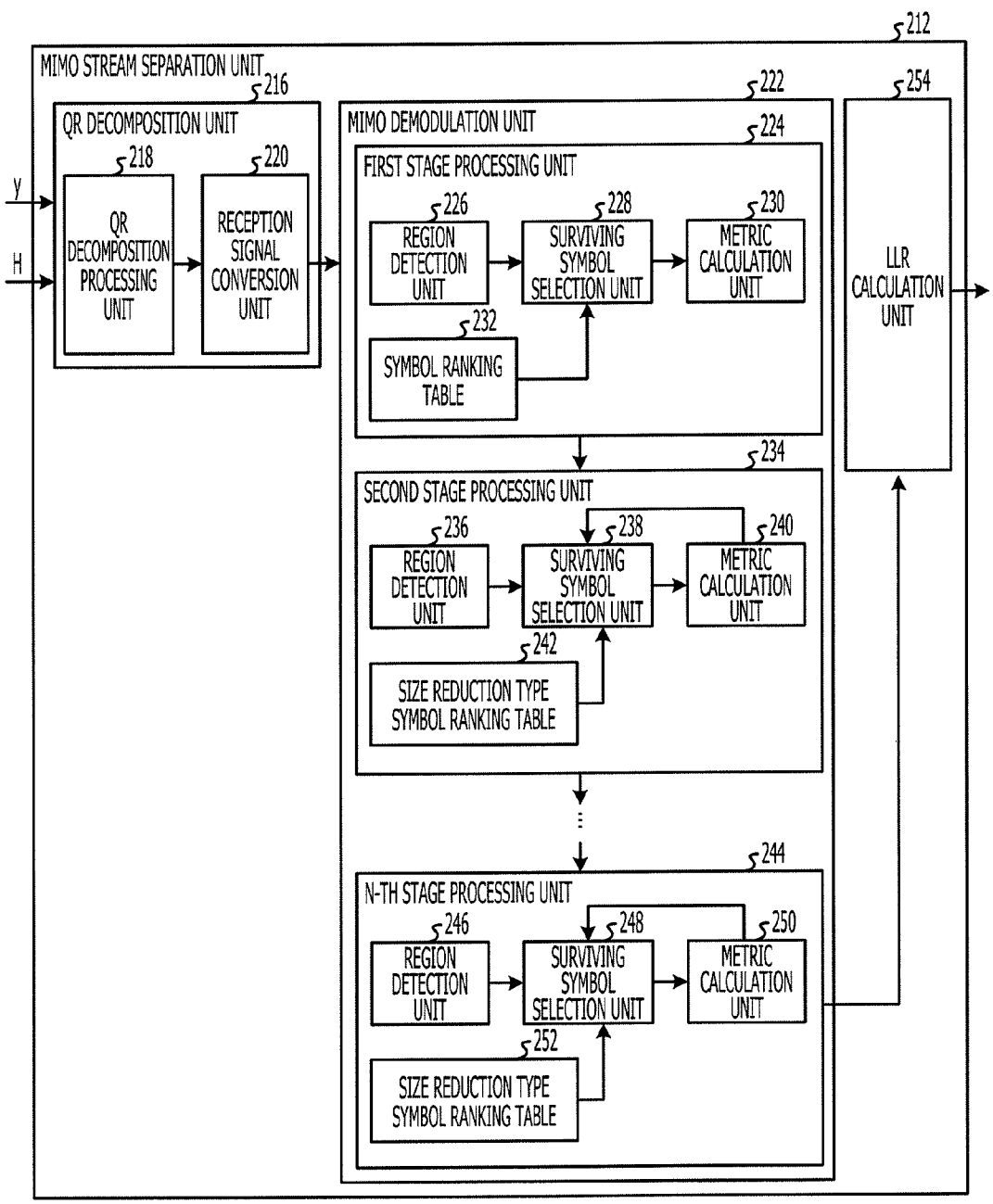
FIG. 3 illustrates a configuration example of a MIMO stream separation unit of Embodiment 1.

FIG. 3 illustrates a configuration example of the MIMO stream separation unit of Embodiment 1. As depicted in FIG. 3, the MIMO stream separation unit 212 includes a QR decomposition unit 216, a MIMO demodulation unit 222, and a log likelihood ratio (LLR) calculation unit 254. The QR decomposition unit 216 includes a QR decomposition processing unit 218 and a reception signal conversion unit 220. The MIMO demodulation unit 222 includes a first stage processing unit 224, a second stage processing unit 234, ..., and an N-th stage processing unit 244.

The first stage processing unit 224 includes a region detection unit 226, a surviving symbol selection unit 228, a metric calculation unit 230, and a symbol ranking table 232. The second stage processing unit 234 includes a region detection unit 236, a surviving symbol selection unit 238, a metric calculation unit 240, and a size reduction type symbol ranking table 242. The N-th stage processing unit 244 includes a region detection unit 246, a surviving symbol selection unit 248, a metric calculation unit 250, and a size reduction type symbol ranking table 252.

The QR decomposition unit 216 performs QR decomposition to decompose a channel matrix into a unitary matrix Q and an upper triangular matrix R, as expressed in expression (36).

$$H = QR = \begin{pmatrix} q_{11} & q_{12} & \cdots & q_{1,N} \\ q_{21} & q_{22} & \cdots & q_{2,N} \\ \vdots & \vdots & \ddots & \vdots \\ q_{N,1} & q_{N,2} & \cdots & q_{N,N} \end{pmatrix} \begin{pmatrix} r_{11} & r_{12} & \cdots & r_{1,N} \\ & r_{22} & \cdots & r_{2,N} \\ & & \ddots & \vdots \\ & O & & r_{N,N} \end{pmatrix} \quad (36)$$

Here, it is possible to set a diagonal element of the matrix R to a positive real number by appropriately selecting a unitary matrix Q. A unitary conversion unit multiplies a reception signal vector y by a Hermitian conjugate of the unitary matrix Q so as to obtain a unitary conversion vector z expressed as expression (37).

$$z = Q^H y \quad (37)$$

At this time, a relationship of expression (38) is established between the unitary conversion vector z and a transmission stream vector x.

$$u_N = \frac{z_N}{r_{N,N}} \quad (39)$$

The region detection unit 226 of the first stage performs region detection of the lowest stage by expression (39) so as to determine a region number $\epsilon^{(1)}$ of a region to which $u_N$ belongs.

$$u_N = \frac{z_N}{r_{N,N}} \quad (39)$$

The surviving symbol selection unit 228 refers to a symbol ranking table $\Omega$ which stores a result of ranking of symbol candidates which are preliminarily ranked in the order of shorter distance from a region center to each symbol candidate $c_{N,i}$ (i=1, 2, ..., $m_N$) of a transmission signal $x_N$, for each region number. Then, the surviving symbol selection unit 228 sets as many candidate replicas as $S_1$, the number of surviving candidates from the upper order of the ranking, as surviving paths of the first stage. The surviving symbol selection unit 228 sets the surviving path as expression (40).

$$\Pi_1^{(1)}(i) = \Omega^{(m_N)}(\epsilon, i), i=1, 2, \ldots, S_1 \quad (40)$$

Here, $\Pi(k)(i)$ represents the i-th surviving path on the k-th stage. $\Pi_j^{(k)}(i)$ denotes a path on the j-th stage (=1, 2, ..., k) of the i-th surviving path on the k-th stage. Further, $\Pi_{a\sim b}^{(k)}(i)$ (a<b) represents a partial path from the a-th stage to the b-th stage of the i-th surviving path on the k-th stage. For example, expression (42), expression (43), and expression (44) are obtained in a case of expression (41).

$$\Pi^{(4)} = \{(0,1,2,3),(0,2,1,1),(1,2,3,0),(2,0,0,1)\} \quad (41)$$

$$\Pi^{(4)}(2) = (0,2,1,1) \quad (42)$$

$$\Pi_3^{(4)}(3) = 3 \quad (43)$$

$$\Pi_{1\sim 3}(1) = (0,1,2) \quad (44)$$

The metric calculation unit 230 calculates a metric such as a squared Euclidean distance. In a case of a squared Euclidean distance, expression (45) is obtained. Here, $\Omega^{(4)}$, $\Omega^{(16)}$, and $\Omega^{(64)}$ respectively represent symbol ranking tables with respect to QPSK, 16QAM, and 64QAM.

$$d_1(\Pi_1^{(1)}(i)) = |z_N - r_{N,N} c_{N,\Pi_1^{(1)}(i)}|^2, i=1, 2, \ldots, S_1 \quad (45)$$

Expression (46) expresses a symbol number, which is stored in the symbol ranking table, on the i-th order of the ranking with respect to the region number $\epsilon^{(1)}$. Here, $c_{N,i}$ denotes a signal point of a modulation method which is used in transmission of a transmission stream $x_N$. Typical examples of the modulation method include QPSK, 16QAM, and 64QAM, but the embodiment is not limited to a specific modulation method.

$$\Omega^{(m_N)}(\epsilon^{(1)}, i) \quad (46)$$

Processing on the following k-th stage (for example, the second stage) is described. The region detection unit on the k-th stage performs region detection by expression (47) in which respective candidate replicas of $S_{k-1}$ surviving paths, which are survived on the k−1-th stage, are respectively cancelled from a reception signal $Z_{N-k+1}$ which is the k-th lowest signal, so as to determine a region number $\epsilon^{(k)}(i)$ of a region to which u expressed as expression (48) belongs.

$$u_{N-k+1,i}(\Pi^{(k-1)}(i)) = \quad (47)$$

$$\left( z_{N-k+1} - \sum_{p=1}^{k-1} r_{N-k+1, N-p+1} c_{N-p+1, \Pi_p^{(k-1)}(i)} \right) / r_{N-k+1, N-k+1},$$

$$i = 1, 2, \ldots, S_{k-1} \quad (48)$$
$$u_{N-k+1,i}(\Pi^{(k-1)}(i))$$

A surviving symbol selection unit (for example, the surviving symbol selection unit 238) adaptively selects a surviving path on the k-th stage as following. The surviving symbol selection unit first initializes a representative cumulative metric value E(i) and a current rank ρ(i) of each surviving path which is survived on the k−1-th stage so as to obtain expression (49), expression (50), and expression (51).

$$E(i) := d_{k-1}(\Pi^{(k-1)}(i)) \quad (49)$$

$$\rho(i) := 1 \quad (50)$$

$$q := 1 \quad (51)$$

The surviving symbol selection unit selects a candidate replica on the $\rho(i_{min})$-th order of the ranking of $i_{min}$ at which $\rho(i) \leq \text{MAX\_RANK}_k$ is satisfied and $E(i)$ has the minimum value, from the size reduction type symbol ranking table. The surviving symbol selection unit sets the q-th surviving path on the k-th stage as expression (52) and expression (53).

$$\Pi^{(k)}_{l-k-1}(q) = \Pi^{(k-1)}(i_{min}) \quad (52)$$
$$\Pi^{(k)}_k(q) = \Omega^{(m_{N-k+1})}(\varepsilon^{(k)}(i_{min}), \rho(i_{min}))$$

$$i_{min} = \arg_{\rho(i) \leq MAX\_RANK_k} (\min[E(i)]) \quad (53)$$

Here, $\text{MAX\_RANK}_k$ is a predetermined rank upper limit value of the k-th stage. $\text{MAX\_RANK}_k$ may be set to have a different value for every modulation method of the k-th stage. Further, it is assumed that $S_{k-1} \times \text{MAX\_RANK}_k \geq S_k$ is satisfied so as to enable selection of $S_k$ surviving candidates.

A metric calculation unit (for example, the metric calculation unit 240) calculates a cumulative metric as expression (54).

$$d_k(\Pi^{(k)}(q)) = d_{k-1}(\Pi^{(k-1)}(i_{min})) + \quad (54)$$
$$\left| z_{N-k+1} - \sum_{p=1}^{k-1} r_{N-k+1,N-p+1} c_{N-p+1,\Pi^{(k)}_p(q)} - r_{N-k+1,N-k+1} c_{N-k+1,\Pi^{(k)}_k(q)} \right|^2$$

Then, the metric calculation unit updates the cumulative metric as expression (55), expression (56), and expression (57).

$$E(i_{min}) := d_k(\Pi^{(k)}(q)) \quad (55)$$
$$\rho(i_{min}) := \rho(i_{min}) + 1 \quad (56)$$
$$q := q + 1 \quad (57)$$

The metric calculation unit performs the above-mentioned processing until q reaches the number $S_k$ of surviving paths of the k-th stage. Each stage processing unit performs similar processing up to the N-th stage.

Region detection and a size reduction type symbol ranking table are now described in detail. The symbol ranking table of the first stage processing unit may sufficiently have only a sub-set part of $S_1$ columns on the left side of the symbol ranking tables depicted on FIGS. 41 to 45.

A size reduction type symbol ranking table of the k-th stage and region detection are described in detail below. As a setting value of $\text{MAX\_RANK}_k$, examples of expression (58), expression (59), and expression (60) are illustrated. Here, an example of N=4 is illustrated. Further, this parameter is merely an example and other setting values may be used.

$$\text{MAX\_RANK}_2^{(QPSK)} = \text{MAX\_RANK}_3^{(QPSK)} = \text{MAX\_RANK}_4^{(QPSK)} = 3 \quad (58)$$

$$\text{MAX\_RANK}_2^{(16QAM)} = \text{MAX\_RANK}_3^{(16QAM)} = \text{MAX\_RANK}_4^{(16QAM)} = 8 \quad (59)$$

$$\text{MAX\_RANK}_2^{(64QAM)} = \text{MAX\_RANK}_3^{(64QAM)} = \text{MAX\_RANK}_4^{(64QAM)} = 16 \quad (60)$$

Figure 4:
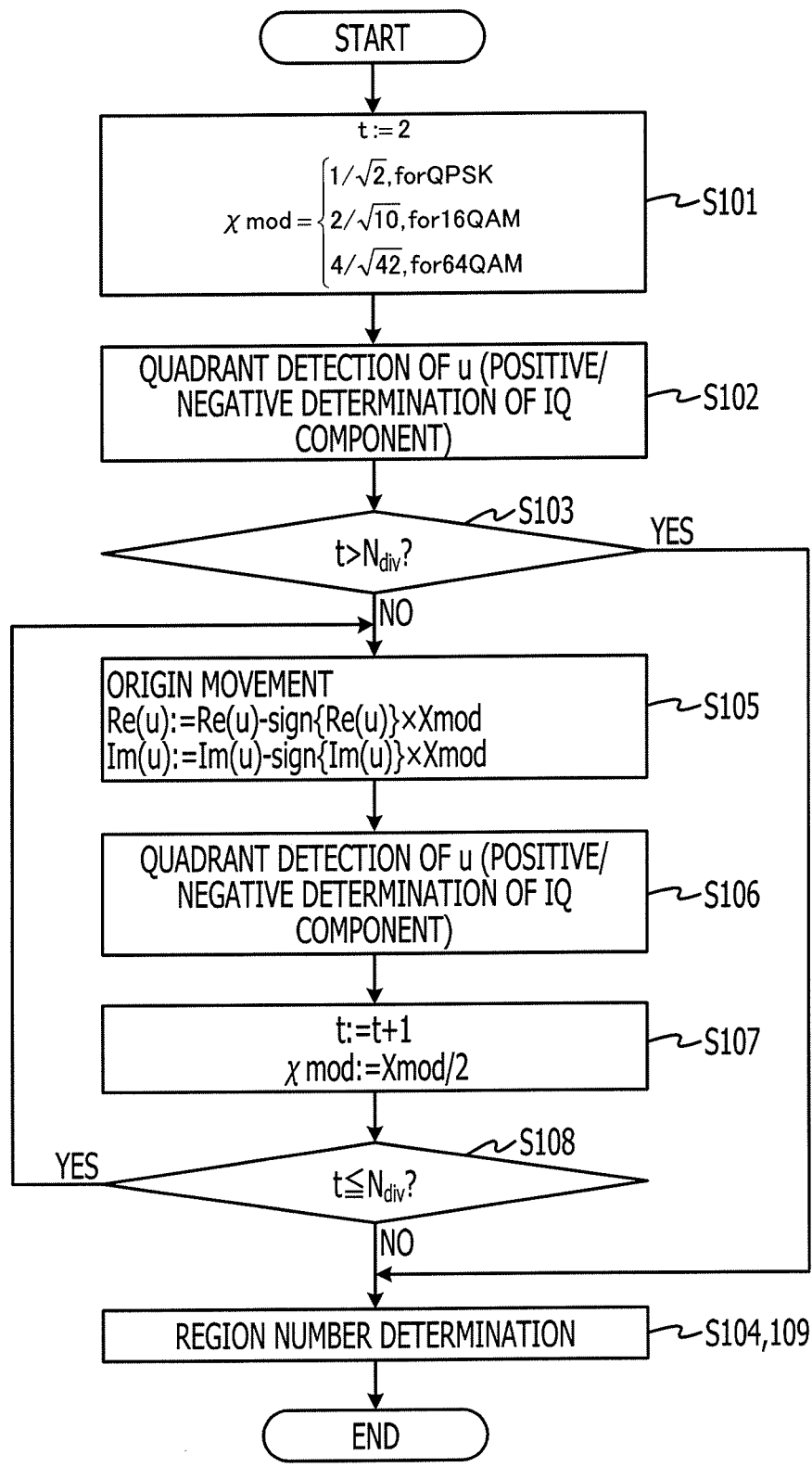
FIG. 4 is a flowchart of region detection.

Description of region detection here is common in every stage, so that an index of a signal for performing region detection is omitted and a signal is denoted as u. FIG. 4 is a flowchart of region detection. The region detection unit first sets t to 2 and sets χmod as expression (61) (S101).

$$\chi_{mod} = \begin{cases} 1/\sqrt{2}, & \text{for } QPSK \\ 2/\sqrt{10}, & \text{for } 16QAM \\ 4/\sqrt{42}, & \text{for } 64QAM \end{cases} \quad (61)$$

Further, the region detection unit determines positive/negative of a real part and an imaginary part of $u^{(1)} = u$ (positive/negative of an IQ component) so as to determine which quadrant u belongs to, in the first-time detection (S102). The region detection unit determines whether $t > N_{div}$ is satisfied or not (S103). When $t > N_{div}$ is satisfied (S103, Yes), the region detection unit determines a region number (S104). When $t > N_{div}$ is not satisfied (S103, No), the region detection unit moves an origin to a center (expression (62)) of the quadrant which is determined on the first-time detection (S105). Further, the region detection unit performs quadrant detection of $u^{(2)}$ which is obtained by moving the origin to the center (expression (62)) of the quadrant which is determined on the first-time detection, in the second-time detection (S106). Here, sign(x) is expressed as expression (63).

$$(\text{sign}\{\text{Re}(u)\} \cdot \chi_{mod}, \text{sign}\{\text{Im}(u)\} \cdot \chi_{mod}) \quad (62)$$

$$\text{sign}(x) = \begin{cases} 1, & x \geq 0 \\ -1, & x < 0 \end{cases} \quad (63)$$

Subsequently, the region detection unit increments t and sets χmod to χmod/2 (S107). Then, the region detection unit determines whether $t \leq N_{div}$ is satisfied or not (S108). When $t \leq N_{div}$ is satisfied (S108, Yes), the region detection unit returns to S105 and repeats the processing. Here, on t-th time detection, the region detection unit performs quadrant detection of $u^{(t)}$ which is obtained by moving the origin to a center (expression (64)) of a quadrant which is determined on the t−1-th time detection.

$$\left( \sum_{p=1}^{t-1} \text{sign}\{\text{Re}(u^{(p)})\} \cdot \chi_{mod}/2^{p-1}, \sum_{p=1}^{t-1} \text{sign}\{\text{Im}(u^{(p)})\} \cdot \chi_{mod}/2^{p-1} \right) \quad (64)$$

When $t \leq N_{div}$ is not satisfied (S108, No), the region detection unit determines a region number (S109). That is, the region detection unit repeats the above-mentioned processing $N_{div}$ times in sequence so as to determine which region u belongs to among regions the number of which is expressed by expression (65).

$$N_{area} = 2^{2N_{div}} \quad (65)$$

Figure 5:
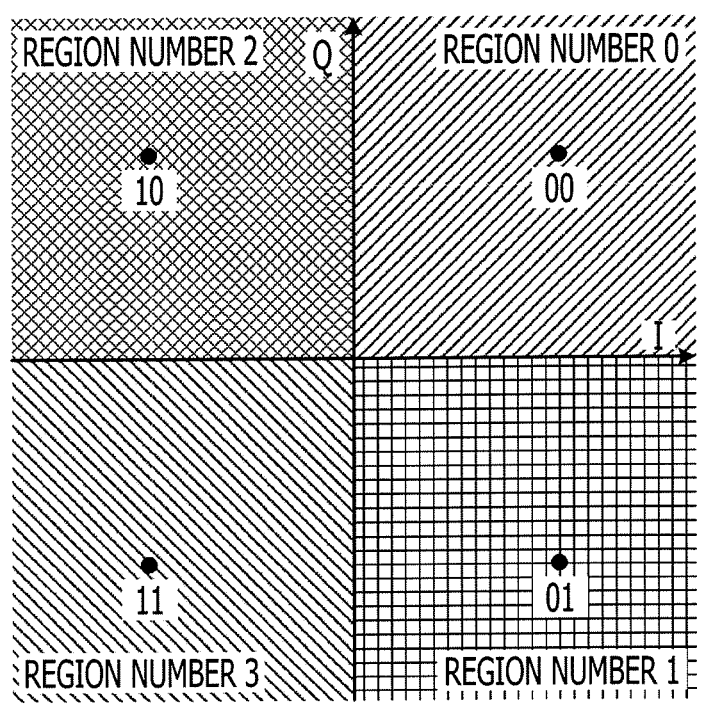
FIG. 5 illustrates an example of region detection in QPSK ($N_{div}=1$).

Here, an example of a way of assigning a region number of $N_{div} = 1$ in QPSK is described. FIG. 5 illustrates an example of region detection in QPSK ($N_{div} = 1$). Further, FIG. 6 illustrates an example of a size reduction type symbol ranking table in QPSK and $N_{div} = 1$.

Symbol numbers are held for every region in the order of shorter distances between a representative point of a region (a symbol position included in a region) and a symbol. A representative point is expressed by expression (66) by using a region number E. Here, bit(ε,n) in expression (67) denotes a bit value on the N-th (1 to $2N_{div}$) bit from MSB of ε which is expressed by a bit width of $2N_{div}$[bit]. In this case, a representative point of each region is same as a symbol position which belongs to each region.

$$\left(\sum_{p=1}^{N_{div}} \text{bit\_sign}(\varepsilon, 2p-1) \cdot \chi_{mod}/2^{p-1}, \right. \tag{66}$$

$$\left. \sum_{p=1}^{N_{div}} \text{bit\_sign}(\varepsilon, 2p) \cdot \chi_{mod}/2^{p-1} \right)$$

$$\text{bit\_sign}(\varepsilon, n) = \begin{cases} 1, & \text{bit}(\varepsilon, n) = 0 \\ -1, & \text{bit}(\varepsilon, n) = 1 \end{cases} \tag{67}$$

Here, MAX_RANK$^{(QPSK)}_k$=3 is set, so that only symbol numbers up to the third order in the ranking are held. Therefore, as depicted in FIG. 6, the number of words of the table is 4 (the number of regions)×3(MAX_RANK$^{(QPSK)}_k$)=12. Thus, the table size is 3/4 times as large as that of related art. Here, in a case of N$_{div}$=1, it is difficult to discriminate between a symbol which is the second closest to a representative point of a region and a symbol which is the third closest to the representative point. For example, in a case of a region 0, it is difficult to determine which of 10 (decimal: 2) and 01 (decimal: 1) is closer, so that a table may be arbitrarily formed in advance to determine which goes to the second order or the third order. Further, the way of assigning a region number is an example and a region number may be arbitrarily assigned. In this case, rows of the size reduction type symbol ranking table depicted in FIG. 6 are merely exchanged. The same goes for the following examples.

Here, in the example in QPSK and N$_{div}$=1, it is difficult to discriminate between a symbol which is the second closest to a representative point of a region and a symbol which is the third closest to the representative point, so that a table may be arbitrarily formed to determine which goes to the second order or the third order. Further, accuracy of the ranking may be improved by increasing the number N$_{div}$ of times of quadrant detection, as well.

Figure 7:
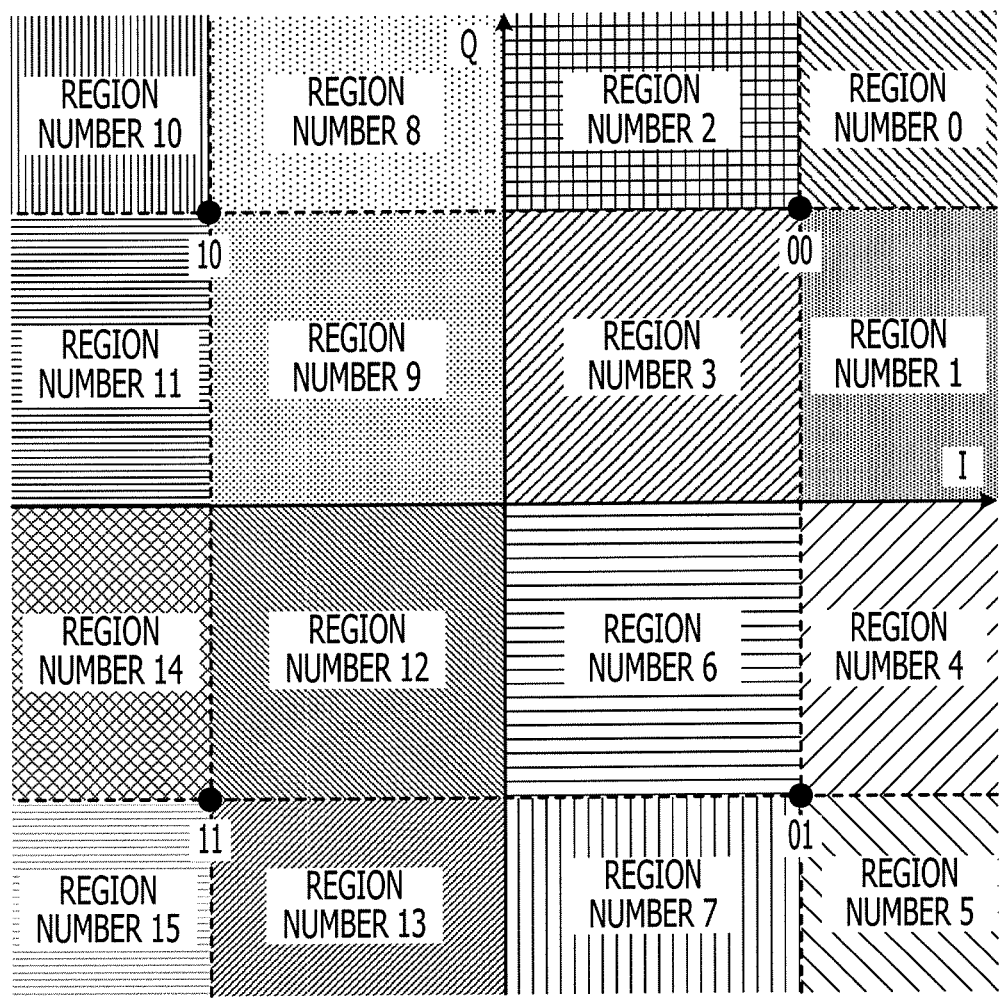
FIG. 7 illustrates an example of region detection in QPSK ($N_{div}=2$).

An example in N$_{div}$=2 in QPSK is described. FIG. 7 illustrates an example of region detection in QPSK (N$_{div}$=2). In this case, a representative point of each region is any one of (±{1,3}/2√2, ±{1,3}/2√2).

Further, a size reduction type symbol ranking table is described. FIG. 8 illustrates an example of a size reduction type symbol ranking table in QPSK and N$_{div}$=2. In regions 1, 2, 4, 7, 8, 11, 13, and 14, a symbol which is the second closest to a representative point of a region and a symbol which is the third closest to the representative point are discriminated from each other. Thus, accuracy of the size reduction type symbol ranking table is improved. Further, MAX_RANK$^{(QPSK)}_k$=3 is set, so that only symbol numbers up to the third order in the ranking are held.

A way of assigning a region number and an example of a size reduction type symbol ranking table in 16QAM and N$_{div}$=2 are now described.

Figure 9:
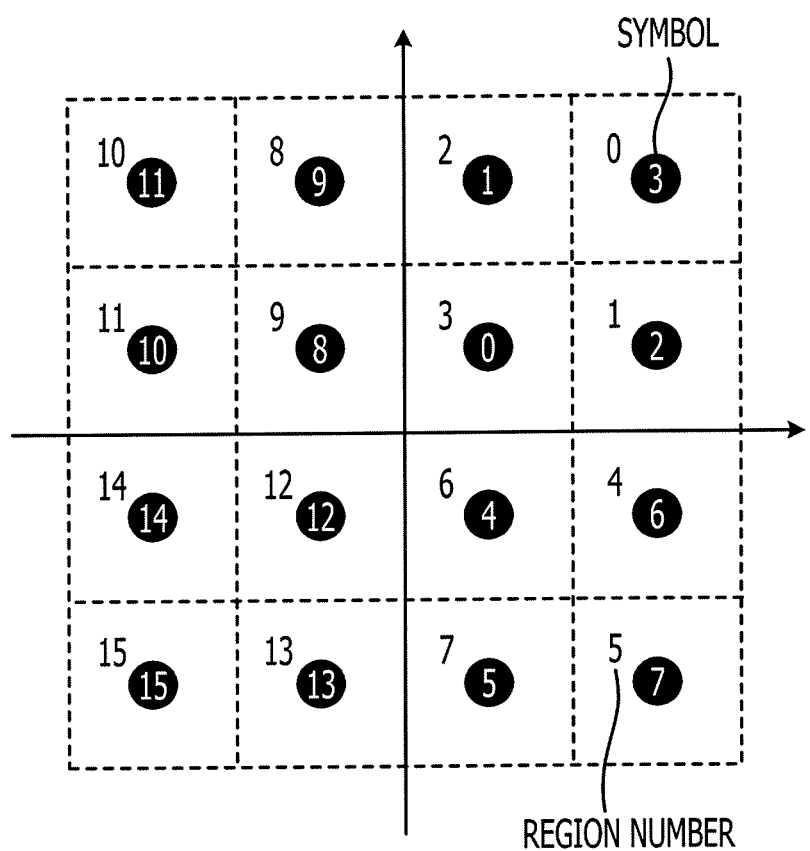
FIG. 9 illustrates an example in 16QAM ($N_{div}=2$).

FIG. 9 illustrates an example of 16QAM (N$_{div}$=2). FIG. 10 illustrates an example of a size reduction type symbol ranking table in 16QAM (N$_{div}$=2).

Outline digits in symbols in FIG. 9 represent symbol numbers (obtained by converting bit columns into decimal numbers). In this case, a representative point of each region is same as a symbol position which is included in the region. As depicted in FIG. 10, MAX_RANK$^{(16QAM)}_k$=8 is set, so that the size reduction type symbol ranking table holds only symbol numbers up to the eighth order of the ranking.

Figure 11:
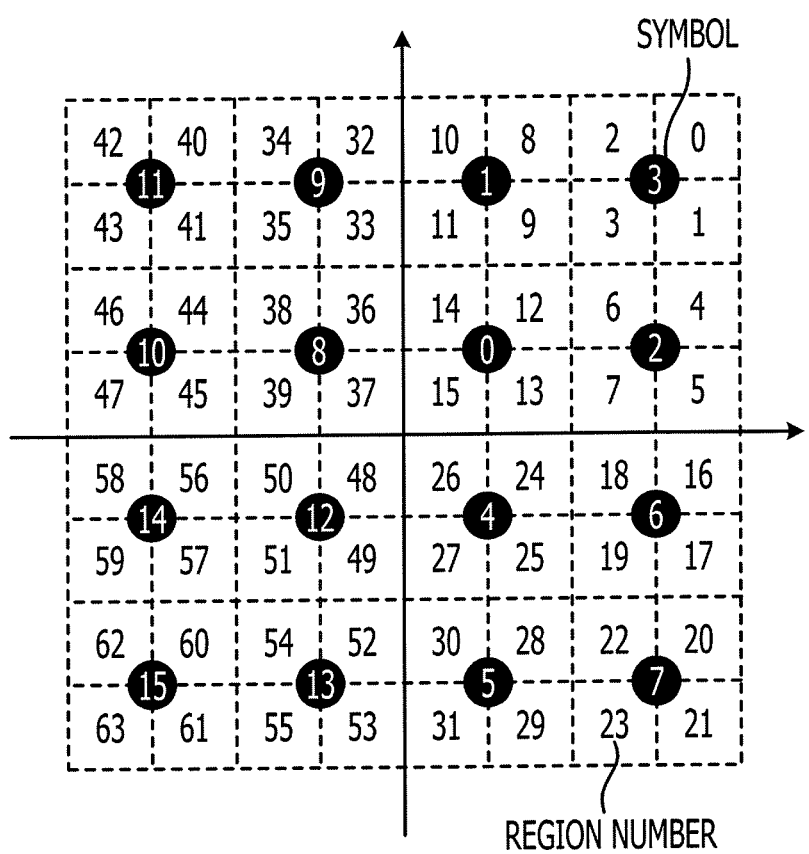
FIG. 11 illustrates an example in 16QAM ($N_{div}=3$).

A way of assigning a region number and an example of a size reduction type symbol ranking table in 16QAM and N$_{div}$=3 are now described. FIG. 11 illustrates an example of 16QAM (N$_{div}$=3). FIG. 12 illustrates an example of a size reduction type symbol ranking table in 16QAM (N$_{div}$=3).

In this case, a representative point of each region is any one of (±{1,3,5,7}/2√10, ±{1,3,5,7}/2√10). As depicted in FIG. 12, MAX_RANK$^{(16QAM)}_k$=8 is set, so that the size reduction type symbol ranking table holds only symbol numbers up to the eighth order of the ranking.

Figure 13:
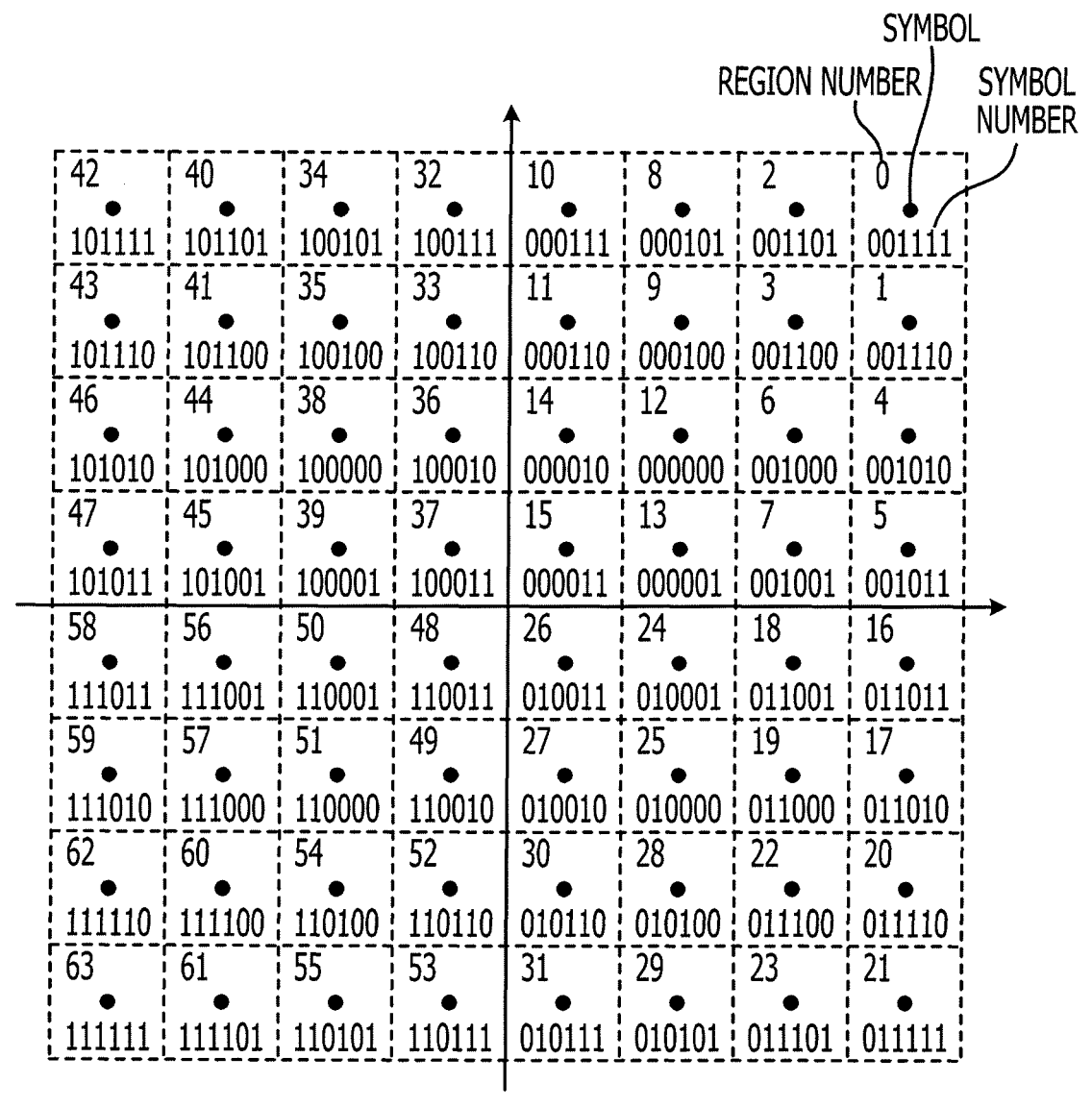

A way of assigning a region number and an example of a size reduction type symbol ranking table in 64QAM and N$_{div}$=3 are now described. FIG. 13 illustrates an example of 64QAM (N$_{div}$=3). FIG. 14 illustrates an example of a size reduction type symbol ranking table in 64QAM and N$_{div}$=3.

In this case, a representative point of each region is same as a symbol position which is included in the region. As depicted in FIG. 14, MAX_RANK$^{(16QAM)}_k$=32 is set, so that the size reduction type symbol ranking table holds only symbol numbers up to the 32nd order of the ranking.

As described above, it is understood that it is sufficient for the size reduction type symbol ranking table to have only a sub-set part of MAX_RANK$_k$ columns on the left side of the symbol ranking tables depicted in FIGS. 41 to 45. That is, it is understood that the size reduction type symbol ranking table may be easily applied to a case of a setting value which is different from a setting value example of MAX_RANK$_k$ illustrated in this example.

Figure 15A:
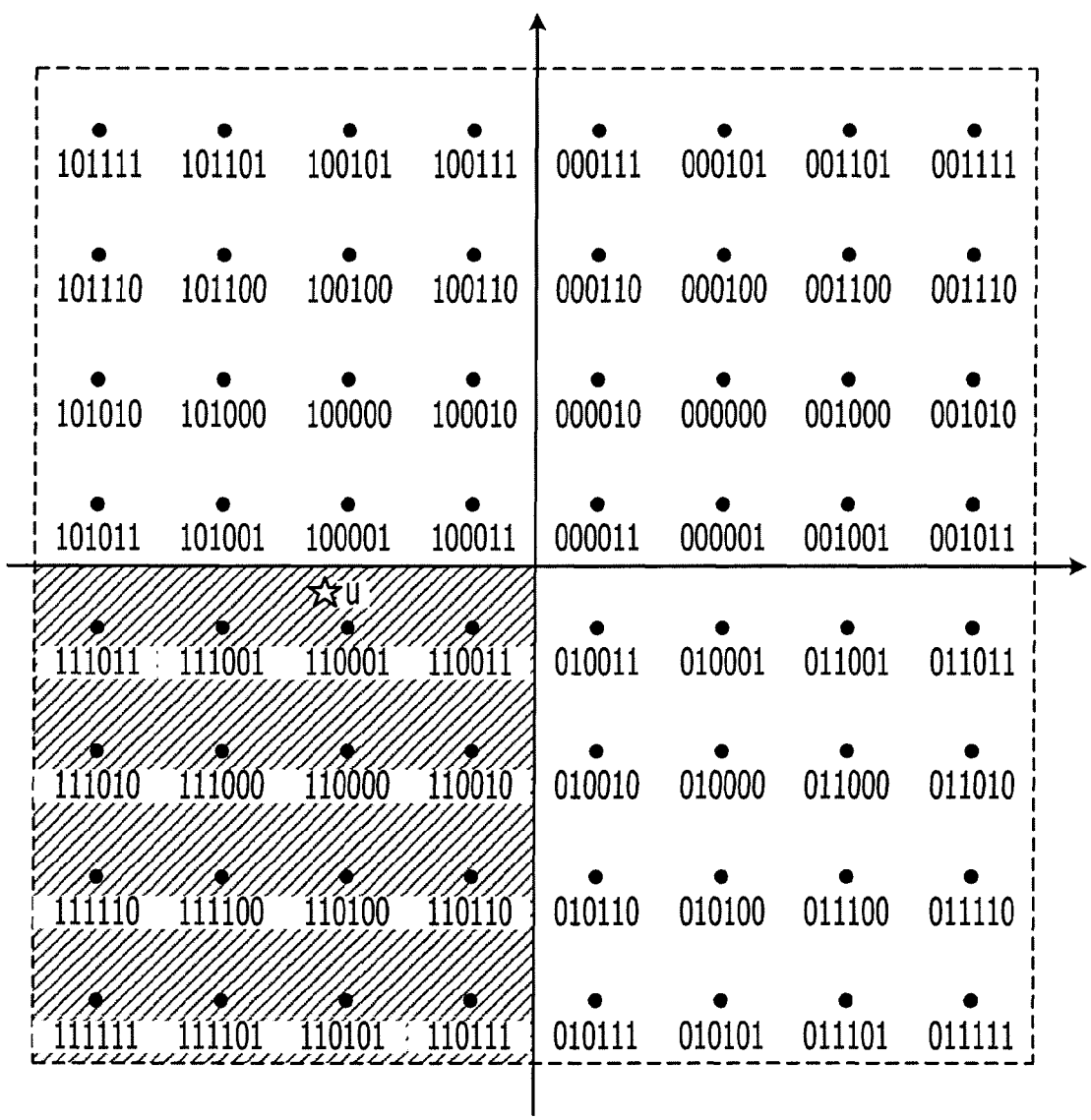
FIGS. 15A to 15C illustrate an example of region detection.
Figure 15B:
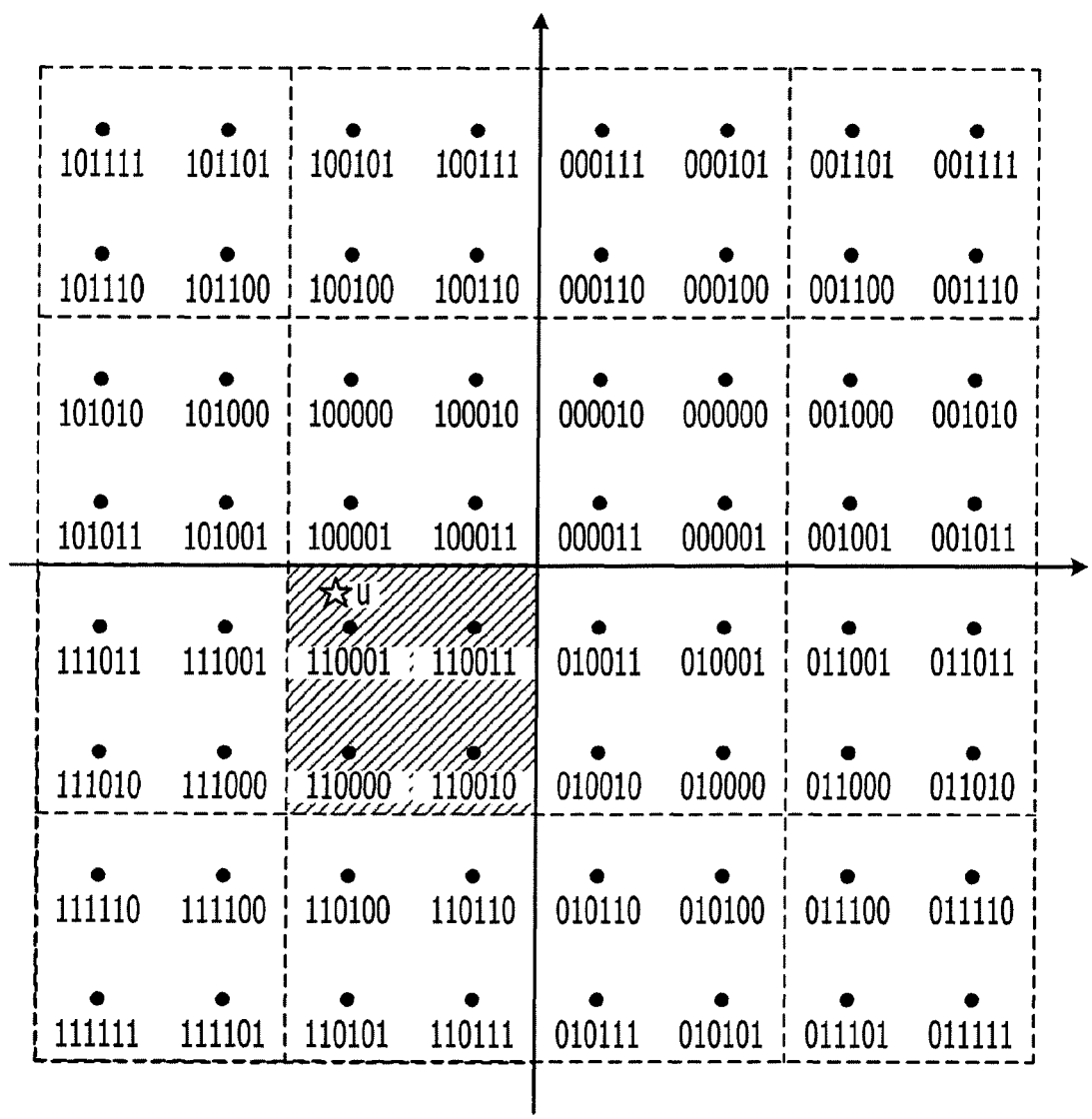
Figure 15C:
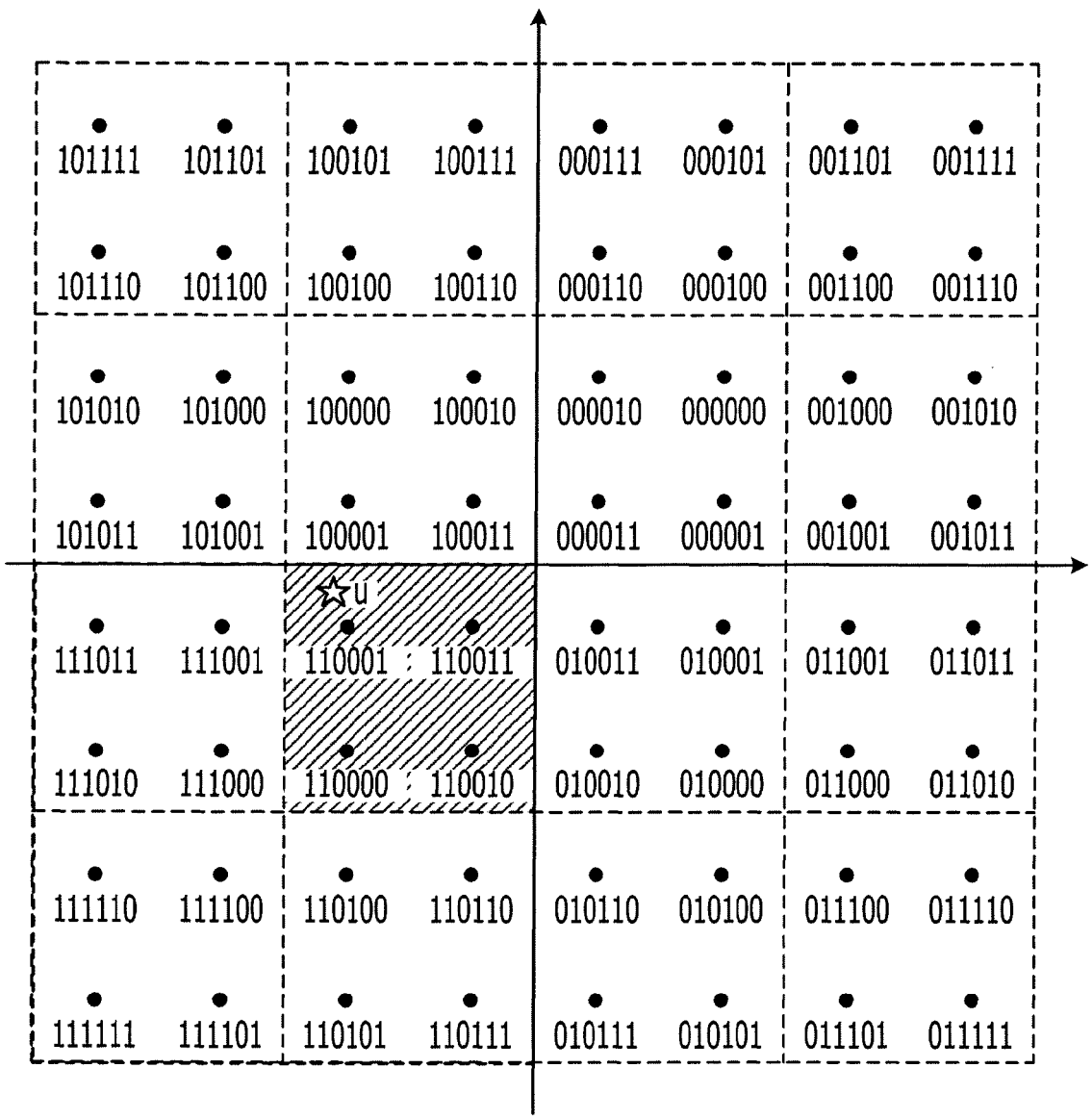

A concrete example of region detection is now described by taking a case of 64QAM as an example. FIGS. 15A to 15C illustrate an example of region detection. In the example of FIGS. 15A to 15C, u are denoted by a star and N$_{div}$=3 holds. As the lower left of FIGS. 15A to 15C, a region is divided into 64 regions and region numbers are assigned to the regions as numbers of the upper left in the regions. Since both of a real part and an imaginary part are negative in positive/negative determination in the first-time quadrant detection, it is determined that u belongs to the fourth quadrant. Then, since it is determined that u belongs to the fourth quadrant in the first-time quadrant detection, an origin is moved to (−4/√42, −4/√42). Expression (68) is obtained by subtracting a coordinate which is to be the next origin from u.

$$u^{(2)} = \{Re(u)+4/\sqrt{42}\} + j\{Im(u)+4/\sqrt{42}\} \tag{68}$$

Positive/negative determination of a real part and an imaginary part of u$^{(2)}$ is performed similarly in the second-time quadrant detection, and the first quadrant is detected as a result of the determination. The origin is moved to (−2/√42, −2/√42) as is the case with the first-time quadrant detection. The third-time quadrant detection is performed and the third quadrant is detected. As a result, it is determined that u belongs to a region of region number 50.

Returning to the description of FIG. 3, the LLR calculation unit 254 calculates a bit LLR for every transmission stream. The LLR calculation unit 254 first searches the minimum value of a cumulative metric so as to set a surviving path of which a cumulative metric has the minimum value, as a combination of maximum likelihood symbols. A bit LLR of the N-th bit of the first stream x$_l$ is difference between a sum metric with respect to the maximum likelihood symbol combination and the minimum value of a cumulative metric with respect to a symbol having a reversal value of the N-th bit of the maximum likelihood symbol. Specifically, a bit LLR is expressed as expression (72) under conditions of expression (69), expression (70), and expression (71).

$$\Pi^{(N),ML} = \operatorname{argmin}[d_N(\Pi^{(N)}(i)] \quad (69)$$

$$d_{l,min}(b_n = \operatorname{bit}(\Pi_l^{(N),ML}, n)) = d(\Pi^{(N),ML}) \quad (70)$$

$$d_{l,min}(b_n = invbit(\Pi_l^{(N),ML}, n)) = \min_{bit(\Pi_1^{(N)},n)=invbit(\Pi_l^{(N),ML},n)} [d(\Pi_l^{(N)})] \quad (71)$$

$$LLR_l(n) = d_{l,min}(b_n = 1) - d_{l,min}(b_n = 0) \quad (72)$$

Here, l denotes a stream number, and bit(x,n) and invbit(x, n) respectively denote the N-th bit value and the N-th reversal bit value of x. Though a bit LLR is difference of metrics in the above description, a bit LLR may be expressed as expression (73) by square roots.

$$LLR_l(n) = \sqrt{d_{l,min}(b_n=1)} - \sqrt{d_{l,min}(b=0)} \quad (73)$$

Figure 16:
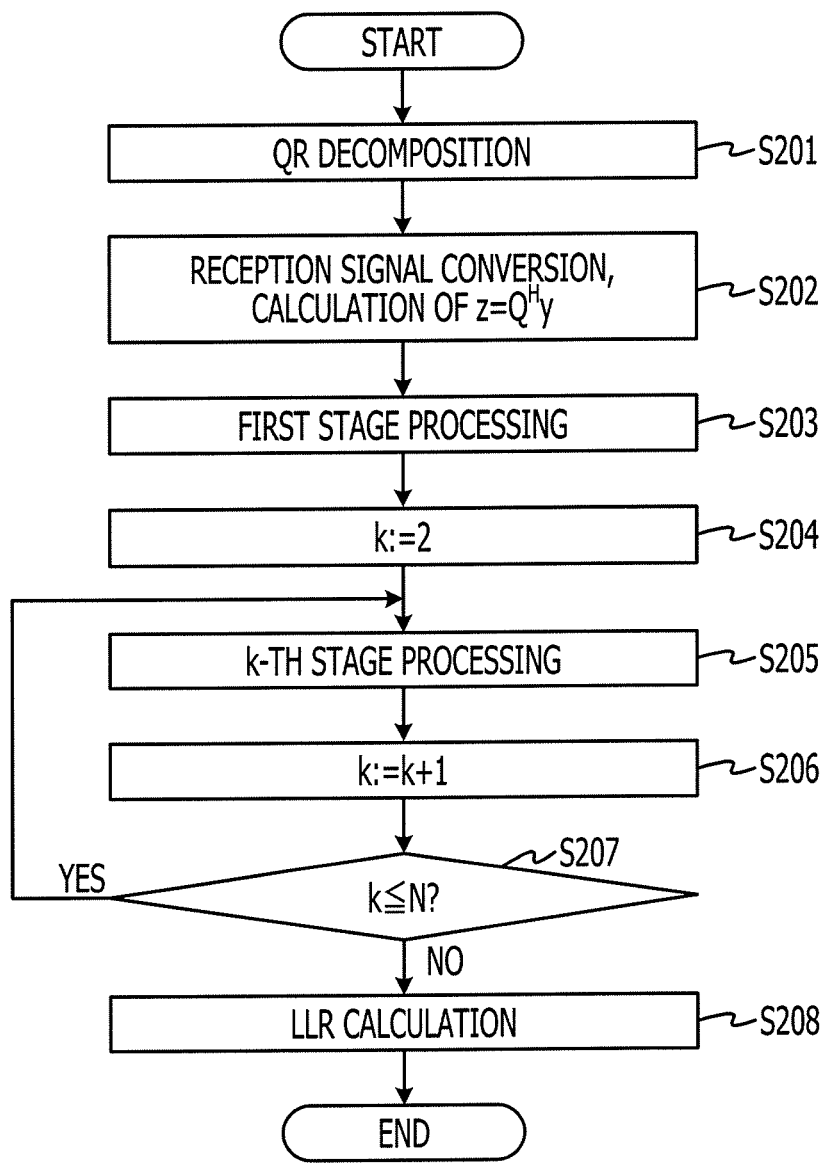
FIG. 16 is a flowchart of Embodiment 1.

A flowchart of the MIMO stream separation unit of Embodiment 1 is now described. FIG. 16 is a flowchart of Embodiment 1. As depicted in FIG. 16, the QR decomposition processing unit 218 performs QR decomposition (S201). Subsequently, the reception signal conversion unit 220 performs reception signal conversion and calculates a unitary conversion vector z (S202). Then, the first stage processing unit 224 performs first stage processing (S203). The first stage processing will be described in detail later.

Subsequently, the MIMO demodulation unit 222 sets k to 2 (S204). Then, the k-th stage processing unit performs k-th stage processing (S205). The k-th stage processing will be described in detail later. Subsequently, the MIMO demodulation unit 222 increments k (S206) so as to determine whether k≤N is satisfied or not (S207).

When k≤N is satisfied (S207, Yes), the MIMO demodulation unit 222 returns to S205 and repeats the processing. On the other hand, when k≤N is not satisfied (S207, No), the LLR calculation unit 254 calculates a LLR as described above (S208).

Figure 17:
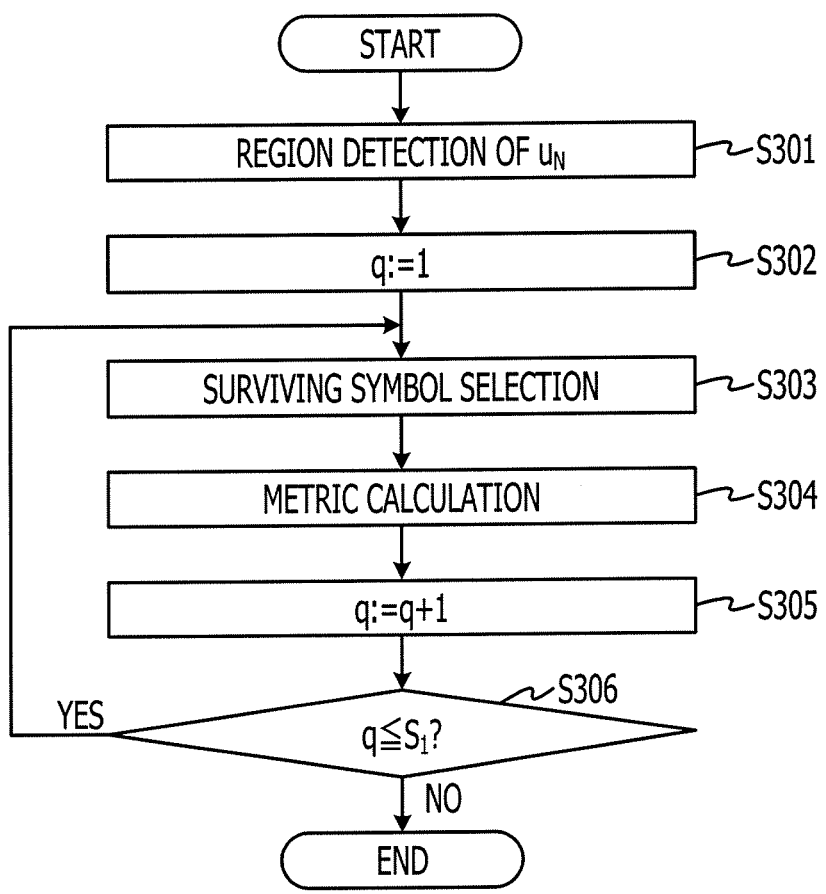
FIG. 17 is a flowchart of first stage processing.

A flowchart of the first stage processing is now described. FIG. 17 is a flowchart of the first stage processing. As depicted in FIG. 17, the region detection unit 226 detects a region of $u_N$ (S301). Subsequently, the first stage processing unit 224 sets q to 1 (S302). Then, the surviving symbol selection unit 228 selects a surviving symbol (S303). The selection of a surviving symbol will be described later.

Subsequently, the metric calculation unit 230 calculates a metric as described above (S304). Then, the first stage processing unit 224 increments q (S305) so as to determine whether q≤$S_1$ is satisfied or not (S306). When q≤$S_1$ is satisfied (S306, Yes), the first stage processing unit 224 returns to S303 and repeats the processing. On the other hand, when q≤$S_1$ is not satisfied (S306, No), the first stage processing unit 224 ends the processing.

Figure 18:
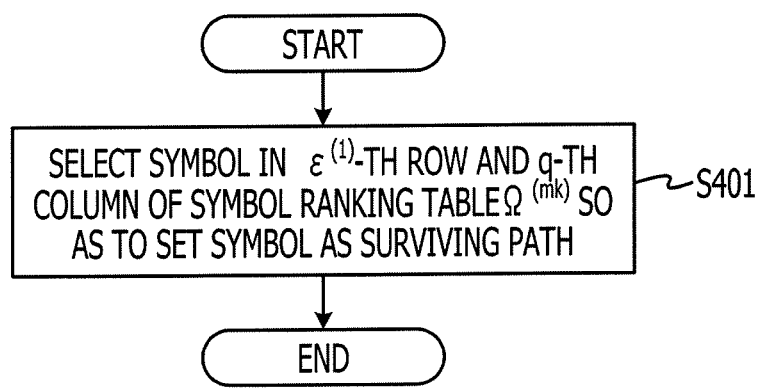
FIG. 18 is a flowchart of surviving symbol selection of the first stage processing.

A flowchart of surviving symbol selection of the first stage processing is now described. FIG. 18 is a flowchart of the surviving symbol selection of the first stage processing. As depicted in FIG. 18, the surviving symbol selection unit 228 selects a symbol in the $\epsilon^{(1)}$-th row and q-th column of a symbol ranking table $\Omega^{(mk)}$ so as to set the symbol as a surviving path (S401).

Figure 19:
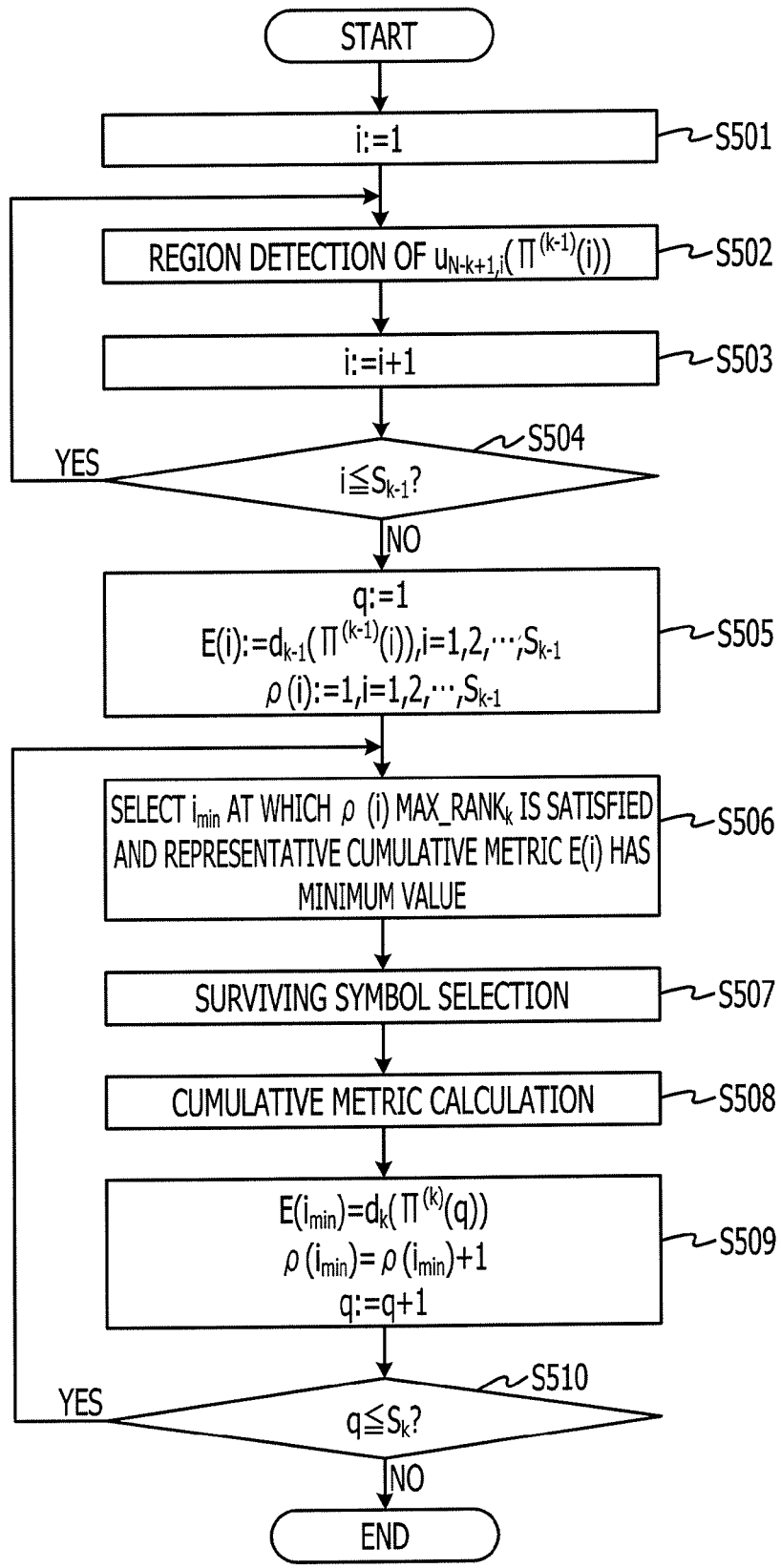
FIG. 19 is a flowchart of k-th stage processing.

A flowchart of the k-th stage processing is now described. FIG. 19 is flowchart of the k-th stage processing. As depicted in FIG. 19, the k-th stage processing unit sets i to 1 (S501). Subsequently, the region detection unit performs region detection as expression (47) (S502). Then, the region detection unit increments i (S503). After that, the region detection unit determines whether i≤$S_{k-1}$ is satisfied or not (S504).

When i≤$S_{k-1}$ is satisfied (S504, Yes), the region detection unit returns to S502 and repeats the processing.

On the other hand, when i≤$S_{k-1}$ is not satisfied (S504, No), the surviving symbol selection unit initializes a representative cumulative metric value E(i) and a current rank ρ(i) of each surviving path which is survived in the k-1-th stage as expression (49), expression (50), and expression (51) (S505). Subsequently, the surviving symbol selection unit selects $i_{min}$ at which ρ(i)≤MAX_RANK$_k$ is satisfied and the representative cumulative metric E(i) has the minimum value (S506).

Then, the surviving symbol selection unit selects a surviving symbol (S507). The selection of a surviving symbol will be described later. Subsequently, the metric calculation unit calculates a cumulative metric as expression (54) (S508). Then, the metric calculation unit updates the cumulative metric as expression (55), expression (56), and expression (57) (S509).

Subsequently, the metric calculation unit determines q≤$S_k$ is satisfied or not (S510). When q≤$S_k$ is satisfied (S510, Yes), the surviving symbol selection unit returns to S506 and repeats the processing. On the other hand, when q≤$S_k$ is not satisfied (S510, No), the metric calculation unit ends the processing.

Figure 20:
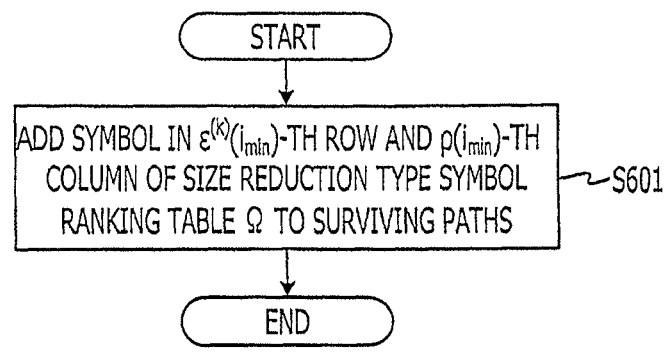
FIG. 20 is a flowchart of surviving symbol selection of the k-th stage processing.

A flowchart of the surviving symbol selection in the k-th stage processing is now described. FIG. 20 is a flowchart of the surviving symbol selection in the k-th stage processing. As depicted in FIG. 20, the surviving symbol selection unit adds a symbol in the $\epsilon^{(k)}(i_{min})$-th row and ρ($i_{min}$)-th column of the size reduction type symbol ranking table Ω to surviving paths (S601).

As described above, according to Embodiment 1, a current rank of each surviving path does not become larger than the predetermined rank upper limit value MAX_RANK, so that it is sufficient for the symbol ranking table to hold only symbol candidates which are equal to or smaller than the MAX_RANK. As a result, according to Embodiment 1, it is possible to reduce the size of a symbol ranking table compared to related art. Here, MAX_RANK, and $N_{div}$ are not limited to the example described in the embodiment.

(Solving Aspect 2)

A basic idea of a second solving aspect of the present disclosure is now described. In the second aspect, a symbol ranking table is separated into a symbol higher order ranking table which holds symbol candidates which are placed on rank orders higher than a certain rank order $\rho_{th}$ in ranking and a symbol lower order ranking table which holds symbol candidates which are placed on rank orders equal to or lower than $\rho_{th}$ in the ranking. Further, in the second aspect, the symbol lower order ranking table holds symbol candidates in the order of shorter distances from a representative point of $N_{adj}$ regions which are adjacent to each other. Accordingly, it is possible to reduce the number of words of the symbol lower order ranking table and thus reduce the table size.

Figure 21:
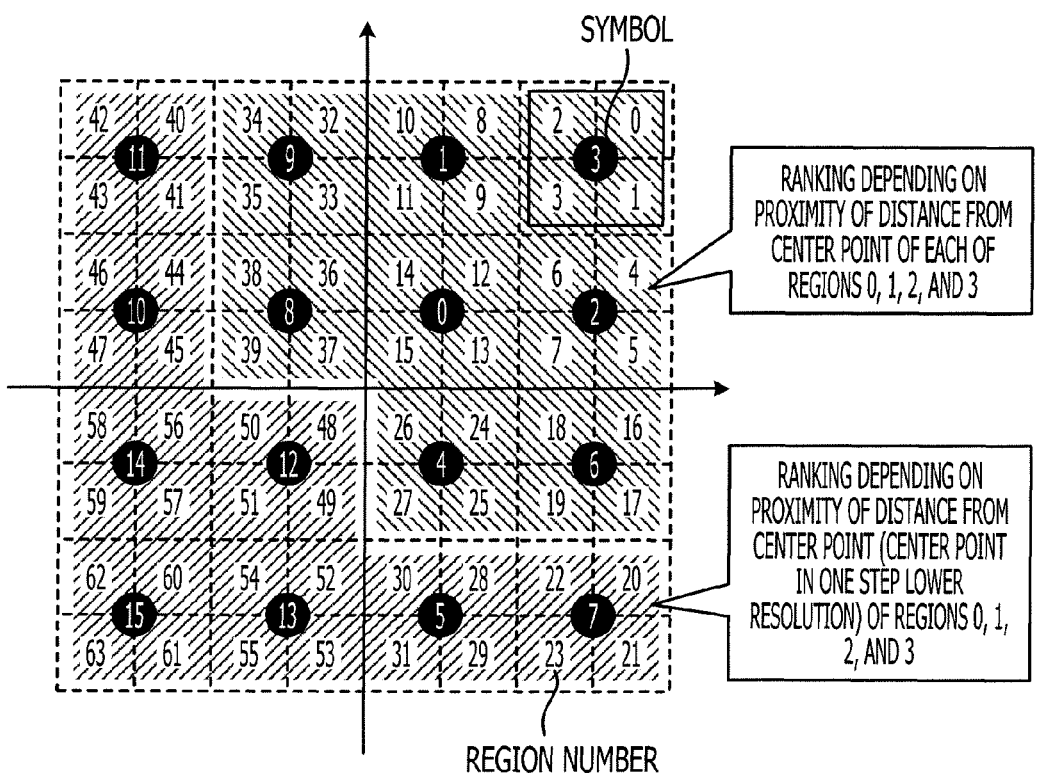
FIG. 21 illustrates an outline of a second aspect.

FIG. 21 schematically illustrates the second aspect. As depicted in FIG. 21, in a case where the number of regions is 64 in 16QAM, for example, higher order symbol candidates on the first to eighth orders are common in regions 0, 1, 2, and 3, and lower order symbol candidates on the eighth to 16th orders are also common. In the second aspect, regarding symbol candidates on higher orders, symbol candidates which are ranked for respective regions are held in the symbol higher order ranking table in order to maintain ranking accuracy. Further, in the second aspect, regarding symbol candidates on lower orders, ranking accuracy is reduced and symbol candidates are held in the symbol lower order ranking table in the order of shorter distances from a representative point of adjacent regions for every group of adjacent regions.

(Embodiment 2)

Figure 22:
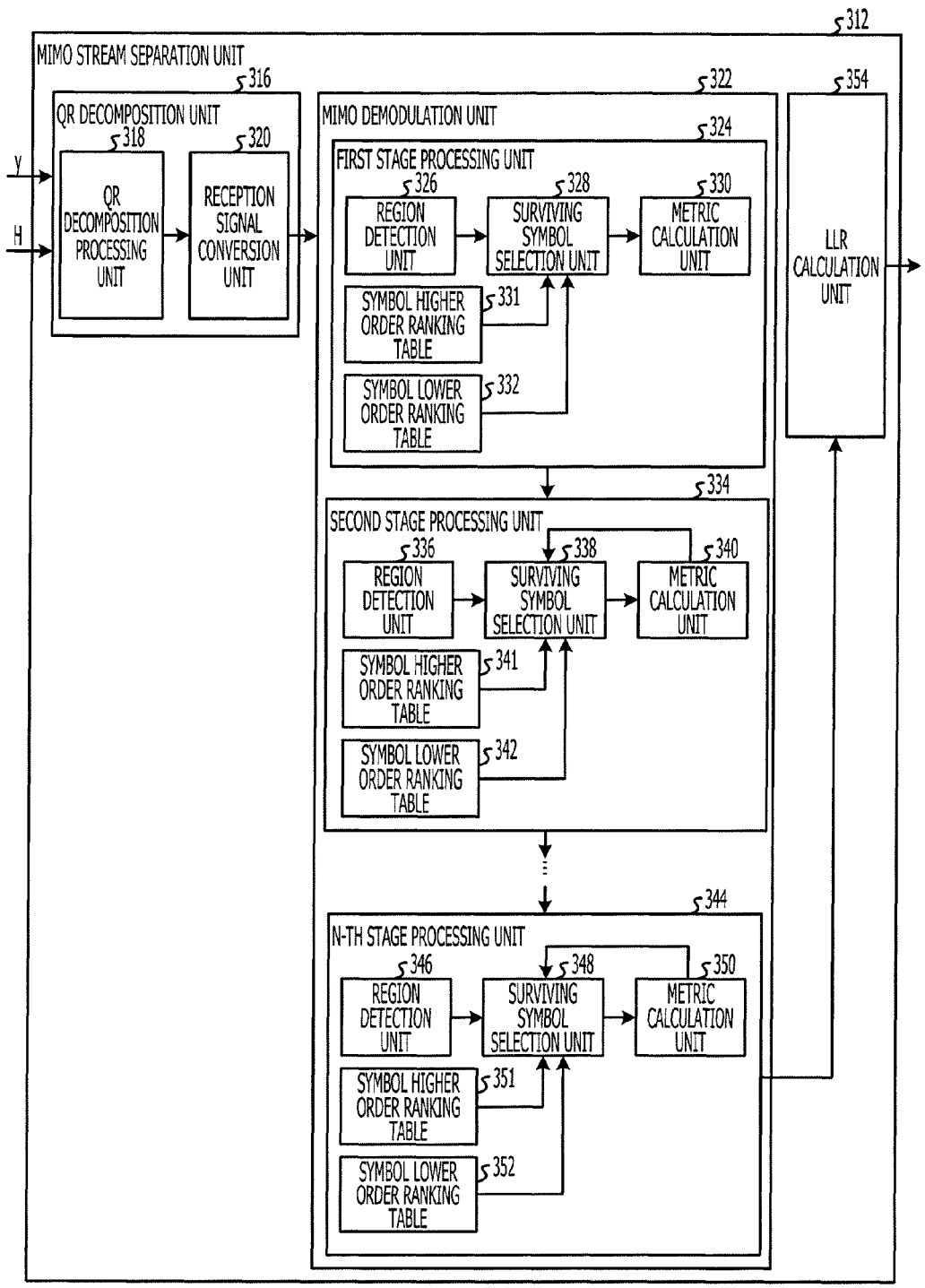
FIG. 22 illustrates a configuration example of MIMO stream separation unit of Embodiment 2.

Embodiment 2 is an embodiment to which the second aspect is applied. FIG. 22 illustrates a configuration example of a MIMO stream separation unit of Embodiment 2. As depicted in FIG. 22, a MIMO stream separation unit 312 includes a QR decomposition unit 316, a MIMO demodulation unit 322, and a LLR calculation unit 354. The QR decomposition unit 316 includes a QR decomposition processing unit 318 and a reception signal conversion unit 320. The MIMO demodulation unit 322 includes a first stage processing unit 324, a second stage processing unit 334, . . . , and an N-th stage processing unit 344.

The first stage processing unit 324 includes a region detection unit 326, a surviving symbol selection unit 328, a metric calculation unit 330, a symbol higher order ranking table 331, and a symbol lower order ranking table 332. The second stage processing unit 334 includes a region detection unit 336, a surviving symbol selection unit 338, a metric calculation unit 340, a symbol higher order ranking table 341, and a symbol lower order ranking table 342. The N-th stage processing unit 344 includes a region detection unit 346, a surviving symbol selection unit 348, a metric calculation unit 350, a symbol higher order ranking table 351, and a symbol lower order ranking table 352.

As depicted in FIG. 22, Embodiment 2 is different from Embodiment 1 in that the symbol ranking table 232 and the size reduction type symbol ranking tables 242 and 252 of Embodiment 1 are exchanged into the symbol higher order ranking tables 331, 341, and 351 and the symbol lower order ranking tables 332, 342, and 352. Accordingly, description of configurations same as those of Embodiment 1 is arbitrarily omitted and the configuration different from Embodiment 1 is mainly described.

The surviving symbol selection unit 328 refers to the symbol higher order ranking table 331 ($\Omega_1$) or the symbol lower order ranking table 332 ($\Omega_2$) and sets as many candidate replicas as $S_1$, the number of surviving candidates from the higher order in the ranking, as surviving paths of the first stage. The surviving path is expressed by expression (74).

$$\Pi_1^{(1)}(i) = \begin{cases} \Omega_1^{(m_N)}(\varepsilon, i), & i \leq \rho_{th} \\ \Omega_2^{(m_N)}(\lfloor \varepsilon/N_{adj} \rfloor, i - \rho_{th}), & i > \rho_{th} \end{cases} \quad (74)$$

$$i = 1, 2, \ldots, S_1$$

A surviving symbol selection unit of a k-th stage processing unit adaptively selects a surviving path on the k-th stage as following. The surviving symbol selection unit first initializes a representative cumulative metric value E(i) and a current rank ρ(i) of each surviving path which is survived on the k−1-th stage so as to obtain expression (75), expression (76), and expression (77).

$$E(i) := d_{k-1}(\Pi^{(k-1)}(i)) \quad (75)$$

$$\rho(i) := 1 \quad (76)$$

$$q := 1 \quad (77)$$

The surviving symbol selection unit selects a candidate replica on the $\rho(i_{min})$-th order in the ranking of $i_{min}$ at which $\rho(i) \leq m_{N-k+1}$ is satisfied and E(i) has the minimum value, from the symbol higher order ranking table $\Omega_1$ or the symbol lower order ranking table $\Omega_2$. Then, the surviving symbol selection unit sets the q-th surviving path on the k-th stage as expression (78).

$$\Pi_{i=k-1}^{(k)}(q) = \Pi^{(k-1)}(i_{min}) \quad (78)$$

$$\Pi_k^{(k)}(q) = \begin{cases} \Omega_1^{(m_{N-k+1})}(\varepsilon^{(k)}(i_{min}), \rho(i_{min})), & \rho(i_{min}) \leq \rho_{th} \\ \Omega_2^{(m_{N-k+1})}(\lfloor \varepsilon^{(k)}(i_{min})/N_{adj} \rfloor, \rho(i_{min}) - \rho_{th}), & \rho(i_{min}) > \rho_{th} \end{cases}$$

$$i_{min} = \arg_{\rho(i) \leq m_{N-k+1}} (\min[E(i)])$$

The symbol higher order ranking table and the symbol lower order ranking table are now described in detail. In a case of QPSK and $N_{div}=2$, as depicted in FIGS. 42 and 7, symbol candidates included from the first order to the third order of the ranking are common among four regions which are adjacent to each other and it is apparent that symbol candidates on the fourth order are common in four regions which are adjacent to each other as well. Therefore, an example of a case in $\rho_{th}=3$ and $N_{adj}=4$ is illustrated in FIGS. 23A and 23B. FIGS. 23A and 23B respectively illustrate examples of a symbol higher order ranking table and a symbol lower order ranking table in QPSK and $N_{div}=2$. As depicted in FIGS. 23A and 23B, it is understood that the total number of words of the symbol higher order ranking table and the symbol lower order ranking table is 16×3+4×1=52 and the table size is 52/64 compared to the related art example.

A table example and a table designing method when $\rho_{th}=8$ and $N_{adj}=4$ in a case of 16QAM and $N_{div}=3$ is now described. First, regions 0, 1, 2, and 3 are considered. Referring to FIG. 44, symbol candidates included from the first order to the eighth order in the ranking are common. Further, symbol candidates included from the ninth order to the 16th order in the ranking are also common. The symbol lower order ranking table is designed in the order of shorter distances from a representative point (a position of a symbol number 3) of four regions (regions 0, 1, 2, 3) which are adjacent to each other.

Subsequently, regions 4, 5, 6, and 7 are considered. Referring to FIG. 44, symbol candidates included from the first order to the eighth order in the ranking of each region are;
region 4: symbol number (0, 1, 2, 3, 4, 6, 7, 8),
region 5: symbol number (0, 1, 2, 3, 4, 5, 6, 7),
region 6: symbol number (0, 1, 2, 3, 4, 6, 8, 9), and
region 7: symbol number (0, 1, 2, 3, 4, 6, 7, 8).

Since symbol candidates are not completely common among regions unlike the case of the regions 0, 1, 2, and 3, two numbers among symbol numbers 5, 7, 8, and 9 have to be migrated into the symbol lower order ranking table so as to make symbol candidates common. In this example, a square error with respect to an order in an original symbol ranking table (FIG. 44) is reduced.

When it is assumed that a symbol number has become to be placed on the ninth order which is the highest order of the symbol lower order ranking table by migrating the symbol numbers into the symbol lower order ranking table, $(9-8)^2=1$ is obtained because the symbol number 5 of the region 5 is placed on the eighth order. The symbol number 7 of the region 4 is placed on the seventh order, the symbol number 7 of the region 5 is placed on the seventh order, and the symbol number 7 of the region 7 is placed on the eighth order, so that $(9-7)^2+(9-7)^2+(9-8)^2=9$ is obtained.

The symbol number 8 of the region 4 is placed on the eighth order, the symbol number 8 of the region 5 is placed on the ninth order, and the symbol number 8 of the region 7 is placed on the seventh order, so that $(9-8)^2+(9-9)^2+(9-7)^2=5$ is obtained. The symbol number 9 of the region 6 is placed on the eighth order, so that $(9-8)^2=1$ is obtained.

In order to reduce a square error, it is favorable that the symbol numbers 7 and 8 are left in the symbol higher order ranking table and the symbol numbers 5 and 9 are migrated into the symbol lower order ranking table. Accordingly, tables are designed such that the symbol numbers 0, 1, 2, 3, 4, 6, 7, and 8 are held in the symbol higher order ranking table in the order of shorter distance from a representative point of each region and symbol numbers other than the symbol numbers 0, 1, 2, 3, 4, 6, 7, and 8 are held in the symbol lower order ranking table in the order of shorter distance from a representative point (symbol number 2) of the four regions (regions 4, 5, 6, and 7) which are adjacent to each other.

In a similar manner, regarding the regions 8, 9, 10, and 11, symbol numbers included from the first order to the eighth order in the ranking are;

region 8: symbol number (0, 1, 2, 3, 4, 8, 9, 11),
region 9: symbol number (0, 1, 2, 3, 4, 6, 8, 9),
region 10: symbol number (0, 1, 2, 3, 8, 9, 10, 11), and
region 11: symbol number (0, 1, 2, 3, 4, 8, 9, 11).

Therefore, two symbol numbers among the symbol numbers 4, 6, 10, and 11 have to be migrated into the symbol lower order ranking table. In a similar manner, symbol number 4: $(9-7)^2+(9-7)^2+(9-7)^2=12$,
symbol number 6: $(9-8)^2=1$,
symbol number 10: $(9-8)^2=1$, and
symbol number 11: $(9-8)^2+(9-7)^2+(9-8)^2=6$ are obtained.

Therefore, the symbol numbers 6 and 10 are migrated into the symbol lower order ranking table. Accordingly, tables are designed such that the symbol numbers 0, 1, 2, 3, 4, 8, 9, and 11 are held in the symbol higher order ranking table in the order of shorter distance from a representative point of each region and symbol numbers other than the symbol numbers 0, 1, 2, 3, 4, 8, 9, and 11 are held in the symbol lower order ranking table in the order of shorter distance from a representative point (symbol number 1) of the four regions (regions 8, 9, 10, and 11) which are adjacent to each other.

Regarding the regions 12, 13, 14, and 15, symbol numbers included from the first order to the eighth order in the ranking are;

region 12: symbol number (0, 1, 2, 3, 4, 6, 8, 9),
region 13: symbol number (0, 1, 2, 3, 4, 6, 8, 12),
region 14: symbol number (0, 1, 2, 3, 4, 8, 9, 12), and
region 15: symbol number (0, 1, 2, 4, 6, 8, 9, 12).

Therefore, one symbol number among the symbol numbers 3, 6, 9, and 12 has to be migrated into the symbol lower order ranking table. In a similar manner, symbol number 3: $(9-4)^2+(9-7)^2+(9-7)^2=33$,
symbol number 6: $(9-7)^2+(9-4)^2+(9-8)^2=30$,
symbol number 9: $(9-8)^2+(9-4)^2+(9-7)^2=30$, and
symbol number 12: $(9-8)^2+(9-8)^2+(9-4)^2=27$ are obtained.

Therefore, the symbol number 12 is migrated into the symbol lower order ranking table. Accordingly, tables are designed such that the symbol numbers 0, 1, 2, 3, 4, 6, 8, and 9 are held in the symbol higher order ranking table in the order of shorter distance from a representative point of each region and symbol numbers other than the symbol numbers 0, 1, 2, 3, 4, 6, 8, and 9 are held in the symbol lower order ranking table in the order of shorter distance from a representative point (symbol number 1) of the four regions (regions 8, 9, 10, and 11) which are adjacent to each other.

A symbol higher order ranking table and a symbol lower order ranking table which are a result of similar processing with respect to regions 13 to 63 are illustrated in FIGS. 24A and 24B. FIGS. 24A and 24B respectively illustrate examples of a symbol higher order ranking table and a symbol lower order ranking table in 16QAM and $N_{div}=3$. Apparent from FIGS. 24A and 24B, the total number of words of the symbol higher order ranking table and the symbol lower order ranking table is expressed as expression (79).

$$2^{2N_{div}} \times \rho_{th}+2^{2N_{div}} \times (m-\rho_{th})/N_{adj}=64 \times 8+64 \times (16-8)/4=640 \quad (79)$$

Accordingly, the size of the symbol higher order ranking table and the symbol lower order ranking table is 62.5% of the size of a symbol ranking table of related art. Examples of a symbol higher order ranking table and a symbol lower order ranking table, which are designed by using a similar method to 16QAM described above, in a case of $\rho_{th}=32$ and $N_{adj}=4$ in 64QAM and $N_{div}=3$ are respectively illustrated in FIGS. 25 and 26. FIG. 25 illustrates an example of a symbol higher order ranking table in 64QAM and $N_{div}=3$. FIG. 26 illustrates an example of a symbol lower order ranking table in 64QAM and $N_{div}=3$. The total number of words in the symbol higher order ranking table and the symbol lower order ranking table is 2560. Thus, the size of the symbol higher order ranking table and the symbol lower order ranking table is 62.5% of the size of a symbol ranking table of related art.

An example in $\rho_{th}$ and $N_{adj}$ has been described here, but it is possible to design a symbol higher order ranking table and a symbol lower order ranking table in $\rho_{th}$ and $N_{adj}$ which have different values as well, by using the table designing method which is described above in detail.

Further, in the above description, when symbols included from the first order to the $\rho_{th}$-th order in the ranking are not common, symbol numbers are selected in an evaluation standard of a smaller square error. However, other methods may be used. For example, in a case of the regions 4, 5, 6, and 7, it is sufficient to select two symbol numbers among the symbol numbers 5, 7, 8, and 9. In this case, two symbol numbers may be arbitrarily selected without using the evaluation standard of a square error and the like.

Figure 27:
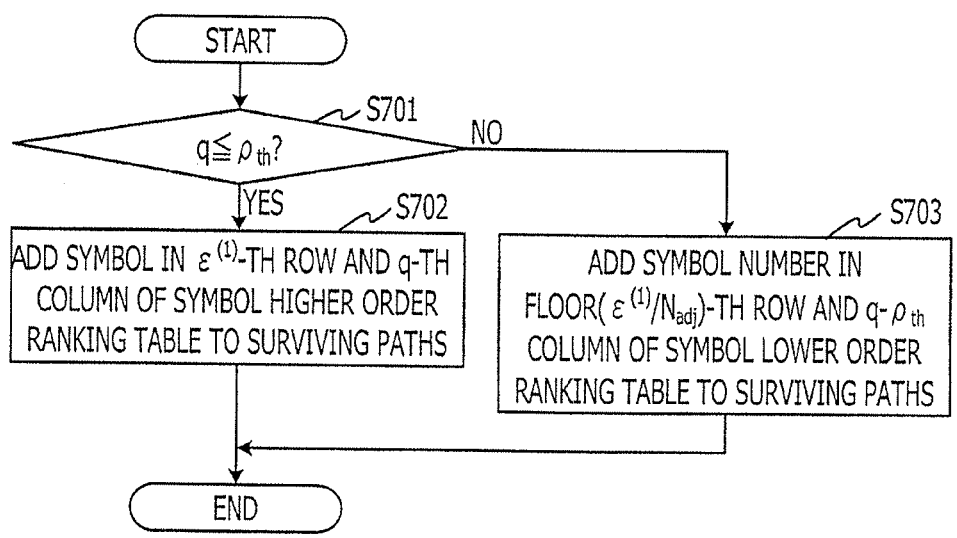
FIG. 27 is a flowchart of surviving symbol selection of first stage processing of Embodiment 2.

Processing in each stage in Embodiment 2 is now described. Description of processing same as that of Embodiment 1 is omitted. A flowchart of surviving symbol selection in first stage processing of Embodiment 2 is first described. FIG. 27 is a flowchart of the surviving symbol selection in the first stage processing of Embodiment 2.

As depicted in FIG. 27, the surviving symbol selection unit 328 determines whether $q \leq \rho_{th}$ is satisfied or not (S701). When $q \leq \rho_{th}$ is satisfied (S701, Yes), the surviving symbol selection unit 328 adds a symbol in the $\epsilon^{(1)}$-th row and q-th column of the symbol higher order ranking table 331 to surviving paths (S702). On the other hand, when $q \leq \rho_{th}$ is not satisfied (S701, No), the surviving symbol selection unit 328 adds a symbol number in the floor($\epsilon^{(1)}/N_{adj}$)-th row and $q-\rho_{th}$-th column of the symbol lower order ranking table 332 to surviving paths (S703).

Figure 28:
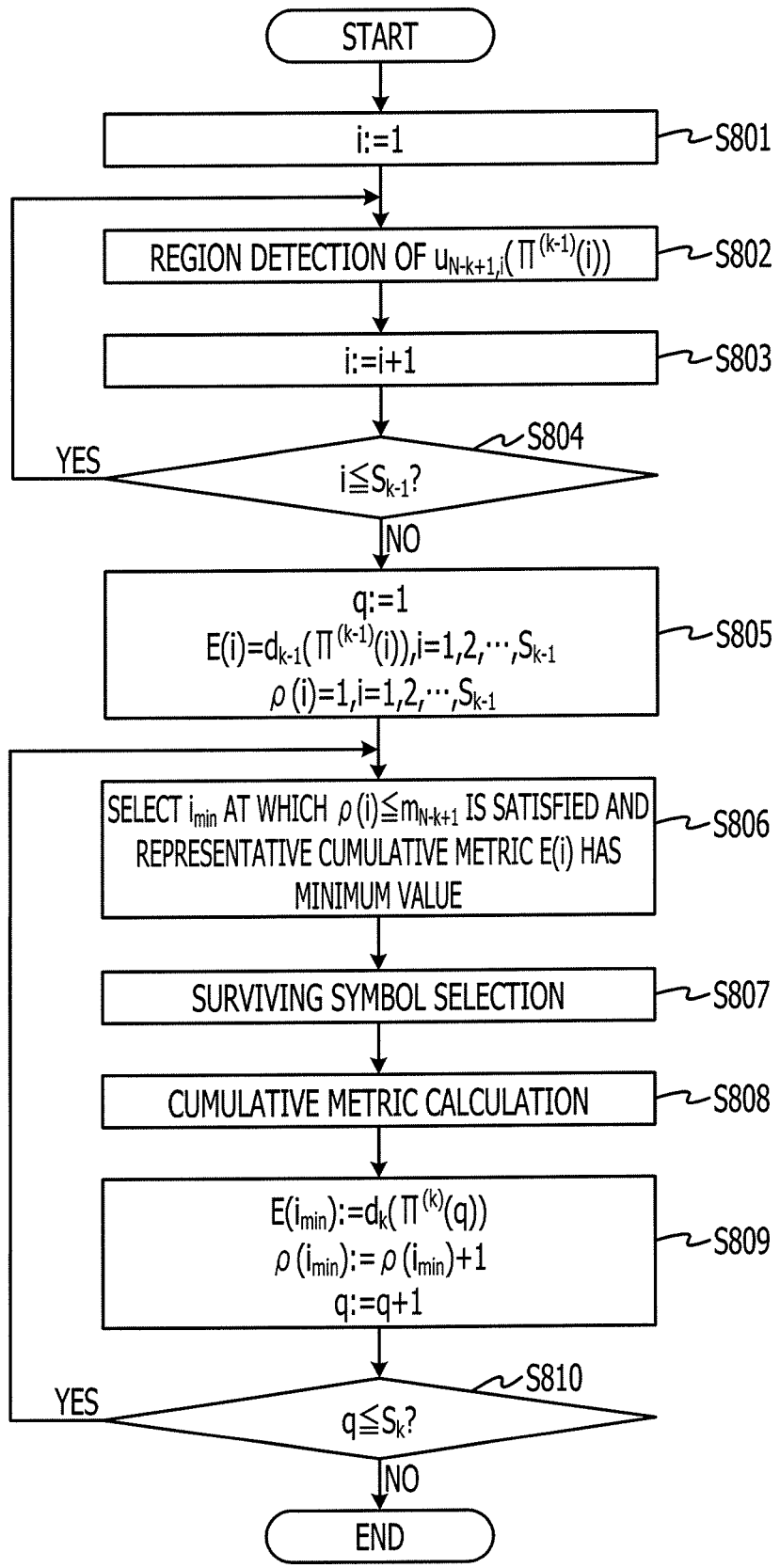
FIG. 28 is a flowchart of k-th stage processing of Embodiment 2.

A flowchart of k-th stage processing is now described. FIG. 28 is a flowchart of the k-th stage processing of Embodiment 2. As depicted in FIG. 28, the k-th stage processing unit sets i to 1 (S801). Subsequently, the region detection unit performs region detection as expression (47) (S802). Then, the region detection unit increments i (S803). After that, the region detection unit determines whether $i \leq S_{k-1}$ is satisfied or not (S804). When $i \leq S_{k-1}$ is satisfied (S804, Yes), the region detection unit returns to S802 and repeats the processing.

On the other hand, when $i \leq S_{k-1}$ is not satisfied (S804, No), the surviving symbol selection unit initializes a representative cumulative metric value E(i) and a current rank $\rho$(i) of each surviving path which is survived on the k-1-th stage as expressed in expression (49), expression (50), and expression (51) (S805). Subsequently, the surviving symbol selection unit selects $i_{min}$ at which $\rho(i) \leq m_{N-k+1}$ is satisfied and a representative cumulative metric E(i) has the minimum value (S806).

Then, the surviving symbol selection unit selects a surviving symbol (S807). The selection of a surviving symbol will be described later. Subsequently, the metric calculation unit calculates a cumulative metric as expression (54) (S808). Then, the metric calculation unit updates the cumulative metric as expression (55), expression (56), and expression (57) (S809).

Subsequently, the metric calculation unit determines whether $q \leq S_k$ is satisfied or not (S810). When $q \leq S_k$ is satisfied (S810, Yes), the surviving symbol selection unit returns to S806 and repeats the processing. On the other hand, when $q \leq S_k$ is not satisfied (S810, No), the metric calculation unit ends the processing.

Figure 29:
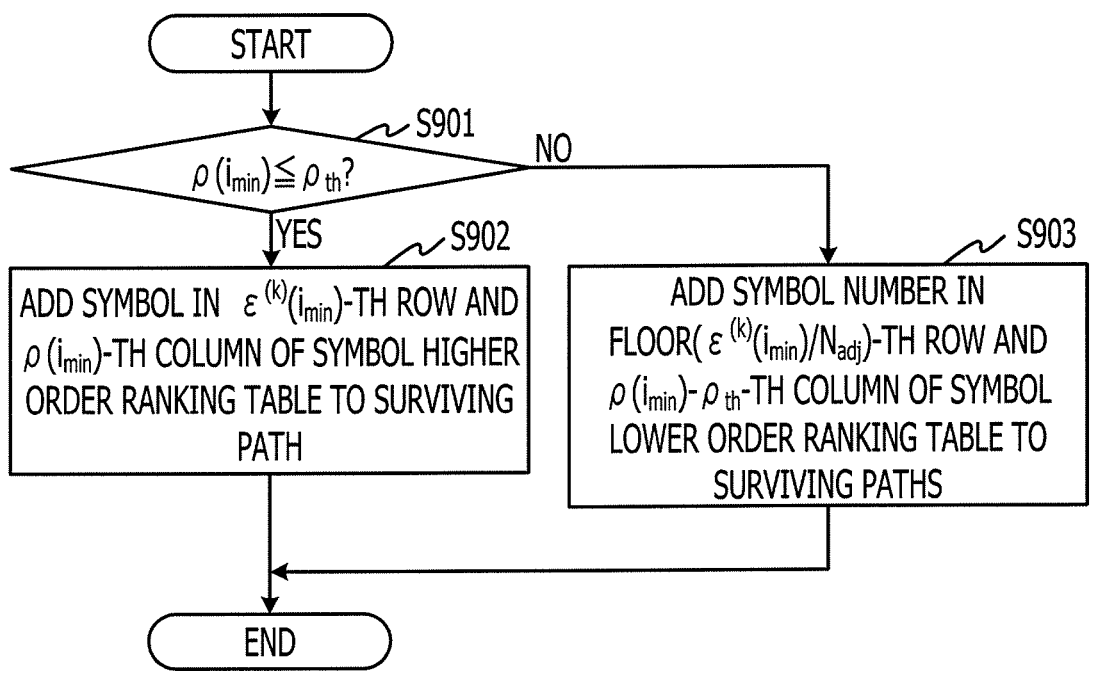
FIG. 29 is a flowchart of surviving symbol selection of the k-th stage processing of Embodiment 2.

A flowchart of surviving symbol selection in the k-th stage processing is now described. FIG. 29 is a flowchart of the surviving symbol selection in the k-th stage processing of Embodiment 2. As depicted in FIG. 29, the surviving symbol selection unit determines whether $\rho(i_{min}) \leq \rho_{th}$ is satisfied or not (S901).

When $\rho(i_{min}) \leq \rho_{th}$ is satisfied (S901, Yes), the surviving symbol selection unit adds a symbol in the $\epsilon^{(k)}(i_{min})$-th row and $\rho(i_{min})$-th column of the symbol higher order ranking table to surviving paths (S902).

On the other hand, when $\rho(i_{min}) \leq \rho_{th}$ is not satisfied (S901, No), the surviving symbol selection unit adds a symbol number in the floor($\epsilon^{(k)}(i_{min})/N_{adj}$)-th row and $\rho(i_{min})-\rho_{th}$-th column of the symbol lower order ranking table to surviving paths (S903).

(Embodiment 3)

Embodiment 3 is now described. In Embodiment 2, an example that a symbol ranking table is separated into two levels of tables, that is, a symbol higher order ranking table and a symbol lower order ranking table at $\rho_{th}$ as a boundary is described. However, a symbol ranking table may be separated into three or more levels of tables. In this embodiment, an example that a symbol ranking table is separated into three levels of tables is described.

Figure 30:
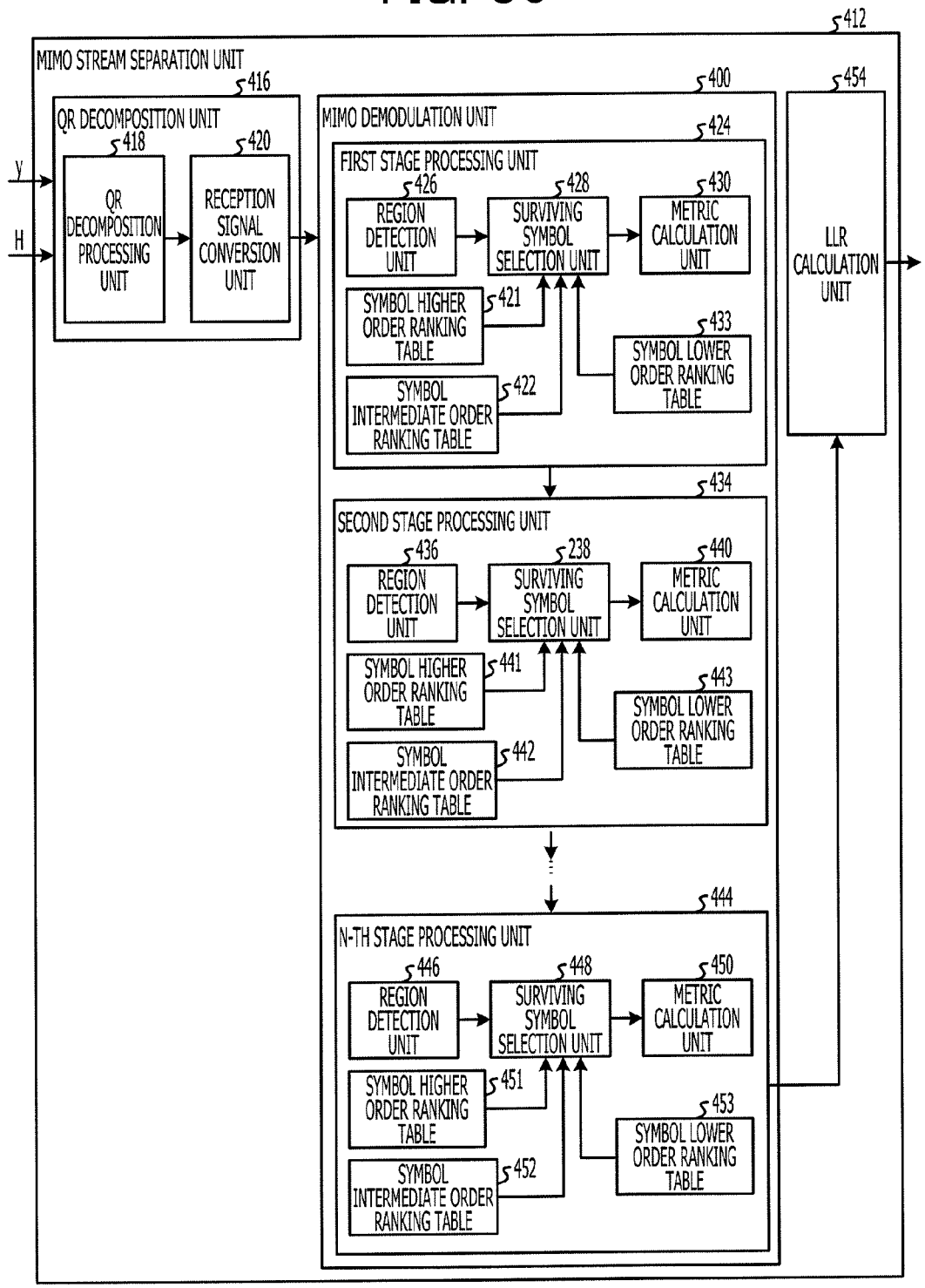
FIG. 30 illustrates a configuration example of a MIMO stream separation unit of Embodiment 3.

FIG. 30 illustrates a configuration example of a MIMO stream separation unit of Embodiment 3. As depicted in FIG. 30, Embodiment 3 is different from Embodiments 1 and 2 in that a symbol intermediate order ranking table is added. Description of configurations same as those of Embodiments 1 and 2 is omitted and the configuration different from that of Embodiments 1 and 2 is mainly described.

A surviving symbol selection unit 428 of a first stage processing unit refers to a symbol higher order ranking table 421 ($\Omega_1$), a symbol intermediate order ranking table 422 ($\Omega_2$), or a symbol lower order ranking table 433 ($\Omega_3$) and sets as many candidate replicas as $S_1$, the number of surviving candidates from the higher order in the ranking, as surviving paths of the first stage. The surviving symbol selection unit 428 sets the surviving path as expression (80).

$$\Pi_1^{(1)}(i) = \begin{cases} \Omega_1^{(m_N)}(\epsilon, i), & i \leq \rho_{th,1} \\ \Omega_2^{(m_N)}(\lfloor \epsilon/N_{adj,1} \rfloor, i - \rho_{th,1}), & \rho_{th,1} < i \leq \rho_{th,2} \\ \Omega_3^{(m_N)}(\lfloor \epsilon/N_{adj,2} \rfloor, i - \rho_{th,2}), & i > \rho_{th,2} \end{cases} \quad (80)$$

$$i = 1, 2, \ldots, S_1$$

A surviving symbol selection unit of a k-th stage processing unit adaptively selects a surviving path on the k-th stage as following. The surviving symbol selection unit first initializes a representative cumulative metric value E(i) and a current rank $\rho(i)$ of each surviving path which is survived on the k−1-th stage so as to obtain expression (81), expression (82), and expression (83).

$$E(i) := d_{k-1}(\Pi^{(k-1)}(i)) \tag{81}$$

$$\rho(i) := 1 \tag{82}$$

$$q := 1 \tag{83}$$

The surviving symbol selection unit selects a candidate replica on the $\rho(i_{min})$-th order in the ranking of $i_{min}$ at which $\rho(i) \leq m_{N-k+1}$ is satisfied and E(i) has the minimum value, from the symbol higher order ranking table $\Omega_1$, the symbol intermediate order ranking table $\Omega_2$, or the symbol lower order ranking table $\Omega_3$. The surviving symbol selection unit sets the q-th surviving path on the k-th stage as expression (84).

$$\Pi_{1 \sim k-1}^{(k)}(q) = \Pi^{(k-1)}(i_{min}) \tag{84}$$

$$\Pi_k^{(k)}(q) =$$

$$\begin{cases} \Omega_1^{(m_{N-k+1})}(\epsilon^{(k)}(i_{min}), \rho(i_{min})), & \rho(i_{min}) \leq \rho_{th,1} \\ \Omega_2^{(m_{N-k+1})}(\lfloor \epsilon^{(k)}(i_{min})/N_{adj,1} \rfloor, \rho(i_{min}) - \rho_{th,1}), & \rho_{th,1} < \rho(i_{min}) \leq \rho_{th,2} \\ \Omega_3^{(m_{N-k+1})}(\lfloor \epsilon^{(k)}(i_{min})/N_{adj,2} \rfloor, \rho(i_{min}) - \rho_{th,2}), & \rho(i_{min}) > \rho_{th,2} \end{cases}$$

$$i_{min} = \arg_{\rho(i) \leq m_{N-k+1}} (\min[e(i)])$$

The symbol higher order ranking table 421, the symbol intermediate order ranking table 422, and the symbol lower order ranking table 433 are now described in detail. FIGS. 31A to 31C respectively illustrate examples of a symbol higher order ranking table, a symbol intermediate order ranking table, and a symbol lower order ranking table which are designed when $\rho_{th,1}=4$, $\rho_{th,2}=12$, $\rho_{adj,1}=4$, and $\rho_{adj,2}=16$ in a case in 16QAM and $N_{div}=3$.

As depicted in FIG. 31A, the symbol higher order ranking table holds symbol numbers in the order of shorter distance from a region center for every region, from the first order to fourth order. As depicted in FIG. 31B, the symbol intermediate order ranking table holds symbol numbers in the order of shorter distance from a representative point of four regions, which are adjacent to each other, for every four adjacent regions, from the fourth order to the 12th order. As depicted in FIG. 31C, the symbol lower order ranking table holds symbol numbers in the order of shorter distance from a representative point of eight regions, which are adjacent to each other, for every 16 adjacent regions (four groups from region 0 to region 15, from region 16 to region 31, from region 32 to region 47, and from region 48 to region 63), from the 12th order to 16th order.

Figure 32:
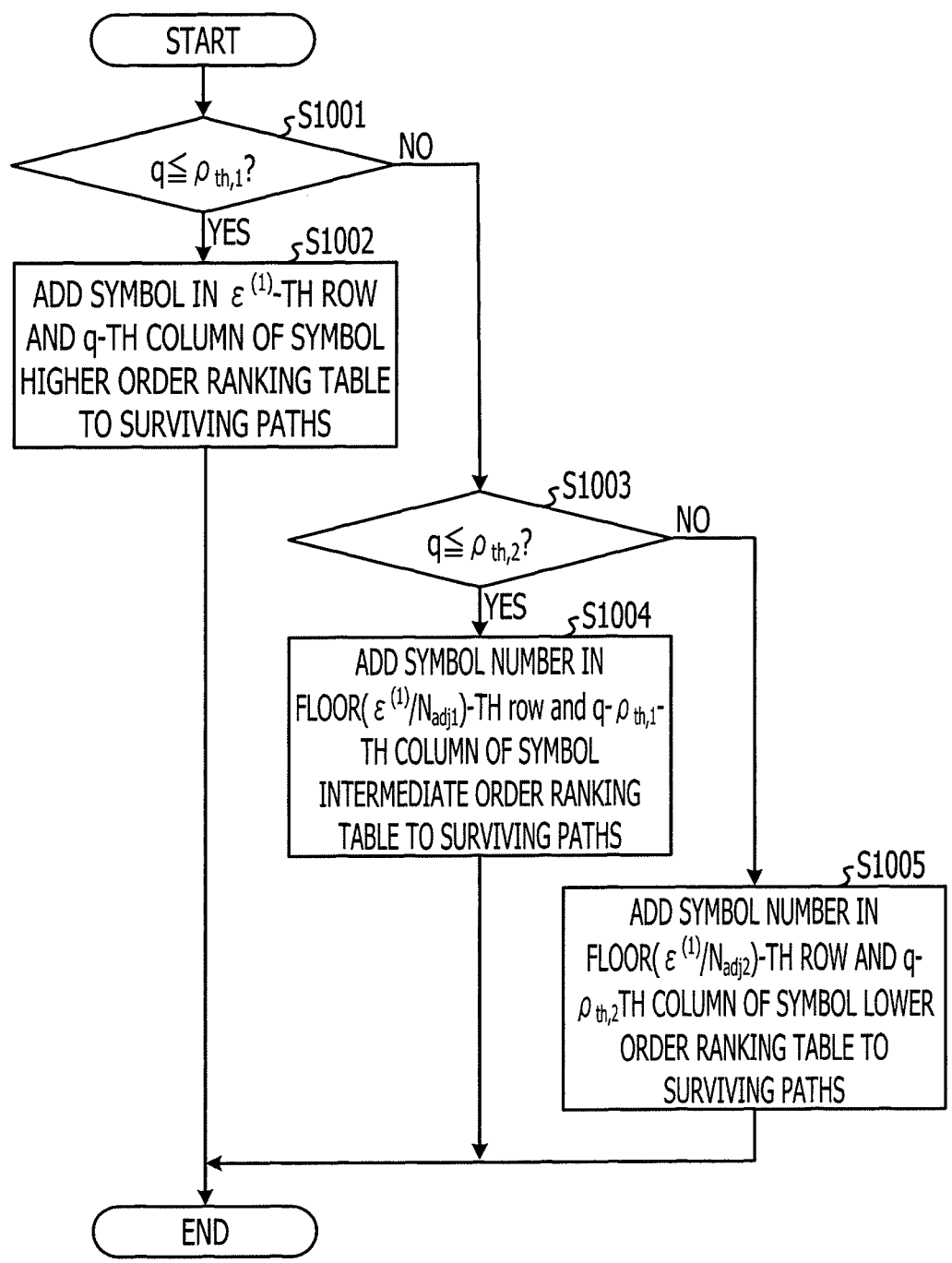
FIG. 32 is a flowchart of surviving symbol selection of first stage processing of Embodiment 3.

Processing on each stage in Embodiment 3 is now described. Description of processing same as that of Embodiments 1 and 2 is omitted. A flowchart of surviving symbol selection in first stage processing of Embodiment 3 is first described. FIG. 32 is a flowchart of the surviving symbol selection in the first stage processing of Embodiment 3.

As depicted in FIG. 32, the surviving symbol selection unit 428 determines whether $q \leq \rho_{th,1}$ is satisfied or not (S1001). When $q \leq \rho_{th,1}$ is satisfied (S1001, Yes), the surviving symbol selection unit 428 adds a symbol in the $\epsilon^{(1)}$-th row and q-th column of the symbol higher order ranking table 421 to surviving paths (S1002).

On the other hand, when $q \leq \rho_{th,1}$ is not satisfied (S1001, No), the surviving symbol selection unit 428 determines whether $q \leq \rho_{th,2}$ is satisfied or not (S1003). When $q \leq \rho_{th,2}$ is satisfied (S1003, Yes), the surviving symbol selection unit 428 adds a symbol number in the floor($\epsilon^{(1)}/N_{adj1}$)-th row and $q-\rho_{th,1}$-th column of the symbol intermediate order ranking table 422 to surviving paths (S1004).

On the other hand, when $q \leq \rho_{th,2}$ is not satisfied (S1003, No), the surviving symbol selection unit 428 adds a symbol number in the floor($\epsilon^{(1)}/N_{adj2}$)-th row and $q-\rho_{th,2}$-th column of the symbol lower order ranking table to surviving paths (S1005).

Figure 33:
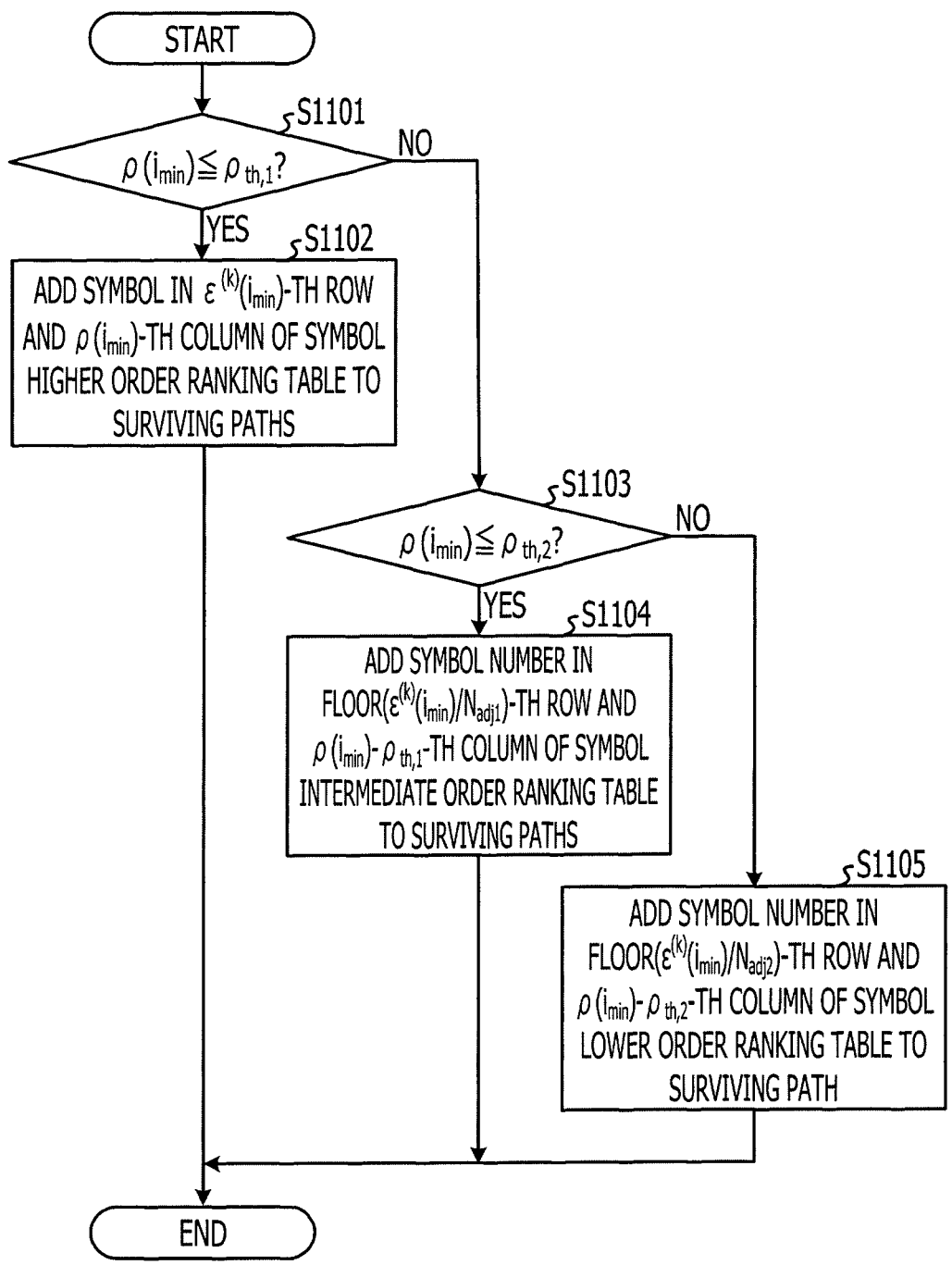
FIG. 33 is a flowchart of surviving symbol selection of k-th stage processing of Embodiment 3.

A flowchart of surviving symbol selection in k-th stage processing is now described. FIG. 33 is a flowchart of the surviving symbol selection in the k-th stage processing of Embodiment 3. As depicted in FIG. 33, the surviving symbol selection unit determines whether $\rho(i_{min}) \leq \rho_{th,1}$ is satisfied or not (S1101).

When $\rho(i_{min}) \leq \rho_{th,1}$ is satisfied (S1101, Yes), the surviving symbol selection unit adds a symbol in the $\epsilon^{(k)}(i_{min})$-th row and $\rho(i_{min})$-th column of the symbol higher order ranking table to surviving paths (S1102).

On the other hand, when $\rho(i_{min}) \leq \rho_{th,1}$ is (i not satisfied (S1101, No), the surviving symbol selection unit determines whether $\rho(i_{min}) \leq \rho_{th,2}$ is satisfied or not (S1103). When $\rho(i_{min}) \leq \rho_{th,2}$ is satisfied (S1103, Yes), the surviving symbol selection unit adds a symbol number in the floor ($\epsilon^{(k)}(i_{min})/N_{adj1}$)-th row and $\rho(i_{min})-\rho_{th,1}$-th column of the symbol intermediate order ranking table to surviving paths (S1104).

On the other hand, when $\rho(i_{min})-\rho_{th,2}$ is not satisfied (S1103, No), the surviving symbol selection unit adds a symbol number in the floor($\epsilon^{(k)}(i_{min})/N_{adj2}$)-th row and $\rho(i_{min})-\rho_{th,2}$-th column of the symbol lower order ranking table to surviving paths (S1105).

In Embodiment 3, only the symbol higher order ranking table, the symbol intermediate order ranking table, and the symbol lower order ranking table in a specific parameter example of 16QAM are illustrated. However, the embodiment is not limited to this example. For example, a table may be designed by using the designing method described in Embodiments 2 and 3, even in cases of other modulation methods and other parameters. Further, a table may be designed in a manner to be separated into four or more levels.

(Embodiment 4)

Embodiment 4 is now described. Embodiment 4 is an embodiment which is obtained by combining the above-mentioned solving aspect 1 and solving aspect 2. Any processing of Embodiments 1, 2, and 3 may be used as processing of the first stage. A surviving symbol selection unit of a k-th stage processing unit adaptively selects a surviving path on the k-th stage as following. The surviving symbol selection unit first initializes a representative cumulative metric value E(i) and a current rank $\rho(i)$ of each surviving path which is survived on the k-1-th stage so as to obtain expression (85), expression (86), and expression (87).

$$E(i):=d_{k-1}(\Pi^{(k-1)}(i)) \quad (85)$$

$$\rho(i):=1 \quad (86)$$

$$q:=1 \quad (87)$$

The surviving symbol selection unit selects a candidate replica on the $\rho(i_{min})$-th order in the ranking of $i_{min}$ at which $\rho(i) \leq MAX\_RANK_k$ is satisfied and E(i) has the minimum value, from a symbol higher order ranking table $\Omega_1$ or a symbol lower order ranking table $\Omega_2$. The surviving symbol selection unit sets the q-th surviving path on the k-th stage as expression (88).

$$\Pi^{(k)}_{i-k-1}(q) = \Pi^{(k-1)}(i_{min}) \quad (88)$$

$$\Pi^{(k)}_k(q) =$$
$$\begin{cases} \Omega_1^{(m_N-k+1)}(\epsilon^{(k)}(i_{min}), \rho(i_{min})), & \rho(i_{min}) \leq \rho_{th} \\ \Omega_2^{(m_N-k+1)}(\lfloor \epsilon^{(k)}(i_{min})/N_{adj} \rfloor, \rho(i_{min}) - \rho_{th}), & \rho(i_{min}) > \rho_{th} \end{cases}$$

$$i_{min} = \arg_{\rho(i) \leq MAX\_RANK_k} (\min[E(i)])$$

A flowchart of the k-th stage is same as that of Embodiment 1. A flowchart of surviving symbol selection on the k-th stage is same as that of Embodiment 2, so that description thereof is omitted.

Here, table examples of a case of 16QAM, $N_{div}=3$, $MAX\_RANK^{(16QAM)}_k=8$, $\rho_{th}=4$, and $N_{adj}=4$ are described. FIGS. 34A and 34B respectively illustrate examples of a symbol higher order ranking table and a symbol lower order ranking table. In Embodiment 4, only the symbol higher order ranking table and the symbol lower order ranking table in a specific parameter example of 16QAM are illustrated. However, the embodiment is not limited to this example. For example, a table may be designed by using the designing method described in Embodiments 1 and 2, even in cases of other modulation methods and other parameters. Further, a table for $MAX\_RANK_k$ or lower may be designed in a manner to be separated into three or more levels.

(Embodiment 5)

Embodiment 5 is now described. An example of a symbol ranking table suitable for first stage processing is described in Embodiment 5. In the first stage processing, accuracy in lower orders is demanded in a symbol ranking table compared to accuracy in higher orders in order to leave symbol candidates of metrics which are as small as possible. Contrary to above-described solving aspect 2 and Embodiments 2, 3, and 4, a symbol higher order ranking table is designed in the order of shorter distance from a representative point of regions, which are adjacent to each other, and a symbol lower order ranking table is designed in the order of shorter distance from a representative point for each region.

A surviving symbol selection unit of a first stage processing unit refers to a symbol higher order ranking table $\Omega_1$ or a symbol lower order ranking table $\Omega_2$ and sets as many candidate replicas as $S_1$, the number of surviving candidates from the higher order in the ranking, as surviving paths of the first stage. The surviving symbol selection unit sets the surviving path as expression (89).

$$\Pi^{(1)}_1(i) = \begin{cases} \Omega_1^{(m_N)}(\lfloor \epsilon/N_{adj} \rfloor, i), & i \leq \rho_{th} \\ \Omega_2^{(m_N)}(\epsilon, i - \rho_{th}), & i \geq \rho_{th} \end{cases} \quad (89)$$

$$i = 1, 2, \ldots, S_1$$

Figure 35:
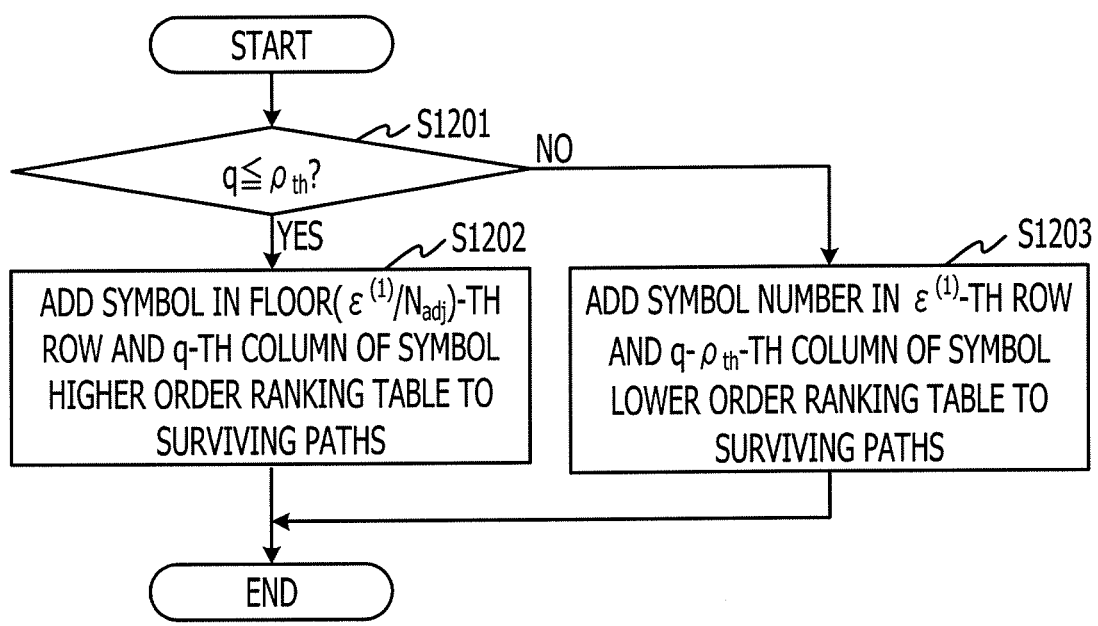
FIG. 35 is a flowchart of first stage processing of Embodiment 5.

A flowchart of the first stage processing is same as that of Embodiment 1, so that description thereof is omitted. A flowchart of surviving symbol selection of the first stage processing is described. FIG. 35 is a flowchart of first stage processing of Embodiment 5.

As depicted in FIG. 35, the surviving symbol selection unit determines whether $q \leq \rho_{th}$ is satisfied or not (S1201). When $q \leq \rho_{th}$ is satisfied (S1201, Yes), the surviving symbol selection unit adds a symbol in the floor($\epsilon^{(1)}/N_{adj}$)-th row and q-th column of the symbol higher order ranking table to surviving paths (S1202). On the other hand, when $q \leq \rho_{th}$ is not satisfied (S1201, No), the surviving symbol selection unit adds a symbol number in the $\epsilon^{(1)}$-th row and $q-\rho_{th}$-th column of the symbol lower order ranking table to surviving paths (S1203).

A table of a case of $\rho_{th}=8$ and $N_{adj}=4$ in 16QAM and $N_{div}=3$ is now described. FIGS. 36A and 36B respectively illustrate examples of a symbol higher order ranking table and a symbol lower order ranking table for the first stage processing of Embodiment 5. Here, in Embodiment 5, any of the configurations described in Embodiments 1 to 4 may be used as the configurations on and after the second stage. Further, a symbol ranking table may be separated into three levels of tables as Embodiment 3. Further, only an example of a table in 16QAM is illustrated in Embodiment 5, but it is apparent that a table in 64QAM is applicable as well.

(Embodiment 6)

Figure 37:
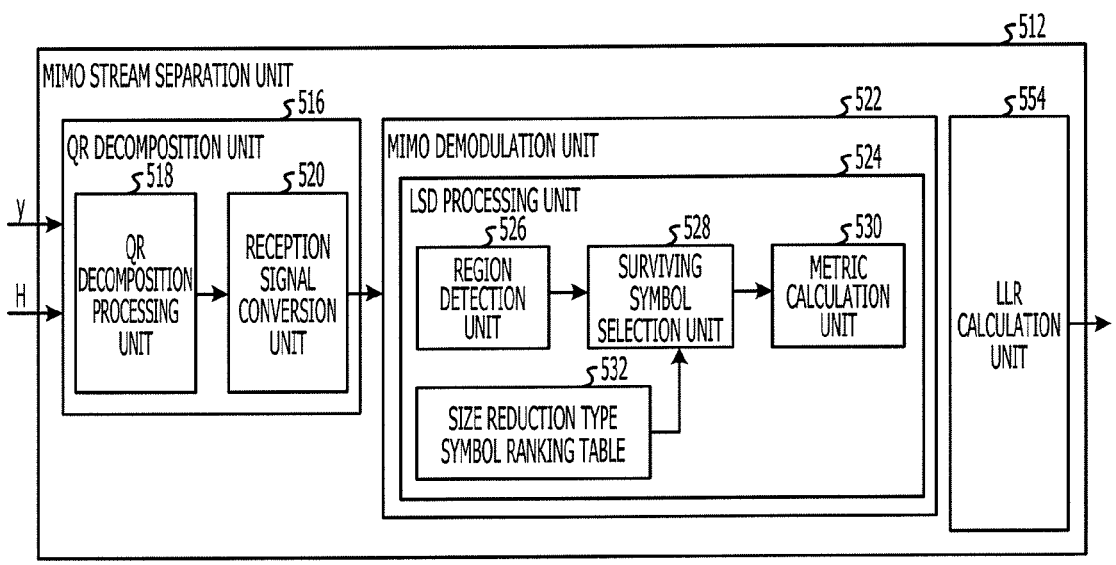
FIG. 37 illustrates the configuration of a MIMO stream separation unit of Embodiment 6.

Embodiment 6 is now described. Embodiment 6 is an embodiment in which the above-mentioned solving aspect 1 is applied to the LSD method. The configuration of a MIMO stream separation unit of Embodiment 6 is first described. FIG. 37 illustrates the configuration of a MIMO stream separation unit of Embodiment 6. Description of the configurations same as those of Embodiments 1 to 5 is omitted.

As depicted in FIG. 37, a MIMO stream separation unit 512 includes a QR decomposition unit 516, a MIMO demodulation unit 522, and a LLR calculation unit 554. The QR decomposition unit 516 includes a QR decomposition processing unit 518 and a reception signal conversion unit 520. The MIMO demodulation unit 522 includes a LSD processing unit 524.

The LSD processing unit 524 includes a region detection unit 526, a surviving symbol selection unit 528, a metric calculation unit 530, and a size reduction type symbol ranking table 532.

Figure 38:
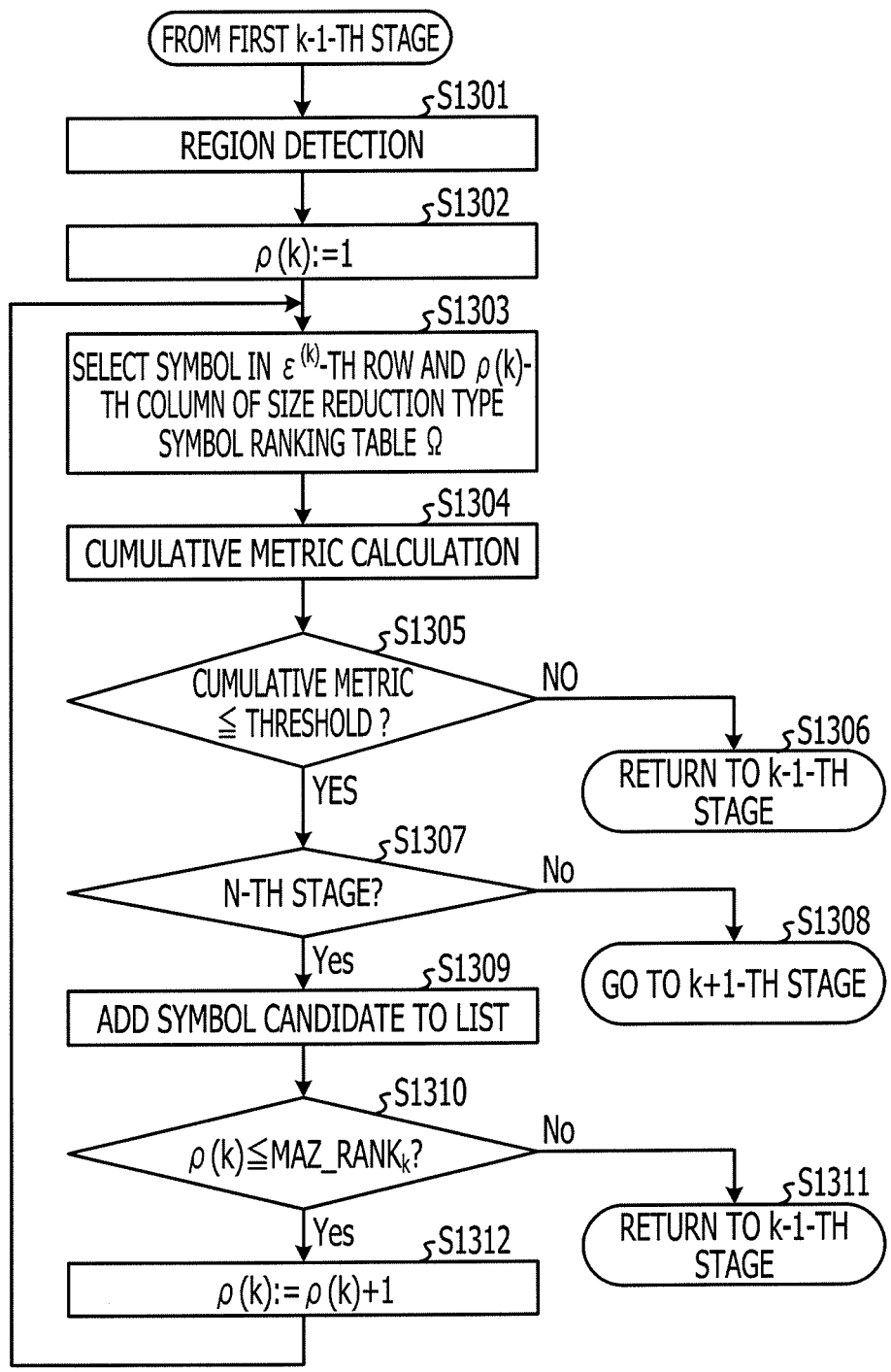
FIG. 38 is a flowchart of Embodiment 6.

Processing of the MIMO demodulation unit 522 of Embodiment 6 is now described. FIG. 38 is a flowchart of Embodiment 6. As depicted in FIG. 38, the region detection unit 526 performs region detection as expression (47) (S1301). Subsequently, the LSD processing unit 524 sets $\rho(k)$ to 1 (S1302). Then, the surviving symbol selection unit 528 selects a symbol in the $\epsilon^{(k)}$-th row and $\rho(k)$-th column of the size reduction type symbol ranking table $\Omega$ (S1303).

Subsequently, the metric calculation unit 530 calculates a cumulative metric as expression (54) (S1304). Then, the metric calculation unit 530 determines whether the cumulative metric≤threshold is satisfied or not (S1305). When the cumulative metric≤threshold is not satisfied (S1305, No), the metric calculation unit 530 returns to the k−1-th stage (S1306).

On the other hand, when the cumulative metric≤threshold is satisfied (S1305, Yes), the metric calculation unit 530 determines whether the current stage is the N-th stage or not (S1307). When the current stage is not the N-th stage (S1307, No), the metric calculation unit 530 goes to the k+1-th stage (S1308).

On the other hand, when the current stage is the N-th stage (S1307, Yes), the metric calculation unit 530 adds a symbol candidate to a list (S1309). Subsequently, the metric calculation unit 530 determines whether $\rho(k) \leq MAX\_RANK_k$ is satisfied or not (S1310).

When $\rho(k) \leq MAX\_RANK_k$ is not satisfied (S1310, No), the metric calculation unit 530 returns to the k−1-th stage (S1311). On the other hand, when $\rho(k) \leq MAX\_RANK_k$ is satisfied (S1310, Yes), the metric calculation unit 530 increments $\rho(k)$ (S1312) and returns to S1303.

(Embodiment 7)

Figure 39:
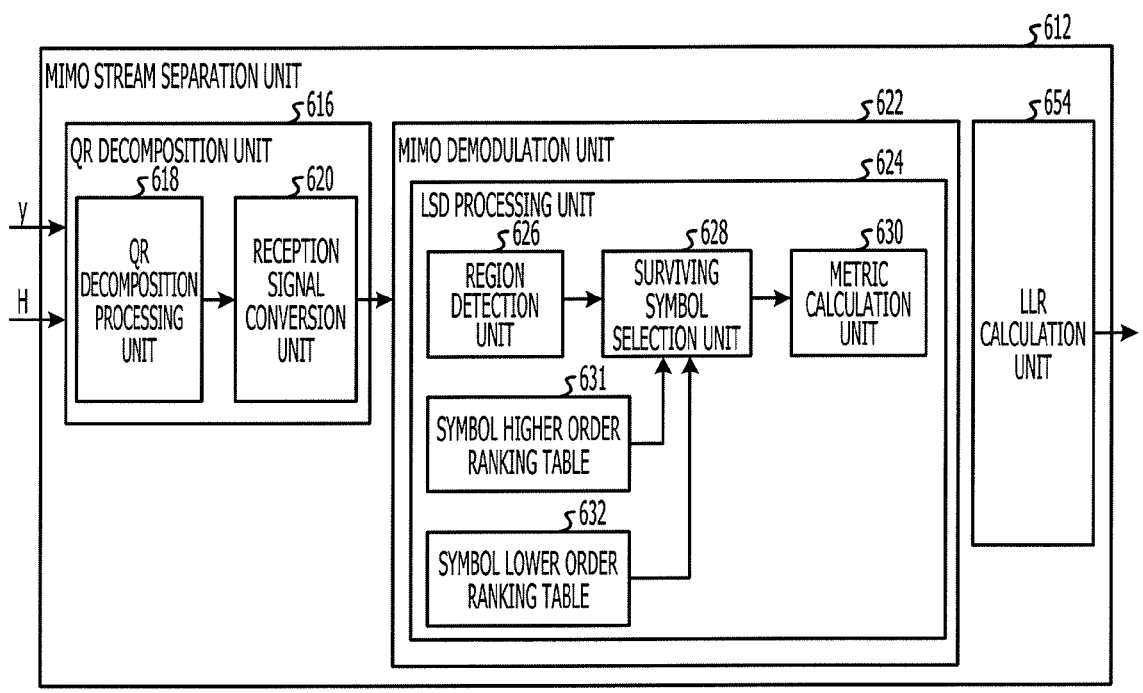
FIG. 39 illustrates the configuration of a MIMO stream separation unit of Embodiment 7.

Embodiment 7 is now described. Embodiment 7 is an embodiment in which the above-mentioned solving aspect 2 is applied to the LSD method. The configuration of a MIMO stream separation unit of Embodiment 7 is first described. FIG. 39 illustrates the configuration of a MIMO stream separation unit of Embodiment 7. Description of the configurations same as those of Embodiments 1 to 6 is omitted.

As depicted in FIG. 39, a MIMO stream separation unit 612 includes a QR decomposition unit 616, a MIMO demodulation unit 622, and a LLR calculation unit 654. The QR decomposition unit 616 includes a QR decomposition processing unit 618 and a reception signal conversion unit 620. The MIMO demodulation unit 622 includes a LSD processing unit 624.

The LSD processing unit 624 includes a region detection unit 626, a surviving symbol selection unit 628, a metric calculation unit 630, a symbol higher order ranking table 631, and a symbol lower order ranking table 632.

Figure 40:
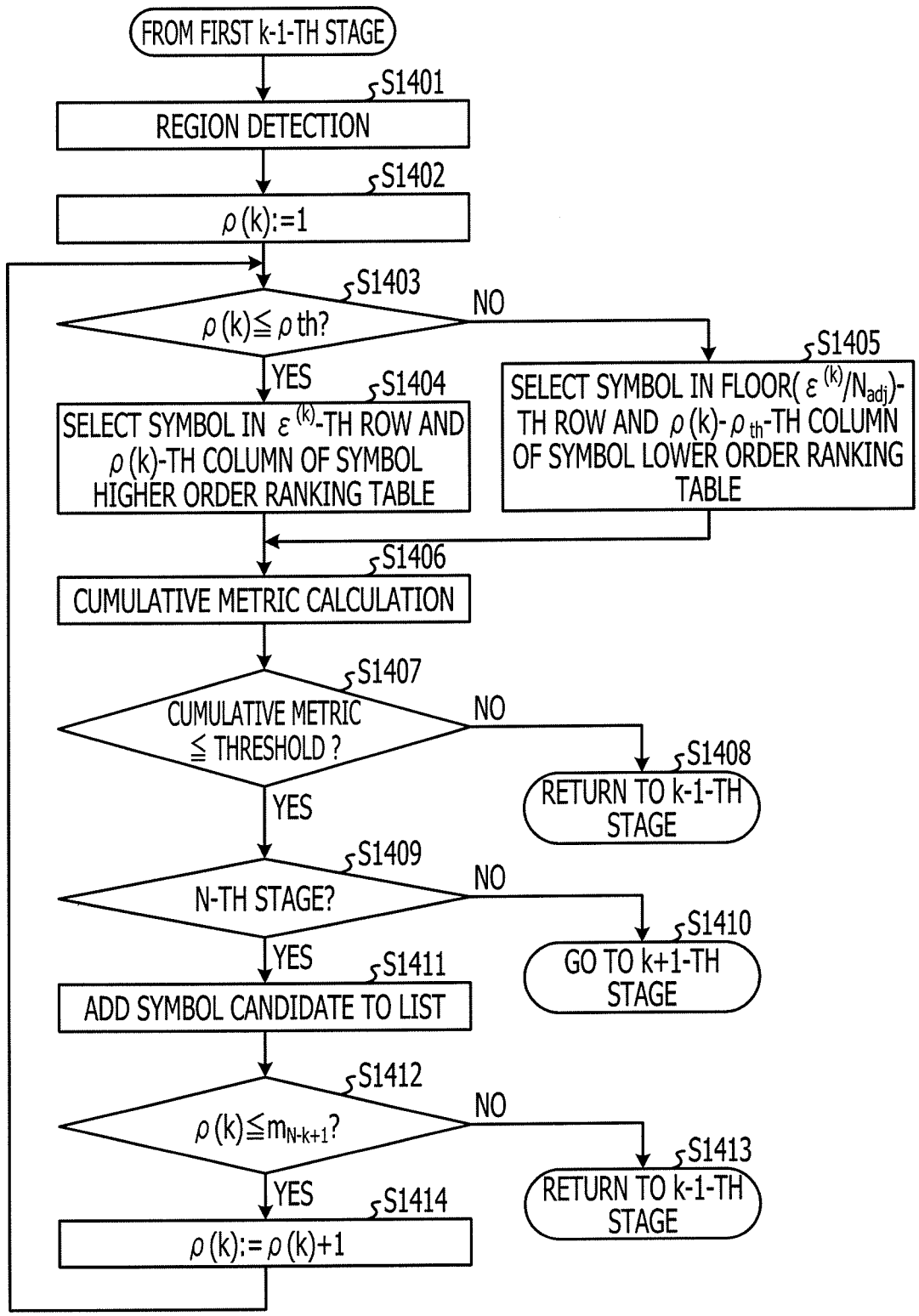
FIG. 40 is a flowchart of Embodiment 7.

Processing of the MIMO demodulation unit 622 of Embodiment 7 is now described. FIG. 40 is a flowchart of Embodiment 7. As depicted in FIG. 40, the region detection unit 626 performs region detection as expression (47) (S1401). Subsequently, the LSD processing unit 624 sets $\rho(k)$ to 1 (S1402). Then, the surviving symbol selection unit 628 determines whether $\rho(k) \leq \rho_{th}$ is satisfied or not (S1403).

Subsequently, when $\rho(k) \leq \rho_{th}$ is satisfied (S1403, Yes), the surviving symbol selection unit 628 selects a symbol in the $\epsilon^{(k)}$-th row and $\rho(k)$-th column of the symbol higher order ranking table 631 (S1404). On the other hand, when $\rho(k) \leq \rho_{th}$ is not satisfied (S1403, No), the surviving symbol selection unit 628 selects a symbol in the floor($\epsilon^{(k)}/N_{adj}$)-th row and $\rho(k)-\rho_{th}$-th column of the symbol lower order ranking table 632 (S1405).

Subsequently, the metric calculation unit 630 calculates a cumulative metric as expression (54) (S1406). Then, the metric calculation unit 630 determines whether the cumulative metric≤threshold is satisfied or not (S1407). When the cumulative metric≤threshold is not satisfied (S1407, No), the metric calculation unit 630 returns to the k−1-th stage (S1408).

On the other hand, when the cumulative metric≤threshold is satisfied (S1407, Yes), the metric calculation unit 630 determines whether the current stage is the N-th stage or not (S1409). When the current stage is not N-th stage (S1409, No), the metric calculation unit 630 goes to the k+1-th stage (S1410).

On the other hand, when the current stage is the N-th stage (S1409, Yes), the metric calculation unit 630 adds a symbol candidate to a list (S1411). Subsequently, the metric calculation unit 630 determines whether $\rho(k) \leq m_{N-k+1}$ is satisfied or not (S1412).

When $\rho(k) \leq m_{N-k+1}$ is not satisfied (S1412, No), the metric calculation unit 630 returns to the k−1-th stage (S1413). On the other hand, when $\rho(k) \leq m_{N-k+1}$ is satisfied (S1412, Yes), the metric calculation unit 630 increments $\rho(k)$ (S1414) and returns to S1403.

An example in which a symbol ranking table is separated into two levels of tables is illustrated in Embodiment 7, but, not limited to this example, a symbol ranking table may be separated into three or more levels of tables as Embodiment 3. Further, as Embodiment 4, Embodiment 7 may be combined with Embodiment 6.

Seven embodiments have been described thus far, but the embodiments of the present disclosure are not limitedly applied only to ASESS method and LSD method. The embodiments are applicable to all MLD methods in which region detection is performed and a symbol ranking table is provided.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A wireless device, comprising:
N antennas configured to receive a reception signal including modulation symbols, N being a natural number that is more than 1;
a processor configured to:
convert the reception signal into a specified signal that includes a product of an upper triangular matrix and a transmission signal corresponding to the reception signal, and
perform a processing of $k^{th}$ stage for $1 \le k \le N$ in order, the processing of $k^{th}$ stage including:
(a) detecting each of areas to which each of $k^{th}$ processed signals belongs on an IQ plane, each of the $k^{th}$ processed signals being obtained by cancelling at least one symbol candidate included in each of surviving paths of $(k-1)^{th}$ stage from the specified signal, and
(b) selecting a first number of surviving paths of $k^{th}$ stage from surviving path candidates of $k^{th}$ stage, each of the surviving path candidates of $k^{th}$ stage being each of combinations of each of the surviving paths of $(k-1)^{th}$ stage and each of a second number of symbol candidates in a corresponding symbol candidate set of $k^{th}$ stage, each of symbol candidate sets of $k^{th}$ stage being specified based on each of the detected areas, the first number of surviving paths of $k^{th}$ stage being selected based on each of cumulative metrics of each of the surviving paths of $(k-1)^{th}$ stage and each of ranks of each of symbol candidates in the corresponding symbol candidate set,
wherein the second number is less than a modulation level of the modulation symbols included in the reception signal.

2. The wireless device according to claim 1, further comprising:
a memory configured to store a symbol ranking table including each of the ranks of the second number of symbol candidates in each of symbol candidate sets corresponding to specified areas into which the IQ plane is divided,
wherein the first number of surviving paths of $k^{th}$ stage are selected based on the symbol ranking table.

3. The wireless device according to claim 2, wherein
a memory is configured to store another symbol ranking table including each of the ranks of a third number of symbol candidates in each of symbol candidate sets corresponding to aggregated specified areas into which the IQ plane is divided, the third number being a difference of the second number from the modulation level, each of the aggregated specified areas including at least two of the specified areas, and
the first number of surviving paths of $k^{th}$ stage are selected based on the other symbol ranking table.

4. The wireless device according to claim 1, wherein
the first number of surviving paths of $k^{th}$ stage are preferentially selected from the surviving path candidates of $k^{th}$ stage corresponding to the surviving paths of $(k-1)^{th}$ stage of which cumulative metric is lower.

5. The wireless device according to claim 1, wherein
the processor is configured to calculate each of cumulative metrics of each of the first number of surviving paths of $k^{th}$ stage.

6. A wireless communication method by a wireless device, comprising:
receiving a reception signal including modulation symbols;
converting the reception signal into a specified signal that includes a product of an upper triangular matrix and a transmission signal corresponding to the reception signal, and
perform a processing of $k^{th}$ stage for $1<=k<=N$, wherein N being a natural number that is more than 1, in order the processing of $k^{th}$ stage including:
(a) detecting each of areas to which each of $k^{th}$ processed signals belongs on an IQ plane, each of the $k^{th}$ processed signals being obtained by cancelling at least one symbol candidate included in each of surviving paths of $(k-1)^{th}$ stage from the specified signal, and
(b) selecting a first number of surviving paths of $k^{th}$ stage from surviving path candidates of $k^{th}$ stage, each of the surviving path candidates of $k^{th}$ stage being each of combinations of each of the surviving paths of $(k-1)^{th}$ stage and each of a second number of symbol candidates in a corresponding symbol candidate set of $k^{th}$ stage, each of symbol candidate sets of $k^{th}$ stage being specified based on each of the detected areas, the first number of surviving paths of $k^{th}$ stage being selected based on each of cumulative metrics of each of the surviving paths of $(k-1)^{th}$ stage and each of ranks of each of symbol candidates in the corresponding symbol candidate set,
wherein the second number is less than a modulation level of the modulation symbols included in the reception signal.

* * * * *